(12) United States Patent
Springer et al.

(10) Patent No.: US 11,492,245 B2
(45) Date of Patent: Nov. 8, 2022

(54) MEMBRANE FOR RESERVOIR SEALS IN FLUID MIXTURE DISPENSING SYSTEM

(71) Applicant: Cana Technology, Inc., Redwood City, CA (US)

(72) Inventors: Gregory Allen Springer, Los Altos, CA (US); Jeffery Lance Kizer, Oakland, CA (US); Matthew Ambauen, San Francisco, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU); Kristopher Bernardo Dos Santos, San Francisco, CA (US); Elijah S. Kashi, San Francisco, CA (US); Andrew Scott Davies, Oakland, CA (US); Danilo Bueno, Burlingame, CA (US)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/547,109

(22) Filed: Dec. 9, 2021

(65) Prior Publication Data

US 2022/0250897 A1    Aug. 11, 2022

Related U.S. Application Data

(63) Continuation of application No. 17/547,081, filed on Dec. 9, 2021.

(Continued)

(51) Int. Cl.
*B67D 1/00* (2006.01)
*B67D 1/08* (2006.01)
(Continued)

(52) U.S. Cl.
CPC ............ *B67D 1/0878* (2013.01); *A47J 31/40* (2013.01); *A47J 31/407* (2013.01); *A47J 31/461* (2018.08);
(Continued)

(58) Field of Classification Search
CPC .. B67D 1/0079; B67D 1/0012; B67D 1/0019; B67D 2210/0006; B67D 3/0019;
(Continued)

(56) References Cited

U.S. PATENT DOCUMENTS 3,149,751 A * 9/1964 Green .................. B67D 3/0012
222/2
3,168,292 A * 2/1965 Joschko ................. B67D 7/743
415/203

(Continued)

FOREIGN PATENT DOCUMENTS

CA          890266 A     1/1972
DE         3430953 A1    3/1986
(Continued)

OTHER PUBLICATIONS

International Search Report and Written Opinion dated Apr. 12, 2022 from International Application No. PCT/US2022/011308 filed Jan. 5, 2022, 17 pages.

(Continued)

*Primary Examiner* — Charles P. Cheyney
(74) *Attorney, Agent, or Firm* — Daylight Law, P.C.

(57) ABSTRACT

A fluid mixture dispensing system using a membrane to seal multiple reservoirs is disclosed. The multiple reservoirs each contain a respective ingredient. The reservoirs are coupled to (Continued)

respective orifices in a plate. The respective ingredients are dispensable via the respective orifices. The membrane seals the respective orifices. The ingredients are dispensed into one or more channels formed between the membrane and the plate. In specific embodiments, the membrane is an integral part of a cartridge which contains the multiple reservoirs. In specific embodiments, the cartridge includes an inlet and an outlet. A solvent flows from the inlet to the outlet through the one or more channels, and the ingredients are dispensed into the solvent in the one or more channels.

33 Claims, 22 Drawing Sheets

Related U.S. Application Data

(60) Provisional application No. 63/146,461, filed on Feb. 5, 2021.

(51) Int. Cl.
| | | |
|---|---|---|
| A47J 31/52 | (2006.01) | |
| F16K 37/00 | (2006.01) | |
| A47J 31/40 | (2006.01) | |
| A47J 31/46 | (2006.01) | |
| B67D 1/12 | (2006.01) | |
| B67D 1/14 | (2006.01) | |
| B01F 35/10 | (2022.01) | |
| B01F 33/84 | (2022.01) | |
| B08B 9/032 | (2006.01) | |
| B67D 1/04 | (2006.01) | |
| B67D 1/07 | (2006.01) | |
| B01F 35/71 | (2022.01) | |
| B67D 3/00 | (2006.01) | |
| B01F 35/75 | (2022.01) | |
| B01F 35/221 | (2022.01) | |
| B01F 35/21 | (2022.01) | |
| B01F 101/16 | (2022.01) | |
| A23G 9/30 | (2006.01) | |
| B01F 23/40 | (2022.01) | |
| B01F 101/21 | (2022.01) | |
| B01F 101/14 | (2022.01) | |
| B01F 35/30 | (2022.01) | |

(52) U.S. Cl.
CPC ......... *A47J 31/5251* (2018.08); *B01F 33/846* (2022.01); *B01F 35/1453* (2022.01); *B01F 35/2113* (2022.01); *B01F 35/2213* (2022.01); *B01F 35/7174* (2022.01); *B01F 35/71745* (2022.01); *B01F 35/71805* (2022.01); *B01F 35/718051* (2022.01); *B01F 35/7543* (2022.01); *B08B 9/032* (2013.01); *B67D 1/0015* (2013.01); *B67D 1/0019* (2013.01); *B67D 1/0037* (2013.01); *B67D 1/0046* (2013.01); *B67D 1/0052* (2013.01); *B67D 1/0078* (2013.01); *B67D 1/0085* (2013.01); *B67D 1/04* (2013.01); *B67D 1/07* (2013.01); *B67D 1/0884* (2013.01); *B67D 1/0885* (2013.01); *B67D 1/0888* (2013.01); *B67D 1/1252* (2013.01); *B67D 1/14* (2013.01); *B67D 3/0012* (2013.01); *B67D 3/0019* (2013.01); *B67D 3/0041* (2013.01); *F16K 37/0041* (2013.01); *A23G 9/30* (2013.01); *B01F 23/483* (2022.01); *B01F 2035/351* (2022.01); *B01F 2101/14* (2022.01); *B01F 2101/16* (2022.01); *B01F 2101/21* (2022.01); *B67D 2001/0093* (2013.01); *B67D 2001/0098* (2013.01); *B67D 2001/0481* (2013.01); *B67D 2001/075* (2013.01); *B67D 2210/00013* (2013.01); *B67D 2210/00065* (2013.01); *B67D 2210/00089* (2013.01); *B67D 2210/00091* (2013.01); *B67D 2210/00146* (2013.01)

(58) Field of Classification Search
CPC ...... B67D 3/0012; B67D 3/0041; B67D 7/02; B67D 7/14; B67D 7/42; B67D 7/78; B01F 35/7174; B01F 35/718051; B01F 33/846; B01F 2101/16; B01F 2101/21; B01F 2101/14
USPC .................. 222/129.1, 1, 63, 52, 23, 55, 56
See application file for complete search history.

(56) References Cited

U.S. PATENT DOCUMENTS

| | | | |
|---|---|---|---|
| 4,729,495 A * | 3/1988 | Aschberger | G05D 9/12 222/65 |
| 5,033,651 A * | 7/1991 | Whigham | B67D 1/0051 239/432 |
| 6,089,538 A | 7/2000 | Shirkhan | |
| 6,592,098 B2 | 7/2003 | Kao et al. | |
| 6,609,698 B1 | 8/2003 | Parsons et al. | |
| 7,007,824 B2 | 3/2006 | Danby et al. | |
| 8,181,822 B2 | 5/2012 | Doelman et al. | |
| 8,763,642 B2 | 7/2014 | Vangbo | |
| 8,788,090 B2 | 7/2014 | Rothschild | |
| 8,870,025 B2 | 10/2014 | Reddy et al. | |
| 8,960,500 B2 | 2/2015 | Opstal et al. | |
| 9,731,266 B2 | 8/2017 | Stern et al. | |
| 10,150,663 B2 * | 12/2018 | Seay | G05D 7/0635 |
| 10,501,304 B2 | 12/2019 | Jangbarwala et al. | |
| 10,518,938 B2 | 12/2019 | Suzuki et al. | |
| 2006/0138170 A1 | 6/2006 | Brim et al. | |
| 2012/0025115 A1 | 2/2012 | Schiavone et al. | |
| 2013/0240565 A1 * | 9/2013 | Johansson | A47J 31/402 222/129.1 |
| 2013/0292407 A1 * | 11/2013 | Beavis | F04B 49/065 222/23 |
| 2016/0129467 A1 | 5/2016 | Ciardella et al. | |
| 2017/0081168 A1 | 3/2017 | Seay et al. | |
| 2017/0096323 A1 * | 4/2017 | DeRaedt | B67D 3/0019 |
| 2018/0078937 A1 | 3/2018 | Rensch et al. | |
| 2019/0053658 A1 | 2/2019 | Lecomte et al. | |
| 2019/0061329 A1 | 2/2019 | Putnam | |
| 2019/0277422 A1 | 9/2019 | Strasswiemer et al. | |
| 2020/0205545 A1 | 7/2020 | Han et al. | |
| 2020/0307986 A1 * | 10/2020 | Balducchi-Prince | B67D 3/0012 |
| 2020/0354873 A1 * | 11/2020 | Cooke | D06F 21/02 |

FOREIGN PATENT DOCUMENTS

| | | |
|---|---|---|
| DE | 19646595 A1 | 5/1998 |
| DE | 102008055994 A1 | 5/2010 |
| EP | 0479113 A1 | 4/1992 |
| WO | 2008043186 A1 | 4/2008 |
| WO | 2020047612 A1 | 3/2020 |

OTHER PUBLICATIONS

Nonfinal Office Action dated Mar. 28, 2022 from U.S. Appl. No. 17/547,081, 37 pages.

\* cited by examiner

102 Receive a request for a fluid mixture

104 Flow predetermined amount of solvent from a solvent reservoir to a mixing channel and a mixing chamber and/or dissolution chamber Flow predetermined amount of at least one ingredient from a plurality of ingredient reservoirs to the at least one mixing channel and/or the dissolution chamber to form an intermediate fluid mixture(s)

Flow intermediate fluid mixture(s) to the mixing chamber

106 Dispense the fluid mixture from the mixing chamber via a dispener

1500

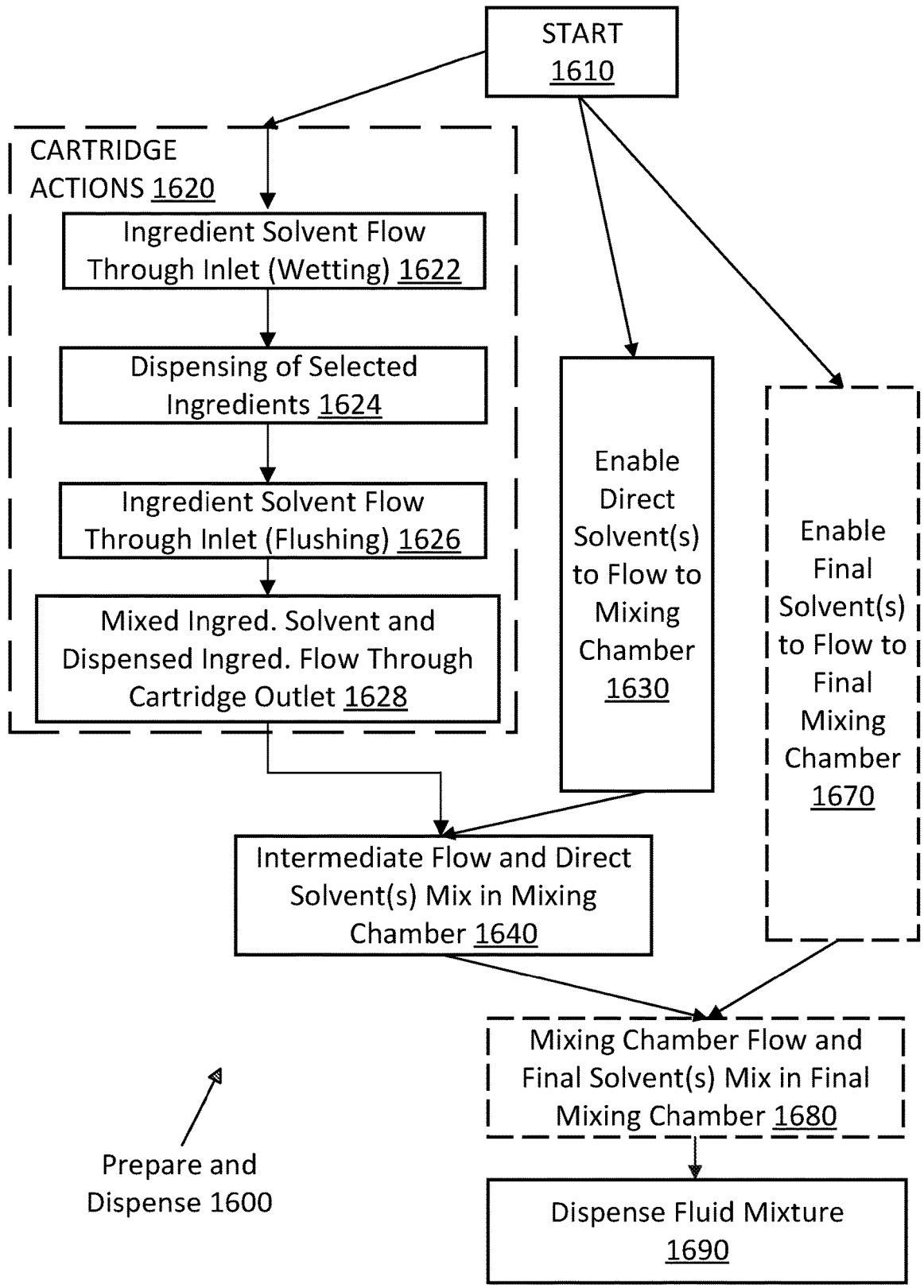

MEMBRANE FOR RESERVOIR SEALS IN FLUID MIXTURE DISPENSING SYSTEM

CROSS REFERENCE TO RELATED APPLICATIONS

This application is a continuation of U.S. patent application Ser. No. 17/547,081, filed Dec. 9, 2021, which claims the benefit of U.S. Provisional Patent Application No. 63/146,461 filed Feb. 5, 2021, both of which are incorporated by reference herein in their entirety for all purposes.

BACKGROUND

Typical beverage dispensing systems combine a diluent (e.g., water) with a basic beverage component such as concentrates or syrups made up of a multitude of other ingredients. However, these basic beverage components often require significant storage space and may even need to be kept refrigerated to protect against spoilage. Accordingly, these basic beverage components are most likely not even stored in the same room as the beverage dispensing system, much less in the beverage dispensing system itself. In addition, each individual beverage may require its own unique basic beverage component thereby further increasing storage space and the overall footprint of the beverage dispensing system. Furthermore, typical beverage dispensing systems cannot allow for customization of the beverage as well as household usage.

SUMMARY

According to various embodiments, fluid mixture dispensing is accomplished by an automated fluid mixture dispensing system. The system generates mixtures of beverages, cleaning products, cosmetic compounds, and/or various other fluid mixtures. Based on a user selection that is optionally custom tailored by the user, the system is configured to prepare and dispense a variety of fluid mixtures based on a set of basic solvents and ingredients. The system is able to rely on a predefined chemical makeup of the fluid mixture in order for the system to prepare the fluid mixture. For example, chemical analysis of a specific wine or perfume results in a list of chemical ingredients or components that make up the specific wine or perfume. The systems disclosed herein are able to rely on such a predetermined list of chemical ingredients for a user-specified fluid mixture (e.g., chardonnay) to prepare that fluid mixture. Some chemical ingredients may be dispensed in the final mixture with relatively large volume percentages (e.g., a glass of wine may have about 10-15% ethanol), whereas other components may be dispensed in a volume of less than 0.1 mL.

Accordingly, rather than forming a fluid mixture solely from concentrates or syrups, the systems disclosed herein are configured to form the fluid mixture based on predetermined amounts of individual chemical ingredients that make up the fluid mixture, allowing for a level of customization and choice not available to current beverage systems. In some embodiments, because a small quantity (e.g., less than 0.1 mL) of an individual chemical ingredient can have a large effect on a fluid mixture property (e.g., taste), the overall storage or footprint of the system is significantly smaller than those dispensing system that rely on syrups and/or concentrates.

According to various embodiments, a particular one of the systems disclosed herein comprises a plurality of ingredient reservoirs containing respective ingredients and a combination of zero or more of each of the following components: a cartridge (also called an ingredient cartridge), optionally and/or selectively pressurizable, to contain the plurality of ingredient reservoirs; a solvent reservoir containing a respective solvent (e.g., a diluent); a solvent inlet, such as a water inlet to connect to an exterior water supply; a mixing channel; a dissolution chamber; a mixing chamber; a dispenser (e.g., a nozzle); a drip tray (e.g., waste storage); a carbonator; a heat exchanger; a pneumatic system; a pump, such as a motor-operated or a pressure-operated pump; a microfluidic pump; a fluid mixture holder sensor (to monitor whether or not a receptacle for the fluid mixture is present); a drip tray sensor (to monitor whether or not the drip tray is present and/or an amount of fluid in the drip tray); a dispensing sensor (to monitor a dispensing profile of the fluid mixture); a valve, such as an electromechanical valve; interconnection hardware such as pipes and/or tubing; a temperature sensor; a pressure sensor; a flow sensor; a user interface, such as a control panel; a controller, such as a microprocessor; and any other device, sensor, or equipment used in fluid dispensing systems.

In some embodiments, one or more sources (e.g., the ingredient reservoirs and/or the solvent reservoirs) are fluidly connected to one or more collection points in a fluid path (a flow) from the one or more sources to the dispenser. The collection points include one or more mixing channels, mixing chambers, dissolution chambers, and, in various embodiments, the dispenser. A number and a type of the collection points in a particular system is a function of the use (e.g., environment) of the system, and/or the types of solvents and the types of ingredients required to produce desired fluid mixtures. For example, a beverage dispensing system is configured with a different set of components including different collection points and/or a different arrangement of collection points as compared to a cleaning fluid dispensing system.

In some embodiments, a flow of a solvent from a solvent reservoir is optionally and/or selectively heated and/or cooled by a heat exchanger as it flows to a next collection point. (For example, the flow of the solvent is through serpentine tubing embedded in the heat exchanger.) In further embodiments, one heat exchanger is configured to heat and/or cool two or more flows of solvents. In various embodiments, any of the collection points is optionally and/or selectively heated and/or cooled by a heat exchanger. In specific embodiments, one or more temperature sensors are used before and/or after a heat exchanger, such as to measure temperature of one or more input flows to the heat exchanger or temperature of an output flow from the heat exchanger. In various embodiments, temperature sensors are used in other parts of the system, such as to measure a temperature of a solvent in a solvent reservoir, a temperature of a solvent from a solvent inlet, or a temperature of a fluid or a gas at any point in the system (e.g., fluid at the dispenser or gas in the cartridge).

In some embodiments, the controller is programmed to monitor any of the sensors (e.g., pressure sensors, temperature sensors, fluid mixture holder sensors, drip tray sensors, or dispensing sensors) in real time, and is able to control any of the controllable components (e.g., valves, pumps, microfluidic pumps, pneumatic systems, or heat exchangers). By monitoring the sensors and controlling the controllable components, the controller is programmed to prepare one of a plurality of fluid mixtures according to a respective formula (also called a recipe herein) using the ingredients and the solvents. The controller is further programmed to produce a series of fluid mixtures of different types using the respective formulas, for example a glass of wine followed by a Manhattan cocktail. A formula specifies things such as: an amount of one or more ingredients to be used; an amount of one or more solvents to be used; a sequence of operations, such as order in which ingredients and/or solvents are dispensed, or an order in which pumps and/or valves are activated; heating and/or cooling instructions for one or more flows and/or collection points; carbonation requirements, such as whether a flow of water passes through a carbonator or an amount of carbonated water to add; pre-dispense or post-dispense flushing instructions; other techniques for producing fluid mixtures; and any combination of the foregoing. In some embodiments and/or usage scenarios, the controller is programmed to purge (flush) the system, such as by dispensing an amount of a particular solvent to flow through the system into the drip tray, in between producing fluid mixtures of different types. In some embodiments, the system is able to produce a fluid mixture up to one liter in volume. In other embodiments, the system is able to produce a fluid mixture up to three liters in volume. In industrial applications, the system is able to produce a fluid mixture of hundreds or thousands of liters in volume.

In various embodiments, the controller has access to and/or contains a library of predefined recipes. According to various embodiments, the controller produces a particular fluid mixture one or more of: in response to a request, such as via a user interface (e.g., a control panel); in response to commands received over a network, such as from a computer or a smart phone; automatically; according to a programmed schedule; other techniques for controlling production of fluid mixtures at desired times and/or places; and any combination of the foregoing. In further embodiments, the recipes are customizable, such as via a user at a user interface, to modify a particular recipe for a user's specific requirements. For example, a user selects a recipe for a Manhattan cocktail, but changes an amount of bitters to be used from a default amount.

In various embodiments with a fluid mixture holder sensor, the controller is programmed to only dispense the fluid mixture when a fluid mixture holder (e.g., a cup or other receptacle beneath the dispenser) is detected by the fluid mixture holder sensor. For example, the controller does not start producing a fluid mixture unless the fluid mixture holder sensor detects a receptacle beneath the dispenser.

In various embodiments with a drip tray sensor, the controller is programmed to determine whether the drip tray is present and/or an amount of fluid in the drip tray. In further embodiments, the controller is programmed to not dispense the fluid mixture if the drip tray is not present and/or the amount of fluid in the drip tray is more than a threshold.

In various embodiments with a dispensing sensor, the controller is programmed to determine whether the fluid mixture to be dispensed or being dispensed has a satisfactory dispensing profile. For example, the dispensing sensor is configured to determine one or more of the flow rate, the viscosity, the carbonation level, the sweetness (e.g., the sugar content), or the alcoholic content of the fluid mixture.

In some embodiments with a flow sensor, the controller is programmed to determine whether a flow of a fluid at a point in the system is as expected (e.g., measuring the flow rate) and/or to determine a volume of the fluid passing the point in the system (e.g., measuring an amount of the fluid).

In some embodiments with a pressure sensor, the controller is programmed to determine whether a pressure in a container, such as in a pressurized cartridge, is at a desired level, and/or to monitor a change in the pressure in the container over time.

In various embodiments, the controller is programmed to detect (such as with a sensor) or determine (such as by accumulating dispensed amounts vs. an initial volume) whether a particular ingredient reservoir or a particular solvent reservoir has less than a respective threshold amount of its contents remaining. For example, the controller is programmed to determine after dispensing a number of fluid mixtures that a particular one of a plurality of solvent reservoirs is nearly empty.

In some embodiments, the controller is programmed to signal a condition, such as a condition reported by the fluid mixture holder sensor, the drip tray sensor, and/or the dispensing sensor, to the user by visual (e.g., a flashing light or a message on a display) or auditory (e.g., a beep or a spoken phrase) methods. In further embodiments, in response to detecting the condition, the controller is programmed to hold a fluid mixture in a mixing chamber (e.g., by control of a valve) and not dispense the fluid mixture until the condition is rectified and/or a user overrides the condition. For example, lack of a cup to hold the fluid mixture as detected by the fluid mixture holder sensor causes the fluid mixture to be held in a mixing chamber prior to the dispenser.

In some embodiments, the ingredient reservoirs contain ingredients, such as a solid (including crystalline, powdered, or other forms of a solid), a liquid, or a gas, used in the preparation of a fluid mixture. Similarly, the solvent reservoirs contain solvents, such as a liquid or a gas, used in the preparation of a fluid mixture. In general, but not in all embodiments and/or usage scenarios, ingredients reservoirs have a lower volume than solvent reservoirs, and/or ingredients are used in fluid mixture in lower amounts than solvents. Examples of ingredients include flavorings, syrups, and chemicals such as citric acid (in solid form or in a solution). Examples of solvents include alcohol (e.g., ethanol or isopropanol), water, ethyl lactate, and propylene glycol. In specific embodiments, there are at least three ingredient reservoirs. In further embodiments, there are a dozen or more ingredient reservoirs. A typical system has two or more solvent reservoirs, but some systems have only one solvent reservoir, and other systems might not have any solvent reservoirs. For example, a non-alcoholic, diet beverage producing system with a carbonator requires only a water reservoir, or alternatively a water inlet (with no water reservoir required). In specific embodiments, at least some of the solvent reservoirs are replaceable and/or refillable (e.g., when an amount of solvent in the solvent reservoir is below a threshold).

According to various embodiments, an amount of a particular ingredient dispensed into a fluid mixture varies from fractions of a milliliter (e.g., 0.01 mL or less) to multiple liters (e.g., three liters). (Of course, for solid or gaseous ingredients, equivalent variations in a range of the amount dispensed apply.) An amount of a particular solvent used in a fluid mixture varies similarly. For example, a glass of wine has a 10% alcohol content, whereas a Manhattan cocktail has a 34% alcohol content.

In some embodiments, a plurality of ingredient reservoirs is contained in a cartridge. In further embodiments, there are multiple of such cartridges, such as with different sets of ingredient reservoirs, as spare/backup cartridges, and/or in systems with multiple dispensers. According to various embodiments, each of the ingredient reservoirs is of one or more types, such as: a bladder bag; a syringe; a gravity dispense chamber; a pellet dispenser; a pierceable volume; and any other container used for a solid (including crystalline, powdered, or other forms of a solid), a liquid, or a gas. In various embodiments, all of the ingredient reservoirs in a cartridge are of a same type. In other embodiments, a cartridge contains ingredient reservoirs of two or more types. According to various embodiments, each of the ingredient reservoirs is of one or more sizes, such as: a small size (e.g., one ounce or less, or two ounces or less); a medium size (e.g., four ounces or less, or eight ounces or less; a large size (e.g., 16 ounces or less, or 32 ounces or less); and other sizes or gradations as used in differing usage scenarios. In various embodiments, all of the ingredient reservoirs in a cartridge are of a same size. In other embodiments, a cartridge contains ingredient reservoirs of two or more sizes. In various embodiments, a cartridge (and the ingredient reservoirs it contains) is a replaceable unit.

In some embodiments, the system is configured to dispense a predetermined amount of one or more ingredients from the ingredient reservoirs in a cartridge into one or more mixing channels. In various embodiments, the one or more mixing channels are embedded in and/or are part of the cartridge. In a first example, the ingredients are dispensed by individually controlled microfluidic pumps. In a second example, the cartridge is sealed (or contains a sealed interior chamber) and the ingredients are dispensed, at least in part, by pressurizing the cartridge (or the interior chamber) and controlling respective valves of each ingredient reservoir to select which of the ingredient reservoirs is enabled to dispense. The controller is programmed to dispense a given amount of each selected ingredient as a function of, by controlling, and/or by monitoring one or more of: the pressure (applied to all of the ingredient reservoirs in the cartridge); a temperature, such as a temperature in the cartridge (or in the interior chamber); a duration of time and/or a degree to which the respective valve of the ingredient reservoir of the selected ingredient is open; a viscosity of the selected ingredient; a size of a respective orifice from which the selected ingredient is dispensed; and other factors affecting dispensed amounts of the selected ingredient.

In some embodiments, a dissolution chamber is used to more fully combine particular solvents and/or particular ingredients, such as by using heating (with a heat exchanger) or agitation (e.g., a mechanical agitator).

In some embodiments, a solvent, such as water, flows through a carbonator on a fluid path to a collection point.

According to various embodiments, any particular flow of solvents, ingredients, and/or a mixture thereof is moved (e.g., propelled) by one or more of: pressure, such as pneumatic pressure; a pump; a microfluidic pump; gravity; and any other technique used in fluid dispensing systems. Further, the particular flow of solvents is optionally and/or selectively controlled at one or more points by fluid control components such as valves (e.g., electromechanical valves such as solenoid valves or other actuator-driven valves, one-way valves, two-way valves, check valves, ball valves, or butterfly valves) and other types of fluid control or fluid routing mechanisms used in fluid dispensing systems.

In a first example system, a plurality of ingredient reservoirs is contained in a pressurizable cartridge. To make a particular fluid mixture, selected ones of the ingredients from the ingredient reservoirs are dispensed, using pressure applied to the cartridge, into a mixing channel. A solvent from a solvent reservoir also flows through the mixing channel, creating an intermediate fluid mixture. The intermediate fluid mixture and one or more other solvents (optionally and/or selectively heated, cooled, and/or carbonated) are combined in a mixing chamber and dispensed via a dispenser.

A second example system is similar to the first example system but uses two cascaded mixing chambers, a first mixing chamber receiving the intermediate fluid mixture and some of the one or more solvents, and a second (final) mixing chamber receiving the output of the first mixing chamber and another one of the one or more other solvents. This allows particular ones of the one or more other solvents to be mixed in only at the last collection point, e.g., to reduce contamination and/or to minimize a loss of carbonation.

In some embodiments, the ingredients in the ingredient reservoirs comprise at least one selected from the group consisting of glycerine (glycerol), fructose, glucose, lactic acid, malic acid, tartaric acid, potassium phosphate tribasic, sucrose, potassium sulfate, succinic acid, acetic acid, citric acid, tricalcium phosphate, magnesium hydroxide, 3-methylbutan-1-ol, sodium phosphate dibasic, propanol, starter distillate 9x, ethyl acetate, 2-methylbutan-1-ol, 2-methylpropan-1-ol, 2-phenylethanol, oxolan-2-one, iron sulfate heptahydrate, octanoic acid, hexanoic acid, 3-methylbutyl acetate, decanoic acid, hexan-1-ol, ethyl octanoate, furan-2-ylmethanol, ethyl hexanoate, 2-methylpropanoic acid, furan-2-carbaldehyde, ethyl butanoate, 2,6-dimethoxyphenol, ethyl decanoate, hexyl acetate, 2-phenyl ethyl acetate, 3-methylsulfanylpropan-1-ol, ethyl propionate, butan-1-ol, 4-hydroxy-3-methoxybenzaldehyde, 5-methylfuran-2-carbaldehyde, isobutyl acetate, 5-pentyloxolan-2-one, ethyl 2-methylpropanoate, 5-butyl-4-methyloxolan-2-one, 2-methoxy-4-methylphenol, 2-methoxy-4-prop-2-enylphenol, 2-methyoxyphenol, and/or coloring agents.

It will be appreciated that any of the variations, embodiments, features and options described in view of systems disclosed herein apply equally to methods disclosed herein and vice versa. It will also be clear that any one or more of the above variations, embodiments, features and options can be combined.

Additional advantages will be readily apparent to those skilled in the art from the following detailed description. The embodiments and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

The invention will now be described, by way of example only, with reference to the accompanying drawings, in which:

FIG. 1 illustrates a flowchart representing an exemplary method of dispensing a beverage, in accordance with some embodiments.

In FIG. 10, a "TCS" is a temperature-controlled storage capable of keeping stored contents at a desired temperature using a heat exchanger. A metering control element, as illustrated in FIG. 10, includes at least one of a valve, an electromotive element, a pump, a pressure sensor, a temperature sensor, a flow sensor, and a mechanical component (e.g., a tee, check valve, etc.).

In FIG. 11, a "TCS" is a temperature-controlled storage capable of keeping stored contents at a desired temperature using a heat exchanger. A metering control element, as illustrated in FIG. 11, includes at least one of a valve, an electromotive element, a pump, a pressure sensor, a temperature sensor, a flow sensor, and a mechanical component (e.g., a tee, check valve, etc.).

FIG. 16 illustrates a flowchart representing an exemplary method of preparing and dispensing a fluid mixture in accordance with some embodiments.

In the figures, like reference numbers correspond to like components unless otherwise stated.

DETAILED DESCRIPTION

Figure 2A:
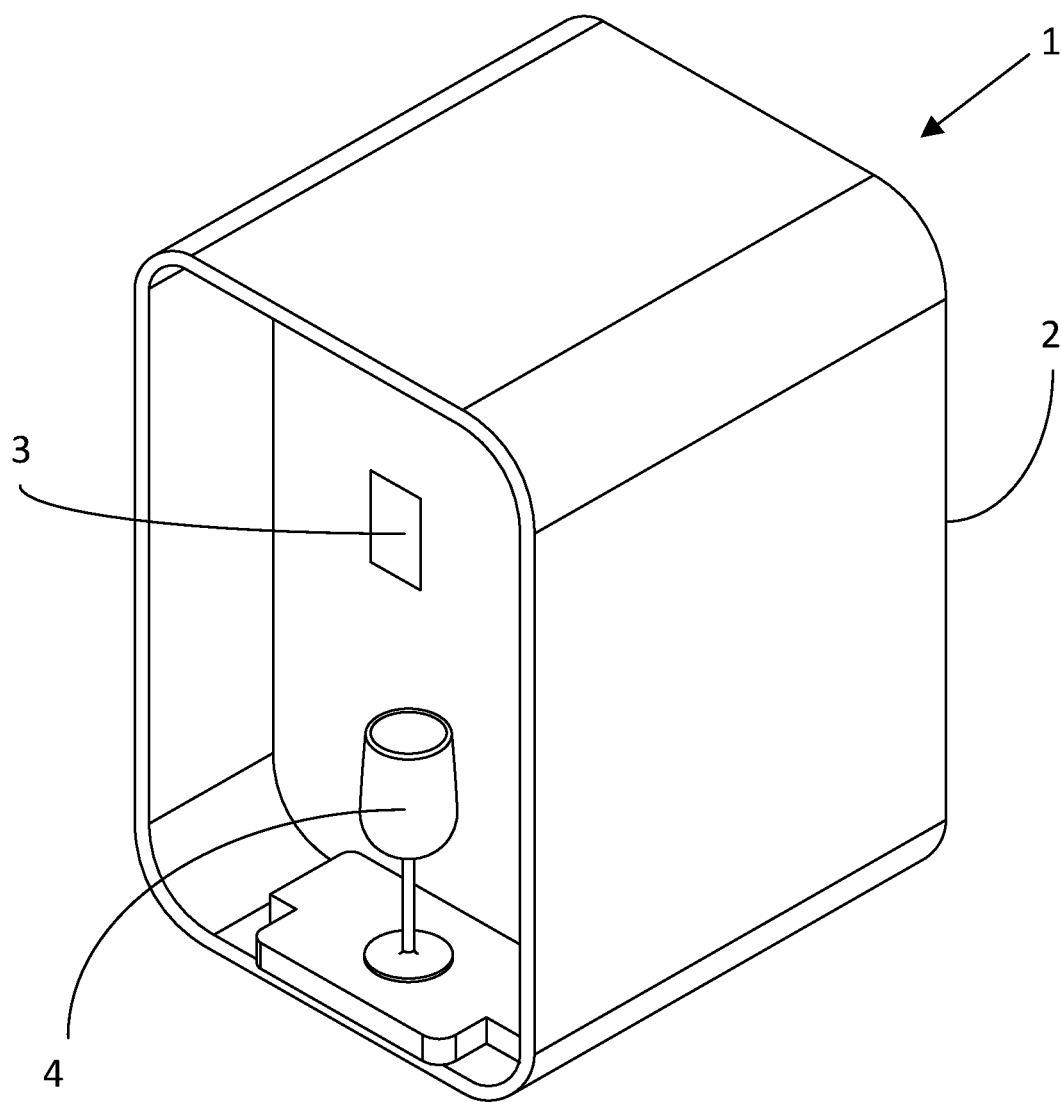
FIG. 2A illustrates an example of a fluid mixture dispensing system, in accordance with some embodiments.

A detailed description of one or more embodiments of the invention is provided below along with accompanying figures illustrating selected details of the invention. The invention is described in connection with the embodiments. The embodiments in the present disclosure are understood to be examples, the invention is expressly not limited to or by any or all of the embodiments in the present disclosure, and the invention encompasses numerous combinations, alternatives, modifications, and equivalents. To avoid monotony in the exposition, a variety of word labels (such as: first, last, certain, various, further, given, other, particular, select, some, specific, and notable) may be applied to separate sets of embodiments; as used in the present disclosure such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, system, and/or program instruction features, other embodiments are contemplated that, in accordance with a predetermined or a dynamically determined criterion, perform static and/or dynamic selection of one of multiple modes of operation corresponding respectively to one or more of the multiple embodiments. Numerous specific details are set forth in the following description to provide a thorough understanding of the invention. In various embodiments, different numerical values may be used. The details are provided for the purpose of example and the invention may be practiced according to the claims without some or all of the details. For the purpose of clarity, technical material that is known in the technical fields related to the invention has not been described in detail so that the invention is not unnecessarily obscured.

Described herein are fluid mixture dispensing systems and methods. The fluid mixtures described herein can be prepared from a combination of liquids, solids, and gases. According to some embodiments, a fluid mixture dispensing system includes a combination of one or more of at least some of each of the following: a solvent reservoir (e.g., a water reservoir and/or an alcohol reservoir); a dissolution chamber; a plurality of ingredient reservoirs; a mixing channel; a mixing chamber; a dispenser (e.g., a nozzle); a heat exchanger; and a controller. In some embodiments, the controller is configured to receive a request for a fluid mixture and, in response to receiving the request for the fluid mixture, the controller is configured to: (1) flow a predetermined amount of at least one solvent from at least one solvent reservoir (e.g., a predetermined amount of water from the water reservoir and/or a predetermined amount of alcohol from the alcohol reservoir) and a predetermined amount of at least one ingredient from the plurality of ingredient reservoirs to at least one mixing channel to form an intermediate fluid mixture; (2) flow a predetermined amount of at least one solvent from at least one solvent reservoir (e.g., water from a water reservoir and/or alcohol from an alcohol reservoir) to a first mixing chamber; (3) flow a predetermined amount of at least one solvent from at least one solvent reservoir (e.g., a predetermined amount of water from a water reservoir and/or flow a predetermined amount of alcohol from an alcohol reservoir) and flow a predetermined amount of at least one ingredient from at least one ingredient reservoir to at least one dissolution chamber to form an intermediate fluid mixture; (4) flow a predetermined amount of at least one ingredient from at least one ingredient reservoir to a second mixing chamber; and (5) flow contents of the first mixing chamber (if it is not the same as a final mixing chamber), contents of the second mixing chamber (if it is not the same as the final mixing chamber), and the intermediate fluid mixtures, if any, to the final mixing chamber. The system is able to dispense the fluid mixture (e.g., from the final mixing chamber) via the dispenser. Accordingly, the system is able to make numerous different fluid mixtures based on respective requests for the fluid mixtures. Once a request is received for a fluid mixture, the system is configured to automatically create and dispense the fluid mixture by flowing required amounts of solvents (e.g., water and/or alcohol) and/or ingredients from their respective reservoirs to the final mixing chamber, and then dispensing the fluid mixture via the dispenser. In some embodiments, the system only has a single mixing chamber, which can be called a "final" mixing chamber. In various embodiments with multiple mixing chambers, there is generally a last (final) mixing chamber prior, in a sequence of fluid flow, to the dispenser. In other embodiments, the dispenser acts as the final mixing chamber.

The fluid mixture dispensing systems described herein are able to dispense all kinds of fluid mixtures. For example, fluid mixtures include, but are not limited to, beverages (e.g., wine, soda, tea, etc.), cosmetics (e.g., perfumes, makeup, etc.), cleaning products (e.g., shampoo, conditioner, soaps, etc.), inks, oils, and a wide variety of other fluid mixtures.

Figure 9:
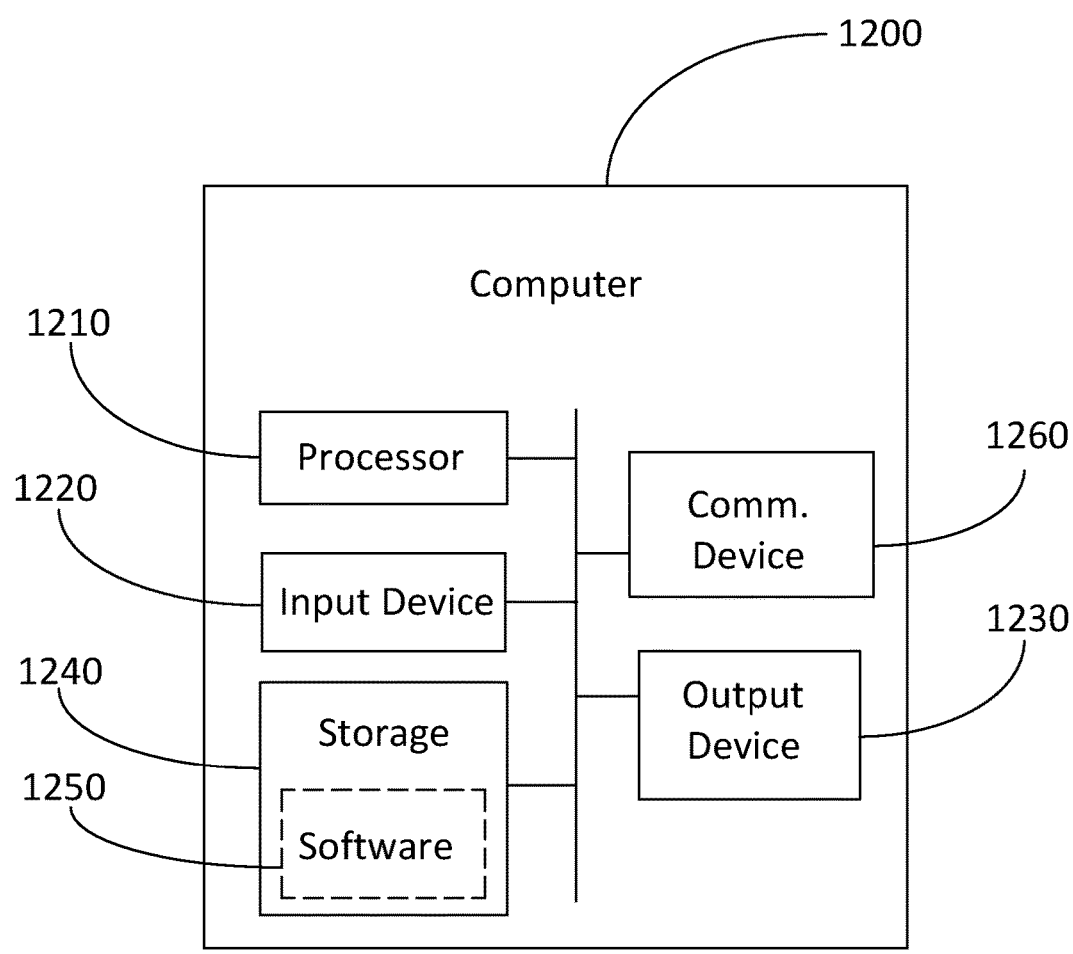
FIG. 9 illustrates a computer, in accordance with some embodiments.

In some embodiments, the system includes a controller. The word "controller" encompasses one or more controllers (e.g., one or more processors, microprocessors, microcontrollers, embedded control processors, and/or CPUs). In specific embodiments of the invention, the controller can be a control system for the overall device even if the various control elements are separately programmed and are not part of a common control hierarchy. In various embodiments, the controller is any device or system comprising one or more computer processors configured to receive user requests, process each of the received requests, and to generate and transmit one or more output signals in accordance with results of the request processing. In some embodiments, the controller is provided, in whole or in part, as all or part of a desktop computing device, laptop, tablet, mobile electronic device, dedicated processing device, computing module, processor, server, cloud computing system, distributed computing system, or the like. In some embodiments, the controller is provided locally with respect to the rest of the fluid mixture dispensing system (e.g., in or attached to the fluid mixture dispensing system), while in other embodiments, the controller is provided remotely from the fluid mixture dispensing system (e.g., outside and not attached to the fluid mixture dispensing system, such as at a remote server location). FIG. 9 illustrates an example of a controller that is able to be used with and/or in the fluid mixture dispensing systems disclosed herein. As previously described, any of the systems optionally includes more than one controller. For example, in some embodiments, a first controller is programmed to operate a user interface and to communicate with other controllers in the system, and a second controller is programmed to operate a fluid control system (e.g., pumps, valves, and/or corresponding sensors).

In some embodiments, the controller is configured to receive user requests, to process the user requests, and to prepare respective fluid mixtures for dispensing. In some embodiments, the controller is configured to dispense a fluid mixture (e.g., a beverage) in accordance with the techniques described herein, such as with reference to FIG. 1.

In some embodiments, the controller is configured to send one or more instructions and/or control signals to various other components of the fluid mixture dispensing system to cause the system to dispense a fluid mixture. In some embodiments, the instructions and/or control signals are sent by the controller in response to a received request for a fluid mixture, and according to a recipe for the requested fluid mixture. References herein to the system receiving a request, performing an action (such as flowing a solvent), etc., include a component of the system, such as the controller, a valve, and/or a pump, controlling, being programmed to control, monitoring, performing, or otherwise enabling at least a part of the receiving the request, the performing the action, etc. In a first example, the system controlling/monitoring (or being configured to control/monitor) an operation refers to the controller of the system controlling/monitoring (or being configured to control/monitor) the operation. In a second example, the system flowing a solvent refers to pumps and/or valves of the system (as controlled by the controller) causing the solvent to flow.

FIG. 1 illustrates a flowchart representing an exemplary method 100 for dispensing a fluid mixture (e.g., a beverage), in accordance with various embodiments. In some embodiments, any one or more variations of method 100 (and/or of method 1600 as illustrated in FIG. 16) are optionally and/or selectively combined, in whole or in part, with any one or more of the systems, methods, devices, components, and/or techniques described elsewhere herein.

Figure 2B:
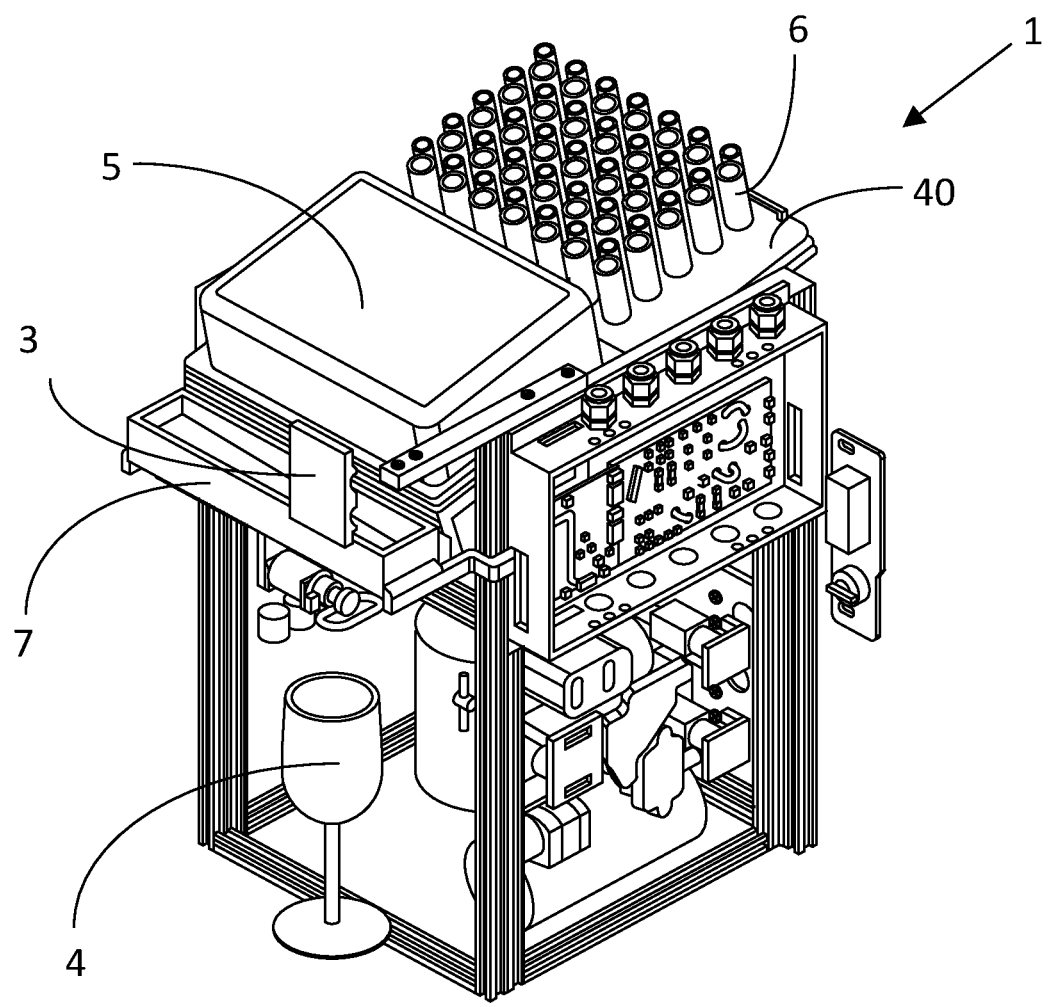
FIG. 2B illustrates an example of a fluid mixture dispensing system without its casing, in accordance with some embodiments.

FIGS. 2A and 2B illustrate examples of a fluid mixture dispensing system 1 in accordance with various embodiments. In some embodiments, the fluid mixture dispensing system is able to be used for beverage dispensing and/or for a wide variety of other types of fluid mixture dispensing. According to various embodiments, the fluid mixture dispensing system is able to be a countertop or consumer electronic device, or a larger device installed in a restaurant or other commercial business.

In some embodiments, fluid mixture dispensing system 1 includes a casing 2. In further embodiments, the casing is a protective outer casing that houses various internal components of the system. According to various embodiments, the internal components include one or more of at least some of each of the following: solvent reservoirs (e.g., a water reservoir and/or an alcohol reservoir); ingredient reservoirs; mixing channels; mixing chambers; heat exchangers (e.g., heaters/chillers); dissolution chambers; and various fluid moving mechanisms (e.g., valves, actuators, pumps, etc.). Fluid mixture dispensing system 1 optionally includes a user interface 3, such as a display, a keyboard, a touch pad and/or a touch screen.

At block 102 of FIG. 1, in some embodiments, the system (e.g., a controller of the system) receives a request for a fluid mixture (e.g., a beverage). In some embodiments, the request for the fluid mixture is received via a user interface. In some embodiments, the user interface includes a graphical user interface such as a touch screen. In some embodiments, the user interface is configured to display the request and/or any modifications that are made to the request (e.g., by a user via the user interface). For example, if a user requests a soda, the user interface optionally and/or selectively displays options to modify the soda, such as an amount of sugar to be added, a carbonation level, an overall volume, and/or a temperature, among others. In some embodiments, preparation of the requested fluid mixture is according to a predefined fluid mixture selected from a library of predefined fluid mixtures. In various embodiments, the library of predefined fluid mixtures (e.g., names of the predefined fluid mixtures, and/or formulas for the predefined fluid mixtures) is able to be displayed on the user interface for user selection. In some embodiments, the library of predefined fluid mixtures is stored remotely from the fluid mixture dispensing system, and is later sent or uploaded to the fluid mixture dispensing system. In various embodiments, the library of predefined fluid mixtures is sent to the controller and is stored in a memory of the controller. In some embodiments, the requested fluid mixture includes ingredient modifications made to a selected predefined fluid mixture. In various embodiments, the user makes the ingredient modifications using the user interface.

In some embodiments, user selection of a predefined fluid mixture and any subsequent modifications are made on a computer (e.g., smart phone, tablet, etc.), distinct from the controller of the fluid mixture dispensing system, that is capable of sending the request to the fluid mixture dispensing system, such as over a network.

In some embodiments, the library of predefined fluid mixtures is a library containing a list of components (e.g., chemical compounds, such as ingredients and/or solvents) and corresponding amounts of each component for each predefined fluid mixture in the library. The list of components and corresponding amounts of each component for each predefined fluid mixture can be obtained from prior chemical analysis of the predefined fluid mixture. For example, a glass of Chardonnay with a particular recognizable style or variety can be defined by a constituent list of certain amounts of chemical components (such as acids, sugar solutions, etc.) that are mixed into a larger mixture of water and ethanol to form the glass of Chardonnay. The number of unique combinations of components can be unbounded. Thus, any particular fluid mixture (e.g., wine, soda, perfume, etc.) is assembled from a defined list of components and corresponding amounts of each component, such as from a chemical analysis of a desired fluid mixture. In some embodiments, the systems disclosed herein accept the predefined fluid mixture information (i.e., a recipe for each of the predefined fluid mixtures) digitally and then translate that information into a control process (e.g., control of mechanical/electromechanical valves and/or pumps) that dispenses the list of components in the corresponding amounts to form the requested fluid mixture. In various embodiments, the recipe for a predefined fluid mixture includes additional control information, such as a sequencing of operations, a description of one or more fluid paths to be used, temperature requirements, and/or control of other parts of the fluid dispensing system as required to prepare the predefined fluid mixture.

At block 104 of FIG. 1, in some embodiments, in response to receiving the request for the fluid mixture, the system optionally and/or selectively is configured to control one or more of the following: (1) flow a predetermined amount of at least one solvent from at least one solvent reservoir (e.g., a predetermined amount of water from a water reservoir and/or a predetermined amount of alcohol from an alcohol reservoir) and flow a predetermined amount of at least one ingredient from a plurality of ingredient reservoirs to at least one mixing channel to form an intermediate fluid mixture; (2) flow a predetermined amount of at least one solvent from at least one solvent reservoir (e.g., water from a water reservoir and/or alcohol from an alcohol mixture) to a mixing chamber; (3) flow a predetermined amount of at least one solvent from at least one solvent reservoir (e.g., a predetermined amount of water from a water reservoir and/or a predetermined amount of alcohol from an alcohol reservoir) and flow a predetermined amount of at least one ingredient from at least one ingredient reservoir to at least one dissolution chamber to form an intermediate fluid mixture; (4) flow a predetermined amount of at least one ingredient from at least one ingredient reservoir to the mixing chamber; and (5) flow intermediate fluid mixtures, if any, to the mixing chamber. Examples of fluid paths used in block 104 are illustrated throughout FIGS. 11 and 12.

Figure 11:
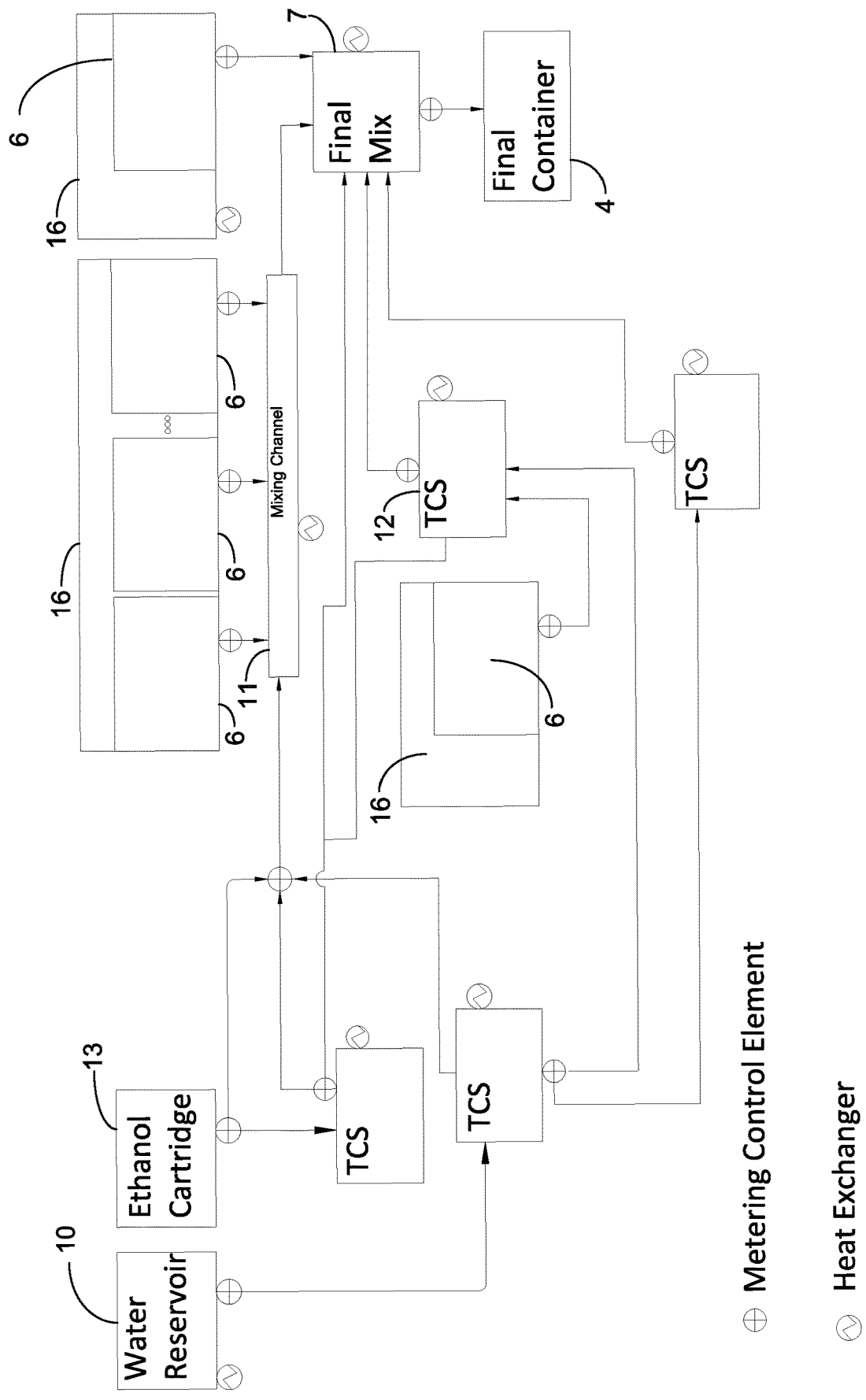
FIG. 11 illustrates an example system flow diagram of a fluid mixture system, in accordance with some embodiments.
Figure 12:
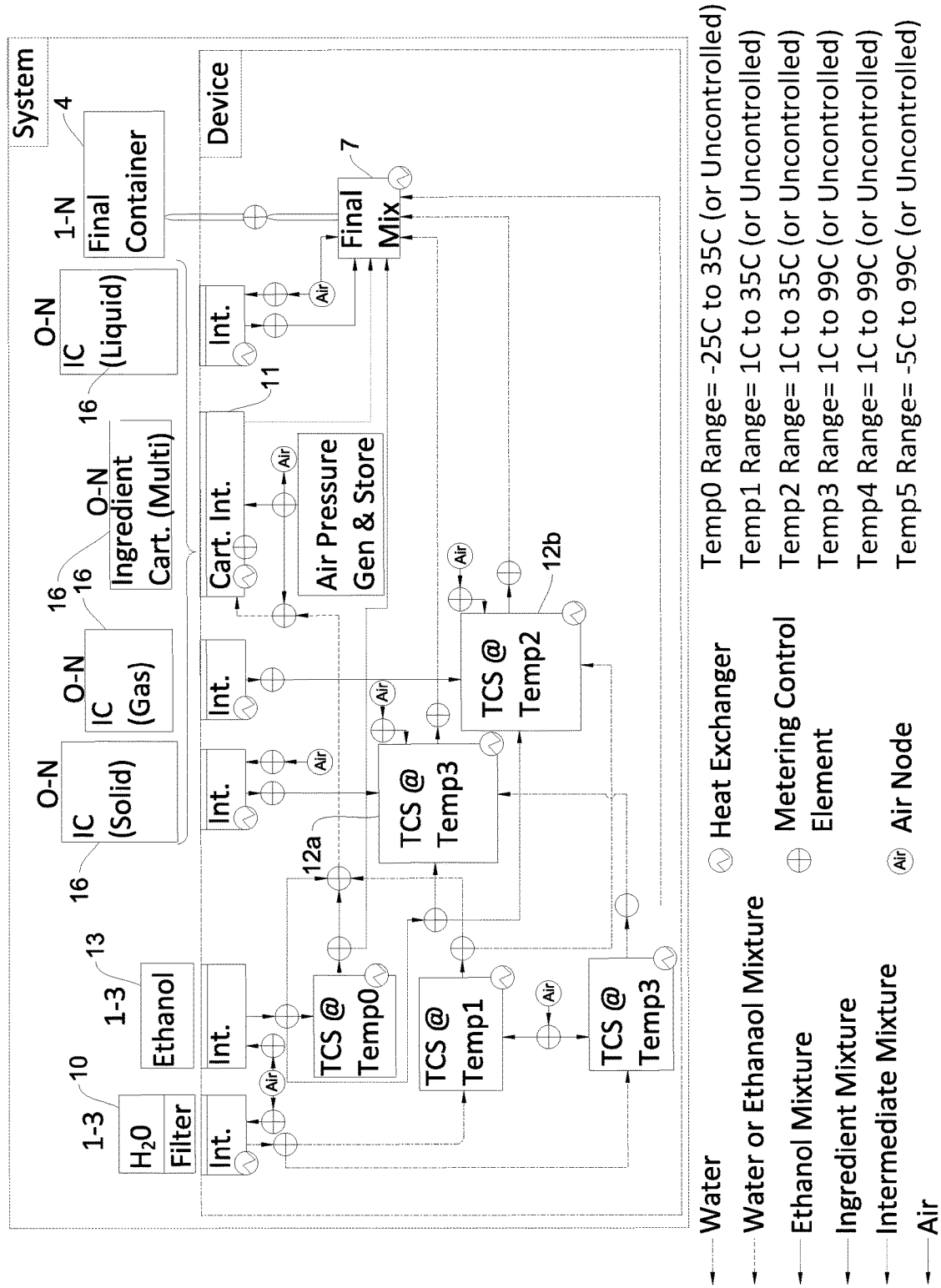
FIG. 12 illustrates another example system flow diagram of a fluid mixture system, in accordance with some embodiments.

FIGS. 11 and 12 illustrate example system flow diagrams of a fluid mixture dispensing system, according to various embodiments. In FIGS. 11 and 12, each heat exchanger is optionally included in a given system. When included, each one of the heat exchangers is able to selectively adjust the temperature (e.g., of what is flowing through it and/or what is attached to it) up or down. In various embodiments, the metering control element sets in FIGS. 11 and 12 include at least one of a valve, an electromotive element (e.g., a solenoid), a pump, a pressure sensor, a temperature sensor, a flow sensor, a mechanical component (e.g., a tee, a check valve, etc.), and/or any other control, routing, or sensor component used in fluid dispensing systems.

Figure 8:
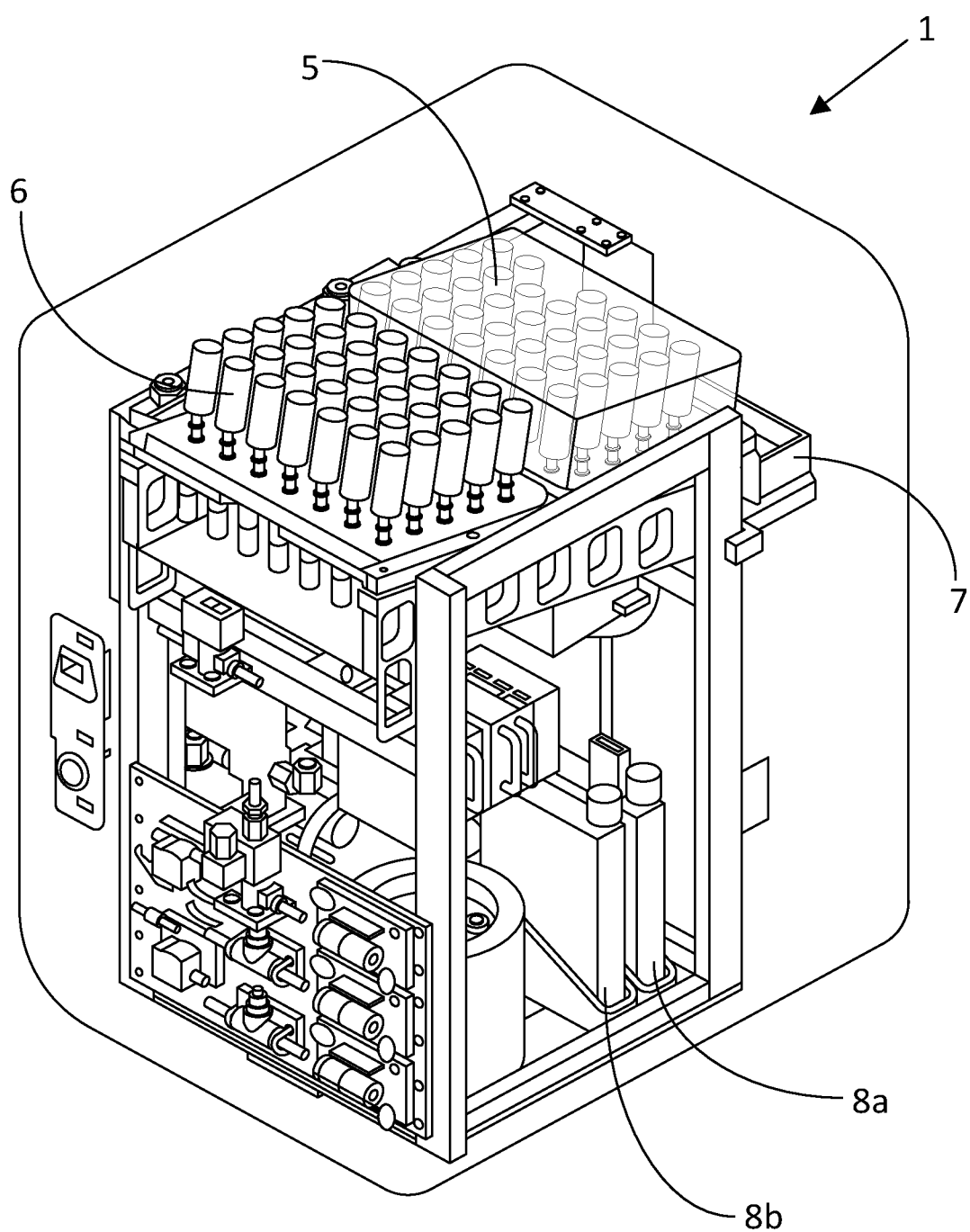
FIG. 8 illustrates an example of a rear view of a fluid mixture system with a transparent casing, in accordance with some embodiments.

In some embodiments, the system includes at least one solvent reservoir containing at least one solvent. In some embodiments, the at least one solvent comprises water, alcohol, ethyl lactate, and/or propylene glycol. The at least one solvent reservoir supplies the at least one solvent to the fluid mixture to be dispensed. For example, solvent reservoirs 8a (e.g., containing water) and 8b (e.g., containing alcohol) are illustrated in FIG. 8, and FIGS. 11 and 12 illustrate water reservoir 10. In some embodiments, the system includes a plurality of solvent reservoirs (e.g., one or multiple water reservoirs, one or multiple alcohol reservoirs, one or multiple propylene glycol reservoirs, one or multiple ethyl lactate reservoirs, and/or combinations of the foregoing, among other variations and/or types of solvent reservoirs). In various embodiments, any one of the at least one solvent in the at least one solvent reservoir is optionally and/or selectively diluted. For example, an alcohol reservoir contains 95% alcohol, not 100% alcohol. In some embodiments, a water reservoir or water inlet optionally includes or is fluidly connected to a water filter that is able to remove impurities from the water prior to flowing the water to other parts of the system (e.g., to a mixing chamber).

In some embodiments, the at least one solvent reservoir supplies solvent (e.g., any one or more of the at least one solvent) to the fluid mixture to be dispensed. For example, a water reservoir is able to supply water to the fluid mixture to be dispensed. In some embodiments, a solvent reservoir comprises a solvent container housed within the fluid mixture dispensing system to supply one or more solvents to the system. The one or more solvents are able to be used to dissolve or carry various ingredients to form the requested fluid mixture. In some embodiments, in response to receiving a request for a fluid mixture, the system (e.g., via a controller of the system controlling pumps and/or valves) flows a predetermined amount of at least one solvent from at least one solvent reservoir to at least one mixing channel to form an intermediate fluid mixture.

In some embodiments, a water reservoir comprises a water container housed within the fluid mixture dispensing system. In other embodiments, the water reservoir is a standard water outlet such as a faucet or water line that is connected to a water inlet of the fluid mixture dispensing system to supply water to the system. In some embodiments and/or usage scenarios, water is optionally and/or selectively used as a solvent to dissolve various ingredients to form a requested fluid mixture. In some embodiments, in response to receiving a request for a fluid mixture, the system flows a predetermined amount of water from a water reservoir to at least one mixing channel to form an intermediate fluid mixture. An example of this is illustrated in FIGS. 11 and 12, where, in some embodiments and/or usage scenarios, a predetermined amount of water flows to mixing channel 11. The predetermined amount of water is optionally and/or selectively mixed with alcohol from an alcohol reservoir (e.g., in ethanol cartridge 13) and/or ingredients from a plurality of ingredient reservoirs in mixing channel 11 to form an intermediate fluid mixture before flowing to final mixing chamber 7.

In some embodiments, in response to receiving a request for a fluid mixture, the system flows a predetermined amount of at least one solvent from at least one solvent reservoir to a mixing chamber. In some embodiments, in response to receiving the request for the fluid mixture, the system optionally and/or selectively flows a predetermined amount of water from a water reservoir to the mixing chamber. An example of this is illustrated in FIGS. 11 and 12, where, in some embodiments, a predetermined amount of water from water reservoir 10 is able to flow to final mixing chamber 7. Accordingly, the final mixing chamber is optionally and/or selectively fluidly connected to a water reservoir.

In some embodiments, the system includes at least one dissolution chamber (e.g., dissolution chamber 12 as illustrated in FIG. 11) to dissolve particular solid and/or gaseous ingredients before mixing in a mixing chamber, such as with other ingredients and/or solvents. In these embodiments, the controller is configured (according to a recipe) to optionally and/or selectively dispense a predetermined amount of at least one ingredient into the dissolution chamber for dissolution prior to the predetermined amount of the at least one ingredient entering the mixing chamber.

In some embodiments, in response to receiving a request for a fluid mixture, the system optionally and/or selectively flows a predetermined amount of at least one solvent from at least one solvent reservoir to a dissolution chamber to form an intermediate fluid mixture. In various embodiments, the at least one solvent reservoir is optionally and/or selectively fluidly connected to the dissolution chamber, and the dissolution chamber is optionally and/or selectively fluidly connected to a mixing chamber. In some embodiments, the system optionally and/or selectively flows a predetermined amount of at least one solvent from at least one solvent reservoir to a gas dissolution chamber for dissolving a gaseous ingredient, and optionally and/or selectively flows the gas-dissolved intermediate fluid mixture to a mixing chamber. In some embodiments, the system optionally and/or selectively flows a predetermined amount of at least one solvent from at least one solvent reservoir to a solid dissolution chamber for dissolving a solid ingredient, and optionally and/or selectively flows the solid-dissolved intermediate fluid mixture to a mixing chamber.

In some embodiments, in response to receiving a request for a fluid mixture, the system optionally and/or selectively flows a predetermined amount of water from a water reservoir to a dissolution chamber to form an intermediate fluid mixture. In various embodiments, the water reservoir is optionally and/or selectively fluidly connected to the dissolution chamber, and the dissolution chamber is optionally and/or selectively fluidly connected to a mixing chamber. FIG. 11 illustrates dissolution chamber 12, and FIG. 12 illustrates solid dissolution chamber 12a and gas dissolution chamber 12b. In various embodiments, the gases include nitrogen and/or carbon dioxide. In some embodiments, the system optionally and/or selectively flows a predetermined amount of water from a water reservoir to a gas dissolution chamber for dissolving a gaseous ingredient, and optionally and/or selectively flows the gas-dissolved intermediate fluid mixture to a mixing chamber. In some embodiments, the system optionally and/or selectively flows a predetermined amount of water from a water reservoir to a solid dissolution chamber for dissolving a solid ingredient, and optionally and/or selectively flows the solid-dissolved intermediate fluid mixture to a mixing chamber.

In some embodiments, a predetermined amount of at least one solvent is according to the requested fluid mixture. In other words, predetermined amount(s) of solvent(s) that, in total, are flowed to a final mixing chamber, whether directly flowed or in one or more intermediate fluid mixtures, correspond to amount(s) of the solvent(s) required to dispense the requested fluid mixture (e.g., a fluid mixture selected form the library of predefined fluid mixtures). In some embodiments, the predetermined amount of the at least one solvent flows from a solvent reservoir throughout the system via at least one pump.

In some embodiments, a predetermined amount of water is according to the requested fluid mixture. In other words, a predetermined amount of water that, in total, is flowed to a final mixing chamber, whether directly flowed or in one or more intermediate fluid mixtures, corresponds to a required amount of water in the requested fluid mixture (e.g., a fluid mixture selected from the library of predefined fluid mixtures). For example, if a glass of Chardonnay is selected and the predefined formula for Chardonnay calls for a total of 50 mL of water from the water reservoir, the system flows 50 mL of water to the final mixing chamber to be incorporated into the Chardonnay. In some embodiments, the predetermined amount of water flows from a water reservoir throughout the system via at least one pump.

In some embodiments, the system is configured to monitor an amount of at least one solvent in at least one solvent reservoir. For example, this is accomplished, in some embodiments, by various sensors and/or by tracking an amount of the at least one solvent that has been dispensed. When an amount of a solvent in a solvent reservoir is below a specified threshold, the system optionally and/or selectively notifies the user (e.g., via the user interface) that the solvent reservoir should be refilled or replaced. In some embodiments, the system is configured to monitor an amount of water in a water reservoir.

Figure 10:
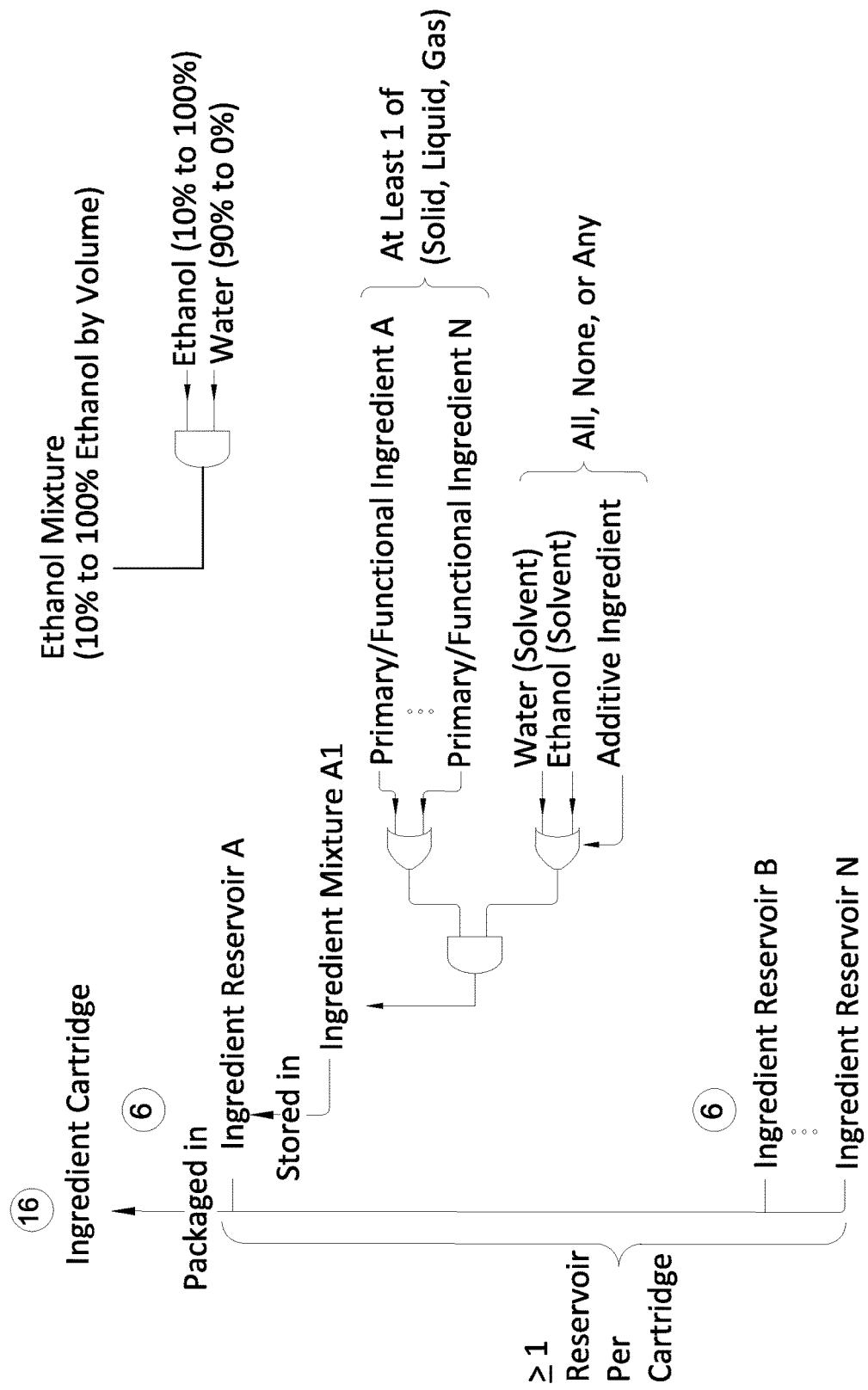
FIG. 10 illustrates an example of how an ingredient cartridge, an ingredient reservoir, and an ingredient mixture can be defined, in accordance with some embodiments.

In some embodiments, the system includes, in addition to one or more water reservoirs (such as water reservoir 10 illustrated in FIGS. 11 and 12), one or more other solvent reservoirs, such as a second solvent reservoir 8b (as illustrated in FIG. 8), or such as an alcohol reservoir in ethanol cartridge 13 (as illustrated in FIGS. 11 and 12). In some embodiments, the system includes a plurality of alcohol reservoirs. Any one or more of the alcohol reservoirs is able to supply alcohol to the fluid mixture to be dispensed. As stated above, the solvents in the solvent reservoirs comprise one or more of alcohol (e.g., ethanol), water, ethyl lactate, propylene glycol, and/or a wide variety of other alcohols and/or other solvents and their various combinations. As illustrated in FIG. 10, in various embodiments, alcohol in the alcohol reservoir is an alcohol mixture. In some embodiments, the alcohol mixture includes alcohol and water. For example, FIG. 10 illustrates that an alcohol solvent can be an alcohol mixture of 10-100% alcohol by volume with 0-90% of water by volume.

In some embodiments, an alcohol reservoir comprises an alcohol container housed within the fluid mixture dispensing system. Besides supplying alcohol to a fluid mixture, in various embodiments, alcohol is optionally and/or selectively used to dissolve various other ingredients to form an intermediate fluid mixture as part of a requested fluid mixture.

In some embodiments, in response to receiving a request for a fluid mixture, the system flows a predetermined amount of alcohol from an alcohol reservoir to at least one mixing channel to form an intermediate fluid mixture. An example of this is illustrated in FIGS. 11 and 12, where in some embodiments, a predetermined amount of alcohol optionally and/or selectively flows to mixing channel 11. The predetermined amount of alcohol is optionally and/or selectively mixed with water from a water reservoir and/or ingredients from a plurality of ingredient reservoirs in the at least one mixing channel to form an intermediate fluid mixture before flowing to a mixing chamber. In some embodiments, the water and the alcohol are mixed prior to entering the at least one mixing channel.

In some embodiments, in response to receiving a request for a fluid mixture, the system flows a predetermined amount of alcohol from an alcohol reservoir to a mixing chamber. An example of this is illustrated in FIGS. 11 and 12, where in some embodiments, a predetermined amount of alcohol from an alcohol reservoir (in ethanol cartridge 13) optionally and/or selectively flows to final mixing chamber 7. Accordingly, the final mixing chamber is optionally and/or selectively fluidly connected to an alcohol reservoir.

In some embodiments, in response to receiving a request for a fluid mixture, the system flows a predetermined amount of alcohol from an alcohol reservoir to a dissolution chamber to form an intermediate fluid mixture. In various embodiments, an alcohol reservoir is optionally and/or selectively fluidly connected to the dissolution chamber, and the dissolution chamber is optionally and/or selectively fluidly connected to a mixing chamber. FIG. 11 illustrates dissolution chamber 12, and FIG. 12 illustrates solid dissolution chamber 12a and gas dissolution chamber 12b. A solid dissolution chamber is configured to dissolve at least one solid ingredient (e.g., sugar) from at least one ingredient reservoir in a solvent (e.g., alcohol and/or water). A gas dissolution chamber is configured to dissolve at least one gaseous ingredient from at least one ingredient reservoir in a solvent (e.g., alcohol and/or water). In some embodiments, the system optionally and/or selectively flows a predetermined amount of alcohol from an alcohol reservoir to a gas dissolution chamber for dissolving a gaseous ingredient, and optionally and/or selectively flows the gas-dissolved intermediate fluid mixture to a mixing chamber. In some embodiments, the system optionally and/or selectively flows a predetermined amount of alcohol from an alcohol reservoir to a solid dissolution chamber for dissolving a solid ingredient, and optionally and/or selectively flows the solid-dissolved intermediate fluid mixture to a mixing chamber.

In some embodiments, a predetermined amount of alcohol is according to the requested fluid mixture. In other words, a predetermined amount of alcohol that, in total, flows to a final mixing chamber, whether directly or in one or more intermediate fluid mixtures, corresponds to a required amount of alcohol in the requested fluid mixture (e.g., a fluid mixture selected from the library of predefined fluid mixtures). For example, if a glass of Chardonnay is selected and the predefined formula for Chardonnay has 14% alcohol by volume, the system flows a predetermined amount of ethanol to the final mixing chamber to be incorporated such that the Chardonnay has 14% alcohol by volume (based on volume of the other solvents and/or ingredients) of the final dispensed fluid mixture. In some embodiments, the predetermined amount of alcohol flows from an alcohol reservoir throughout the system via at least one pump. In some embodiments, the system is configured to monitor an amount of alcohol in an alcohol reservoir.

In some embodiments, the system includes ingredient reservoirs 6 (as illustrated, for example, in FIGS. 2B, 3, 4B, 7, and 8). An ingredient reservoir includes an "ingredient," also referred to herein as an "ingredient mixture" to emphasize that the ingredient optionally comprises one or more components. As illustrated in FIG. 10, in some embodiments, an ingredient mixture includes at least one primary/functional ingredient. A primary/functional ingredient is at least one of a solid, a liquid, or a gas. One example of a primary/functional ingredient is a chemical compound. Use of the word "primary" does not require that a primary/functional ingredient is a component of an ingredient mixture present in a largest amount or concentration compared to other components of the ingredient mixture. For example, some primary/functional ingredients, such as capsaicin, are diluted with many times their volume of a solvent, such as water, to form an ingredient mixture. In some embodiments, a primary/functional ingredient includes: glycerine (glycerol), fructose, glucose, lactic acid, malic acid, tartaric acid, potassium phosphate tribasic, sucrose, potassium sulfate, succinic acid, acetic acid, citric acid, tricalcium phosphate, magnesium hydroxide, 3-methylbutan-1-ol, sodium phosphate dibasic, propanol, starter distillate 9x, ethyl acetate, 2-methylbutan-1-ol, 2-methylpropan-1-ol, 2-phenylethanol, oxolan-2-one, iron sulfate heptahydrate, octanoic acid, hexanoic acid, 3-methylbutyl acetate, decanoic acid, hexan-1-ol, ethyl octanoate, furan-2-ylmethanol, ethyl hexanoate, 2-methylpropanoic acid, furan-2-carbaldehyde, ethyl butanoate, 2,6-dimethoxyphenol, ethyl decanoate, hexyl acetate, 2-phenyl ethyl acetate, 3-methylsulfanylpropan-1-ol, ethyl propionate, butan-1-ol, 4-hydroxy-3-methoxybenzaldehyde, 5-methylfuran-2-carbaldehyde, isobutyl acetate, 5-pentyloxolan-2-one, ethyl 2-methylpropanoate, 5-butyl-4-methyloxolan-2-one, 2-methoxy-4-methylphenol, 2-methoxy-4-prop-2-enylphenol, 2-methyoxyphenol, and/or coloring agents. In various embodiments, a primary/functional ingredient includes one or more other components, compounds, or chemicals used in the production of beverages, perfumes, detergents, cleansers, or other fluid mixtures.

In some embodiments, an ingredient mixture includes respective concentrations of one or more chemical compounds. In some embodiments, an ingredient mixture includes at least one solvent. In various embodiments, the at least one solvent is any solvent or combination of solvents disclosed herein. For example, an ingredient mixture in an ingredient reservoir is a mixture of citric acid (primary/functional ingredient) and water at a particular concentration. Another example ingredient mixture is a mixture of potassium sulfate (primary/functional ingredient), water, and ethanol. As described herein, one or more ingredient mixtures are optionally and/or selectively dispensed into a fluid stream (a single solvent, or a mixture of one or more solvents, e.g., water and/or ethanol) and combined together to form an intermediate fluid mixture.

In some embodiments, an ingredient mixture includes at least one of a solvent (e.g., water and/or an alcohol) and an additive ingredient. In various embodiments, an additive ingredient is at least one of a surfactant, a preservative, and/or an emulsifier/stabilizer. Examples of surfactants include anionic surfactants (e.g., sodium lauryl sulfate and/or sodium laureth sulfate, among others), and nonionic surfactants (e.g., cocamide monoethanolamine and/or cocamide diethanolamine, among others). Examples of preservatives include sodium benzoate and/or citric acid, among others. Examples of emulsifiers/stabilizers include gellan gum and/or guar gum, among others.

In some embodiments, an ingredient is stored in respective one of a plurality of ingredient reservoirs, such as ingredient reservoirs 6 as illustrated in FIGS. 2B, 3, 4B, 7 and 8. According to various embodiments, each of the ingredient reservoirs is of one or more types, such as: a bladder bag (e.g., 6B as illustrated in FIG. 5A); a syringe (e.g., 6A as illustrated in FIG. 5A); a gravity dispense chamber; a pellet dispenser; a pierceable volume; and any other container used for a solid (including crystalline, powdered, or other forms of a solid), a liquid, or a gas. In some embodiments, all of the ingredient reservoirs are of the same type. In other embodiments, the ingredient reservoirs are of two or more types. In further embodiments, an ingredient cartridge contains two or more types of ingredient reservoirs. In some embodiments, the system includes a plurality of ingredient reservoirs. In other embodiments, the system includes solely a single ingredient reservoir. According to various embodiments, ingredient reservoirs are of one or more sizes, such as (for liquid volume measurements) one ounce, two ounces, four ounces, eight ounces, 16 ounces, 32 ounces, or any other size. In some embodiments, all of the ingredient reservoirs in an ingredient cartridge are of a same size; in other embodiments, an ingredient cartridge contains ingredient reservoirs of two or more sizes, such as a small (e.g., one ounce or two ounce), a medium (e.g., four ounce or eight ounce), and a large (e.g., 16 ounce or 32 ounce) size. For example, a size of a particular ingredient reservoir is selected according to expected requirements for the ingredient in the particular ingredient reservoir. In various embodiments, two or more ingredient reservoirs in a same ingredient cartridge contain the same ingredient.

In some embodiments, in response to receiving a request for a fluid mixture, the system flows a predetermined amount of at least one ingredient from a plurality of ingredient reservoirs to at least one mixing channel to form an intermediate fluid mixture. An example of this is illustrated in FIG. 11, where, in some embodiments, a predetermined amount of at least one ingredient selectively flows from one or more ingredient reservoirs 6 to mixing channel 11. The predetermined amount of the at least one ingredient is mixed with at least one solvent (e.g., water from a water reservoir and/or alcohol from an alcohol reservoir) in mixing channel 11 before flowing to final mixing chamber 7. The at least one solvent is able to dissolve the at least one ingredient and/or to carry the at least one ingredient to the final mixing chamber.

In some embodiments, in response to receiving a request for a fluid mixture, the system flows a predetermined amount of at least one ingredient from at least one ingredient reservoir to a mixing chamber. An example of this is illustrated in FIG. 11, where in some embodiments, a predetermined amount of at least one ingredient from one or more ingredient reservoirs 6 selectively flows to final mixing chamber 7. As illustrated, at least one ingredient reservoir is fluidly connected to a mixing chamber (such as the final mixing chamber). The at least one ingredient reservoir that is configured to flow an ingredient directly to the mixing chamber is optionally and/or selectively not one of the ingredient reservoirs that is fluidly connected to a mixing channel, such as mixing channel 11 as illustrated in FIGS. 11 and 12.

In some embodiments, in response to receiving a request for a fluid mixture, the system flows a predetermined amount of at least one ingredient from at least one ingredient reservoir to a dissolution chamber to form an intermediate fluid mixture. In further embodiments, at least one ingredient reservoir is fluidly connected to the dissolution chamber, and the dissolution chamber is fluidly connected to a mixing chamber. FIG. 11 illustrates a dissolution chamber 12, and FIG. 12 illustrates solid dissolution chamber 12a and gas dissolution chamber 12b. A solid dissolution chamber is configured to dissolve at least one solid ingredient (e.g., solid citric acid) from at least one ingredient reservoir in solvent (e.g., alcohol and/or water). A gas dissolution chamber is configured to dissolve at least one gaseous ingredient (e.g., $CO_2$) from at least one ingredient reservoir in solvent (e.g., water). In some embodiments, the at least one ingredient reservoir that is configured to flow an ingredient to the dissolution chamber is optionally and/or selectively not one of the ingredient reservoirs that is fluidly connected to a mixing channel, such as mixing channel 11 as illustrated in FIGS. 11 and 12. After the at least one ingredient is dissolved in solvent in the dissolution chamber, the dissolved intermediate fluid mixture flows to a mixing chamber, such as final mixing chamber 7 as illustrated in FIGS. 11 and 12.

In some embodiments, predetermined amount(s) of the ingredient(s) are according to the requested fluid mixture. In other words, the predetermined amount(s) of the ingredient(s) that, in total, are flowed to the final mixing chamber, whether flowed directly or in one or more intermediate mixtures, correspond to required amount(s) of the ingredient(s) in the requested fluid mixture (e.g., a fluid mixture selected form from the library of predefined fluid mixtures).

In some embodiments, the system is configured to monitor an amount of an ingredient in an ingredient reservoir. For example, this is accomplished, in some embodiments, by various sensors and/or by tracking an amount of the ingredient that has been dispensed. When an amount of an ingredient in an ingredient reservoir is below a specified threshold, the system optionally and/or selectively notifies the user (e.g., via the user interface) that the ingredient reservoir needs to be refilled or replaced. In some embodiments, this includes replacing a cartridge that stores the ingredient reservoir as explained in more detail below.

In some embodiments, a predetermined amount of an ingredient from an ingredient reservoir is configured to be dispensed via at least one pump, such as a microfluidic pump, into a mixing channel, a mixing chamber, and/or a dissolution chamber. In some embodiments, each ingredient reservoir is fluidly connected to a respective microfluidic pump for dispensing an ingredient in the ingredient reservoir to a mixing channel, a mixing chamber, and/or a dissolution chamber. In some embodiments, multiple ingredient reservoirs are fluidly connected to a single microfluidic pump for dispensing ingredients from the ingredient reservoirs.

Figure 7:
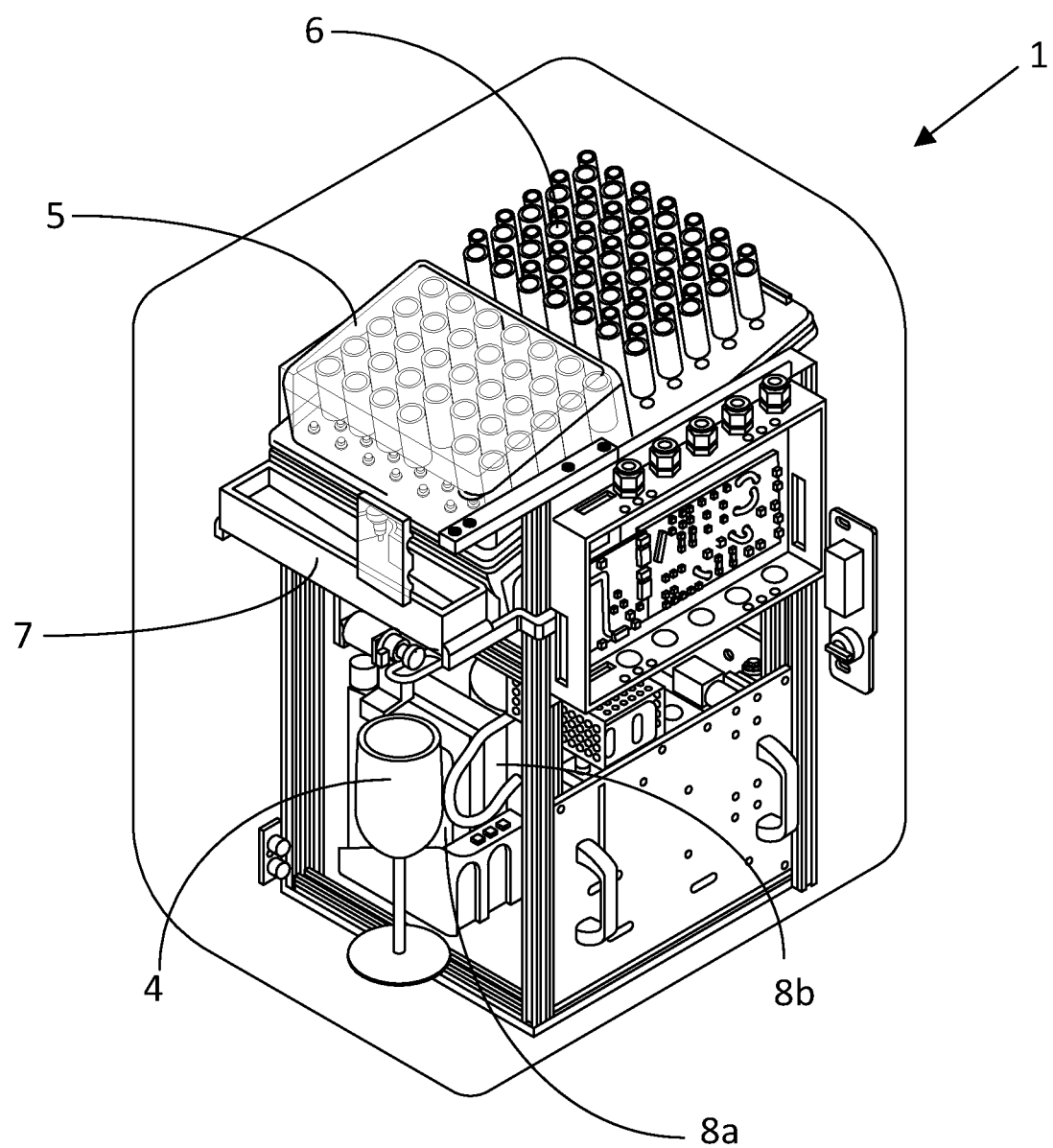
FIG. 7 illustrates a view of an example of a front view of a fluid mixture system with a transparent casing, in accordance with some embodiments.

In some embodiments, at least one ingredient reservoir is packaged in an ingredient cartridge, illustrated as ingredient cartridge 5 in FIGS. 7 and 8, or ingredient cartridge 16 in FIGS. 10, 11, and 12. In some embodiments, the system includes at least one ingredient cartridge. In further embodiments, the system includes two or more ingredient cartridges, and each of the two or more ingredient cartridges is of any type: a solid ingredient cartridge; a liquid ingredient cartridge; a gaseous ingredient cartridge; or a multi-ingredient cartridge. For example, FIG. 12 illustrates at least one of 0 to N solid ingredient cartridges, 0 to N gaseous ingredient cartridges, 0 to N multi-ingredient cartridges, and 0 to N liquid ingredient cartridges. In some embodiments, an ingredient cartridge includes a plurality of ingredient reservoirs. In further embodiments, an ingredient cartridge, such as a multi-ingredient cartridge, includes two or more of: an ingredient reservoir for solid ingredients; an ingredient reservoir for liquid ingredients; and an ingredient reservoir for gaseous ingredients.

In some embodiments, at least one ingredient cartridge is configured to dispense a predetermined amount of at least one ingredient from at least one ingredient reservoir to a mixing channel, a mixing chamber, and/or a dissolution chamber. In some embodiments, the at least one ingredient cartridge is removably attached to the fluid mixture dispensing system so that the at least one ingredient cartridge is refillable, replaceable, serviceable, and/or recyclable. In some embodiments, the fluid mixture dispensing system is able to operate with an ingredient cartridge missing (e.g., not installed), partly empty (e.g., only some ingredient reservoirs empty), and/or (fully) empty.

In some embodiments, a predetermined amount of at least one ingredient in at least one ingredient reservoir is dispensed via at least one valve into a mixing channel, a mixing chamber, and/or a dissolution chamber. In some embodiments, each ingredient reservoir has a respective valve and a respective actuator (e.g., an electromechanical valve, such as a solenoid valve, has a valve portion and an actuator portion). In some embodiments, each respective valve is configured to enable and/or control a flow of a respective ingredient from an ingredient reservoir, via a respective orifice of the ingredient reservoir, to a mixing channel, a mixing chamber, and/or a dissolution chamber. For example, the respective valve, when closed, provides a respective seal over the respective orifice of the ingredient reservoir, and when opened, enables the flow of the respective ingredient from the ingredient reservoir. In various embodiments, the respective valve comprises a membrane (such as membrane 30 as illustrated in FIGS. 5B, 5C, 5D, and 5E) that forms the respective seal when pressed against the respective orifice, and that enables the respective ingredient to be dispensed when not pressed against the respective orifice.

In some embodiments, at least one ingredient cartridge is pressurizable and/or includes a respective pressurized chamber inside the at least one ingredient cartridge (e.g., a respective interior chamber). References herein to a pressurized chamber refer to this pressurized chamber of the ingredient cartridge, whether it is, in some embodiments, the ingredient cartridge itself, or whether it is, in other embodiments, an interior chamber of the ingredient cartridge. The pressurized chamber houses a plurality of ingredient reservoirs such that a pressure (e.g., a pressure of gas in the pressurized chamber) is applied to the ingredient reservoirs. FIG. 12, for example, illustrates air nodes of a pneumatic system ("Air Pressure Generation and Storage") supplying pressurized air to various types of cartridges. In some embodiments, the system is configured to monitor (such as with a pressure sensor) and/or to control the pressure in the pressurized chamber. In various embodiments, the pressurized chamber is pressurized such that when the respective valve of one of the ingredient reservoirs is opened, the ingredient stored in that ingredient reservoir flows (at least in part in response to the pressure) out of the ingredient reservoir towards a mixing channel, a mixing chamber, and/or a dissolution chamber. In further embodiments, the pressurized chamber is raised above a specified minimum pressure prior to when any of the respective valves of the ingredient reservoirs are opened.

In some embodiments, the pressurized chamber comprises a gas inlet, such as an open port (e.g., with an external valve not part of the pressurized chamber and/or of the cartridge) or a one-way valve, used to pressurize the pressurized chamber. In further embodiments, the pressurized chamber comprises a gas outlet valve to release pressure and/or to better regulate the pressure in the pressurized chamber. In various embodiments, the pressurized chamber is air-tight such that any leakage of gas from the pressurized chamber (such as via the respective valves of the ingredient reservoirs, via the gas inlet, and/or via the gas outlet valve) is one or more of: insignificant over a duration during which one or more of the ingredients are being dispensed; compensated for by a feedback system that monitors the pressure in the pressurized chamber and maintains the pressure within a margin (e.g., plus or minus one percent, a few percent, or five percent) of a desired pressure; and/or is accounted for in determining an amount of one or more ingredients that are being dispensed (e.g., by measuring the pressure continuously and/or by knowing the leakage rate, an effect of the change in pressure due to leakage on dispense rates is calculable).

According to various embodiments, a fluid-containing (e.g., liquid-containing) one of the ingredient reservoirs is one or more of: a "bag in a box" design; an "open-top" design; and any other design enabling a respective fluid to be dispensed from the fluid-containing ingredient reservoir via a respective valve in response to a pressure of gas in a pressurized chamber (of an ingredient cartridge) containing the fluid-containing ingredient reservoir. In some embodiments, each of the ingredient reservoirs is individually replaceable. In other embodiments, the ingredient reservoirs are a part of and/or are fixedly attached to the ingredient cartridge, and are not individually field-replaceable. In various embodiments, the "open-top" design, where the open top is part of the ingredient cartridge, is more reclaimable/reusable and/or recyclable than the "bag in a box" design.

In some embodiments, the "bag in a box" design of an ingredient reservoir comprises a rigid (or semi-rigid) structure that is open (e.g., open at or near an upper end) and is thus exposed to the pressure of gas in the pressurized chamber. The structure holds a sealed bag containing the respective fluid and has an opening at one end so that the respective fluid contained in the bag is dispensable through an orifice (of the sealed bag and/or of the structure) via the respective valve. In various embodiments, the structure of one of the ingredient reservoirs is shared at least in part with another of the ingredient reservoirs.

In some embodiments, the "open-top" design of an ingredient reservoir comprises a rigid (or semi-rigid) structure that is open at an upper end, that directly contains the respective fluid, and that has an orifice opposite the upper end to dispense the respective fluid contained in the structure via the respective valve. In further embodiments of the "open-top" design, the structure is composed of and/or lined with a chemically-resistant compound. In various embodiments, the structure of one of the ingredient reservoirs is shared at least in part with another of the ingredient reservoirs. In contrast with the "bag in a box" design, in some embodiments of the "open top" design, the respective fluid in individual ones of the fluid-containing ingredient reservoirs is retained via a gas-permeable membrane covering and/or affixed to the upper ends of the structures of a plurality of the fluid-containing ingredient reservoirs (e.g., a single, gas-permeable membrane for all of the fluid-containing ingredient reservoirs in the ingredient cartridge). The gas-permeable membrane enables the pressure of gas in the pressurized chamber to dispense the respective fluids in the fluid-containing ingredient reservoirs via the respective orifices (selectively controllable via the respective valves), and enables gas to replace a volume of fluid dispensed from the fluid-containing ingredient reservoirs. However, the gas-permeable membrane is not permeable to the respective fluids of the fluid-containing ingredient reservoirs and prevents the respective fluids from leaking out the open tops of the rigid (or semi-rigid) structure of the fluid-containing ingredient reservoirs. In various embodiments, the ingredient cartridge is initially filled with an inert gas, such as argon, to prevent any oxidation of the fluid in the fluid-containing ingredient reservoirs. In further embodiments, the inert gas is at atmospheric pressure (e.g., atmospheric pressure at some nominal altitude, such as at 500 feet or at 1000 feet). In other embodiments, the inert gas has a negative pressure (e.g., less than atmospheric pressure at some nominal altitude, such as 2500 feet or 5000 feet), in order to help ensure that gas pressure in the ingredient cartridge does not cause any of the fluid-containing ingredient reservoirs to dispense during shipping or handling.

In some embodiments, a mixing channel, the mixing chamber, and/or a dissolution chamber is fluidly connected to valve outputs of the ingredient reservoirs such that opening one of the respective valves results in the respective ingredient flowing to a mixing channel, a mixing chamber, and/or a dissolution chamber. In some embodiments, the controller is configured to control a flow of a predetermined amount to be dispensed of the respective ingredient from a particular one of the ingredient reservoirs by opening the respective valve of the particular ingredient reservoir for a time duration based on one or more of the pressure in the pressurized chamber, the physical flow characteristics (e.g., the viscosity, which may be temperature-dependent) of the respective ingredient in the particular ingredient reservoir, a diameter of an opening of the respective valve of the particular ingredient reservoir, and/or a size of the respective orifice of the particular ingredient reservoir. In various embodiments, the system is calibrated to dispense/flow a predetermined amount of the respective ingredient to a mixing channel, a mixing chamber, and/or a dissolution chamber based on the pressure in the pressurized chamber, the physical flow characteristics of the respective ingredient, a diameter of the opening of the respective valve and/or a diameter of the respective orifice. In some embodiments, a time duration that a valve is open proportionally corresponds to amounts/concentrations of at least one ingredient of a list of ingredients of a requested fluid mixture (e.g., as obtained from a chemical analysis of the components required to produce the requested fluid mixture).

In some embodiments, the respective ingredients stored in the ingredient reservoirs are ported to the respective valves of the ingredient reservoirs via the respective orifices. In some embodiments, the ingredient reservoirs (through the respective valves) are able to open to a mixing channel, such as mixing channel 11 as illustrated in FIGS. 11 and 12. In some embodiments, a plurality of ingredient reservoirs is fluidly connected to a single mixing channel. In various embodiments, one mixing channel is fluidly connected to one or more other mixing channels. In some embodiments, a first mixing channel is fluidly connected to a first plurality of ingredient reservoirs, and a second mixing channel is fluidly connected to a second plurality of ingredient reservoirs. For example, a first mixing channel is fluidly connected to five to 20 ingredient reservoirs, and a second mixing channel is fluidly connected to five to 20 of the same or of different ingredient reservoirs. In various embodiments, at least one solvent (e.g., water and/or ethanol) flows through a mixing channel and mixes with any ingredient dispensed into the mixing channel. In some embodiments, the at least one solvent is dispensed into the mixing channel in order to remove any leftover ingredients (e.g., to purge or flush the mixing channel). In various embodiments, the at least one solvent is dispensed into the mixing channel prior to dispensing any ingredients into the mixing channel to "wet" the mixing channel (e.g., to make it easier for subsequently dispensed ingredients to flow through the mixing channel).

Figure 3:
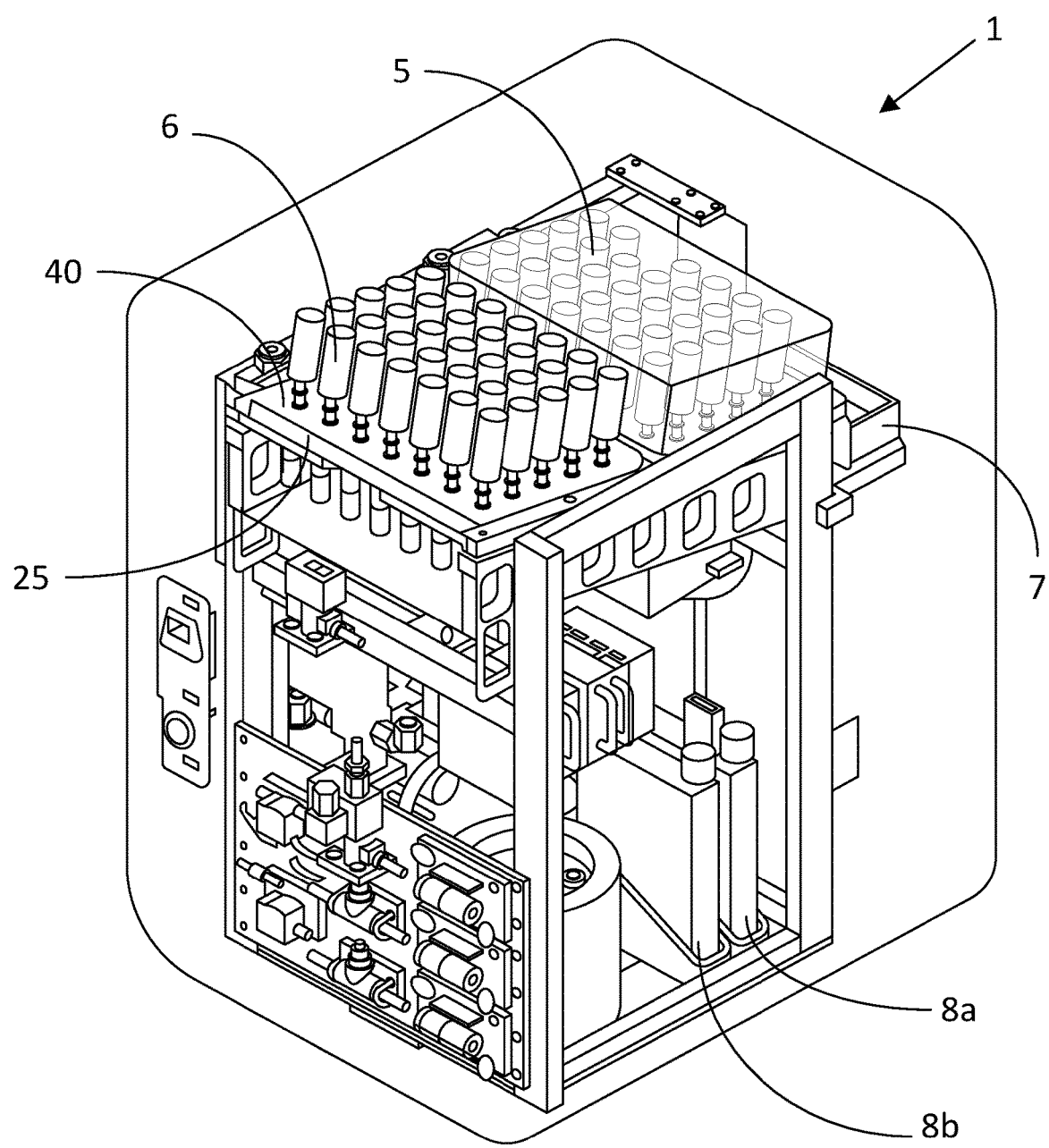
FIG. 3 illustrates an example of a fluid mixture system with a transparent casing having a water reservoir and an alcohol reservoir, in accordance with some embodiments.
Figure 4A:
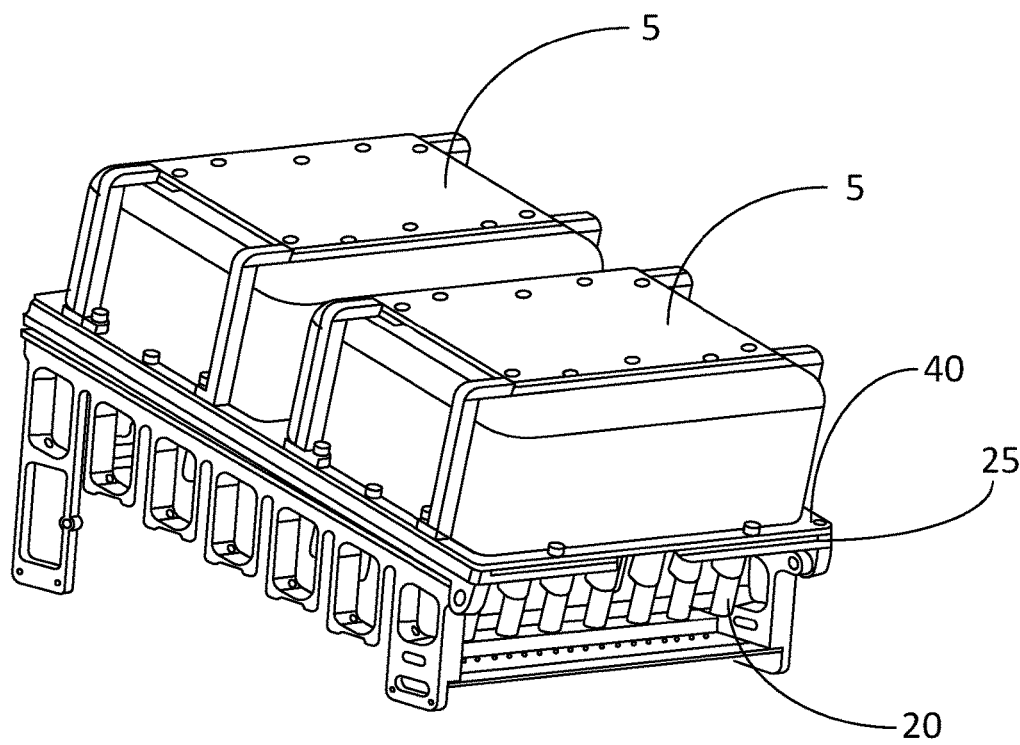
FIG. 4A illustrates an example of a multiple cartridges of a fluid mixture dispensing system, in accordance with some embodiments.
Figure 4B:
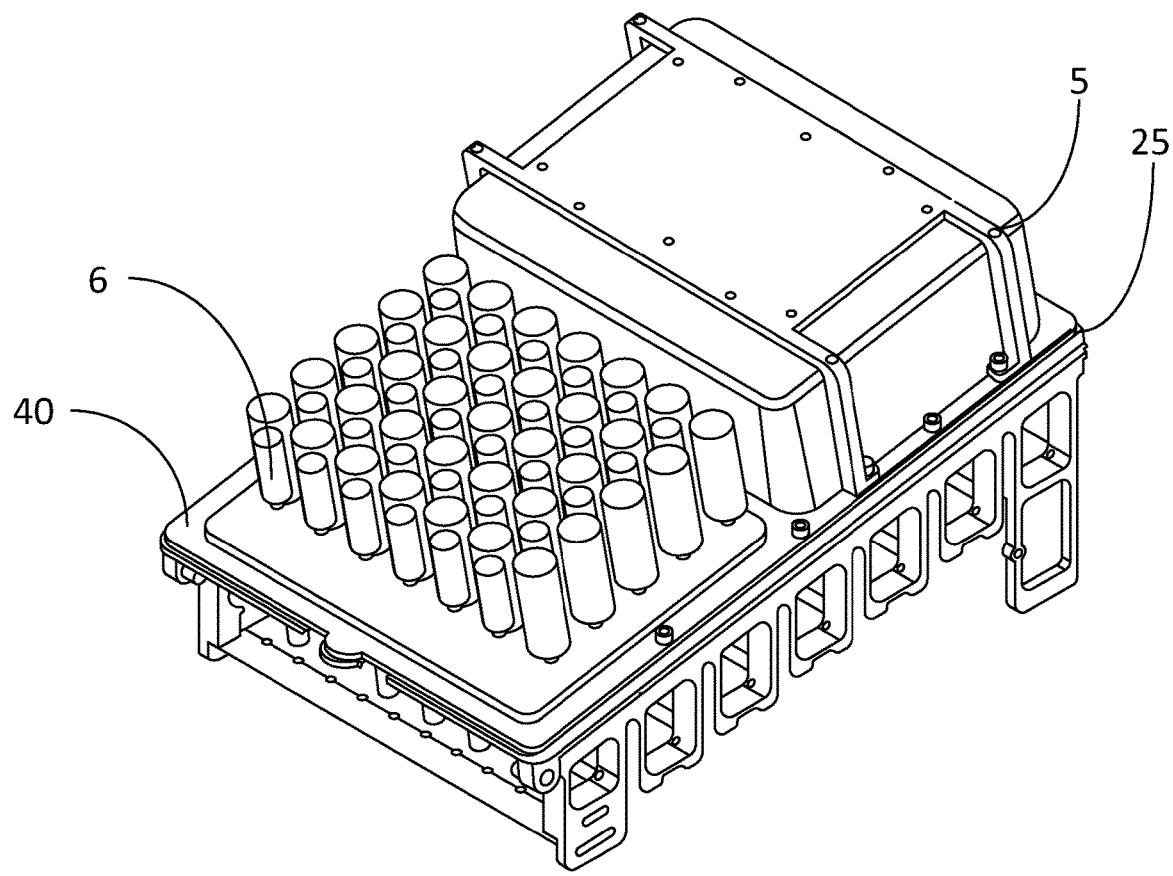
FIG. 4B illustrates an example of the inside of a cartridge of a fluid mixture dispensing system, in accordance with some embodiments.
Figure 5A:
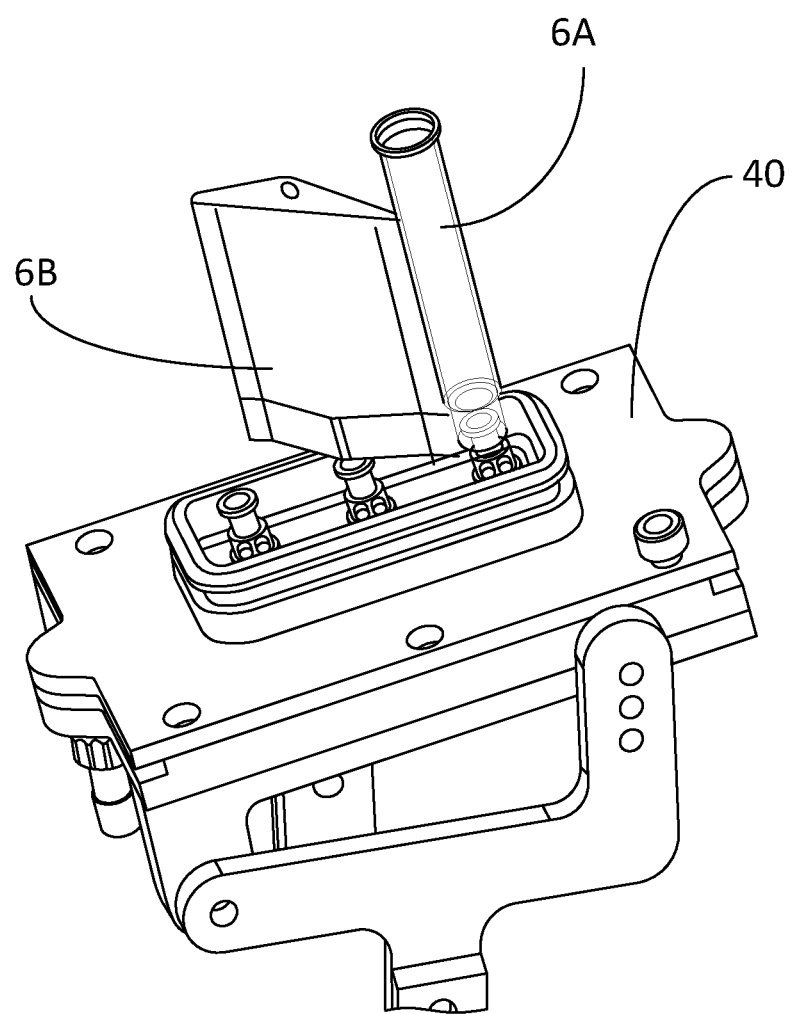
FIG. 5A illustrates an example of a simplified plurality of ingredient reservoirs of a fluid mixture dispensing system, in accordance with some embodiments.

In some embodiments, one or more mixing channels are formed into the bottom of a plate, such as plate 40 as illustrated in FIGS. 3, 4A and 4B. For example, the one or more mixing channels are formed by welding and/or brazing a structure onto a surface of the plate, by etching and/or carving the one or more mixing channels into a surface of the plate, and/or by other techniques to create the one or more mixing channels in or on a surface of the plate. All the one or more mixing channels are optionally and/or selectively fluidly connected to one or more solvent reservoirs and to a mixing chamber. For example, in some embodiments, solvent enters at least one mixing channel, and at least one ingredient from at least one ingredient reservoir flows into the at least one mixing channel to form an intermediate fluid mixture with the solvent which then flows to a mixing chamber.

Figure 5B:
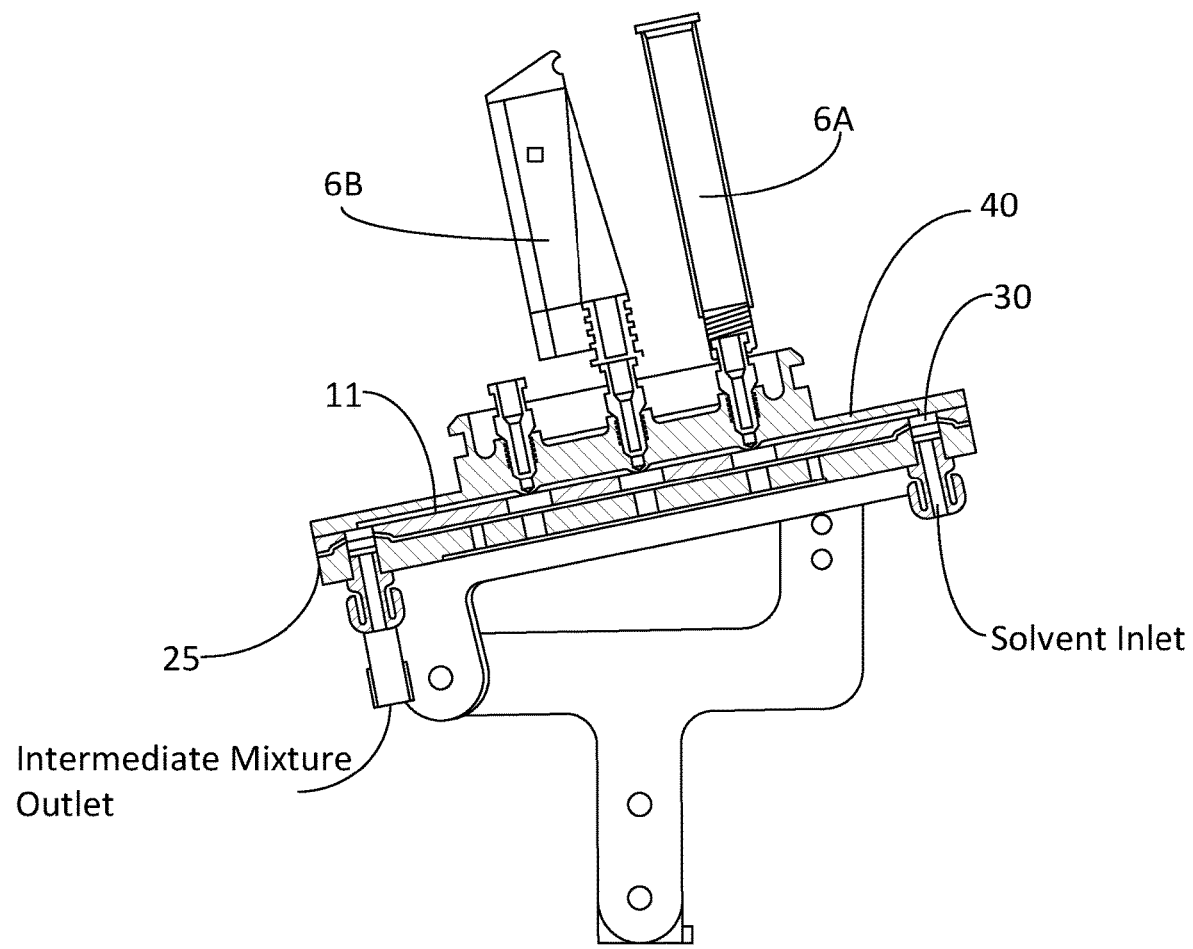
FIG. 5B illustrates an example of a cross section of the simplified plurality of ingredient reservoirs of the fluid mixture dispensing system of FIG. 5A, in accordance with some embodiments.
Figure 5C:
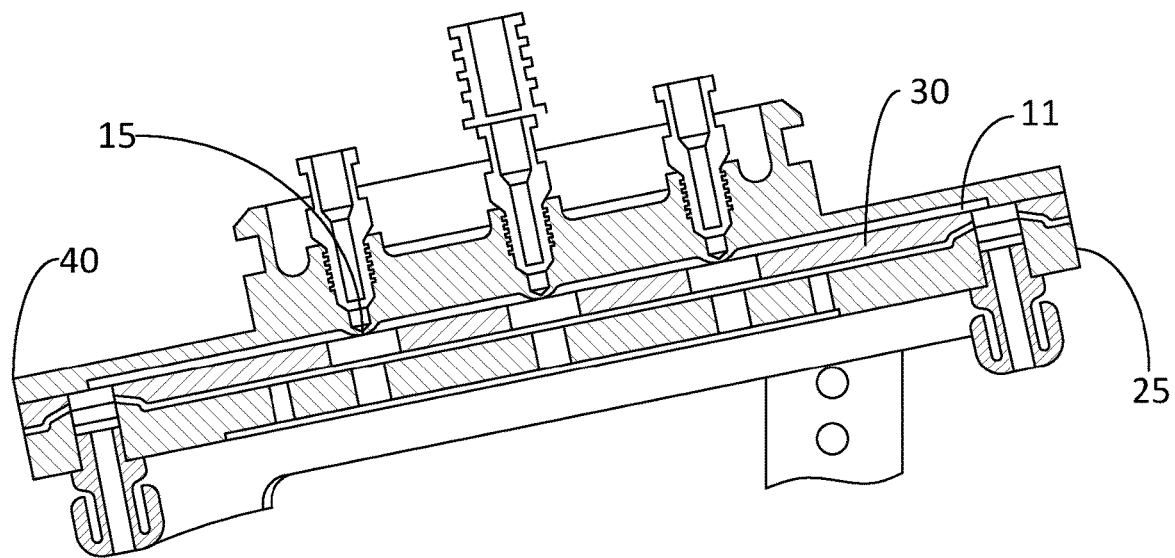
FIG. 5C illustrates a magnified version of FIG. 5B, in accordance with some embodiments.
Figure 5D:
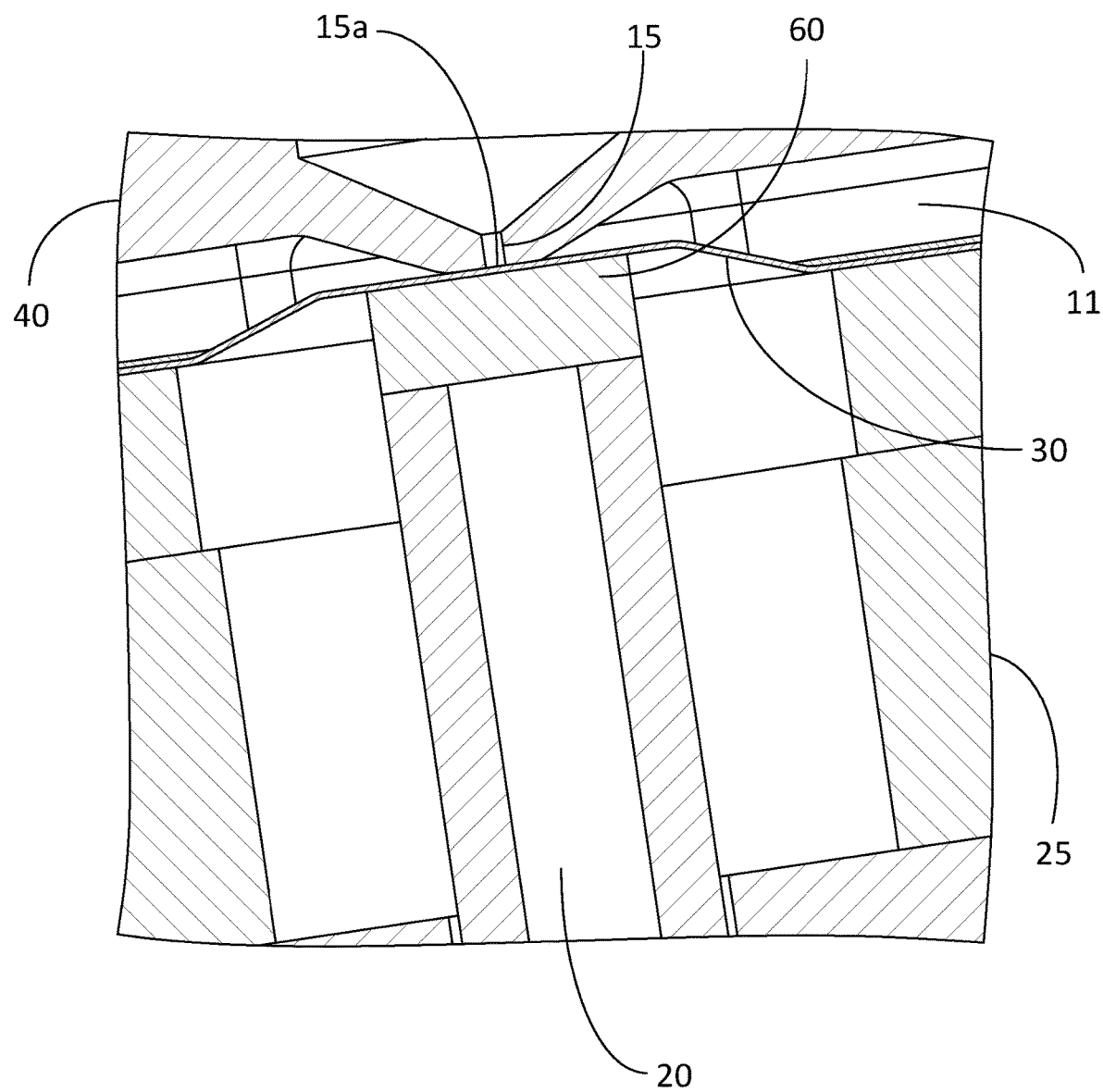
FIG. 5D illustrates a magnified view of an ingredient reservoir in the closed position to a mixing channel, in accordance with some embodiments.
Figure 5E:
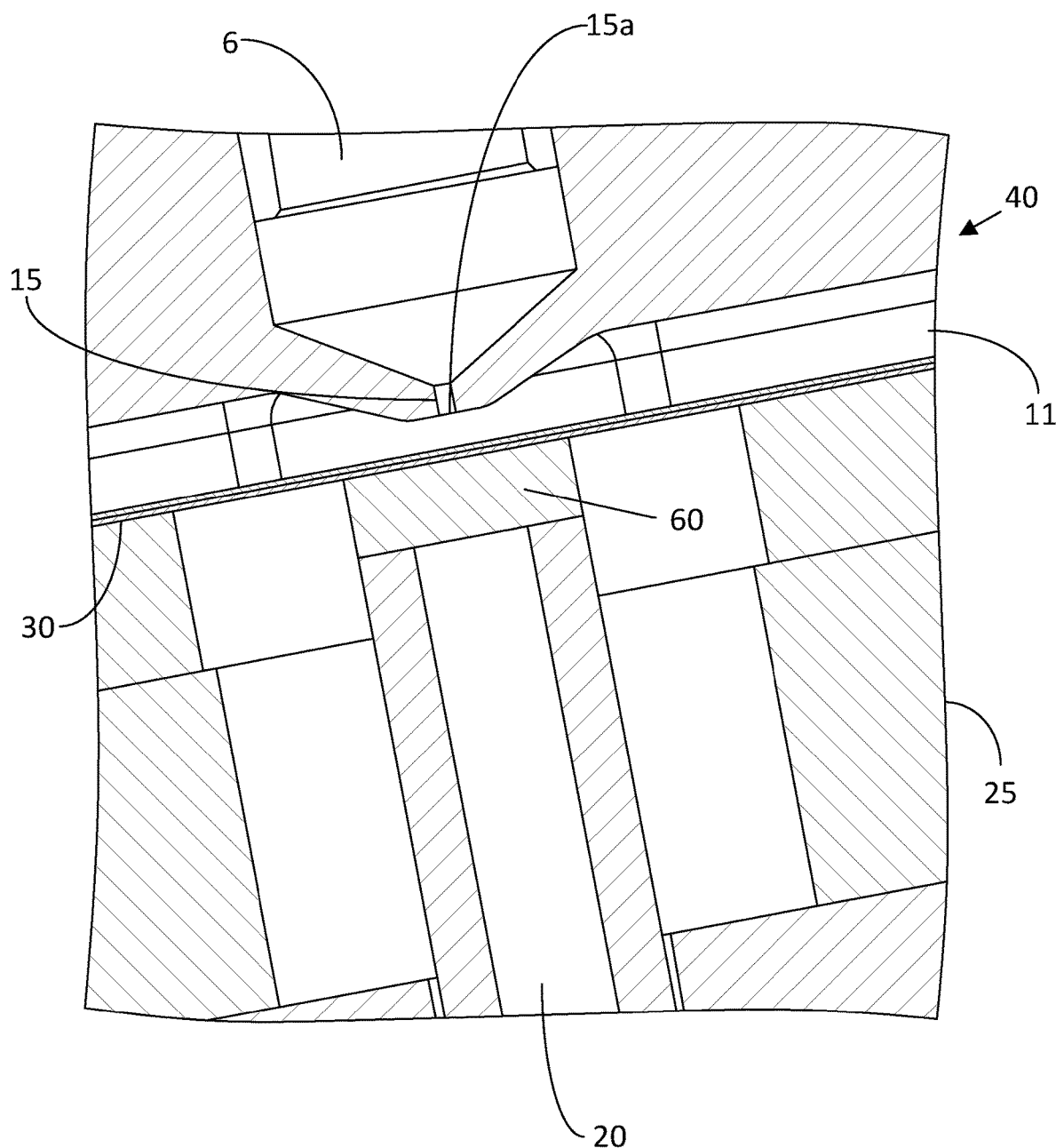
FIG. 5E illustrates a magnified view of an ingredient reservoir in the open position to a mixing channel, in accordance with some embodiments.
Figure 6:
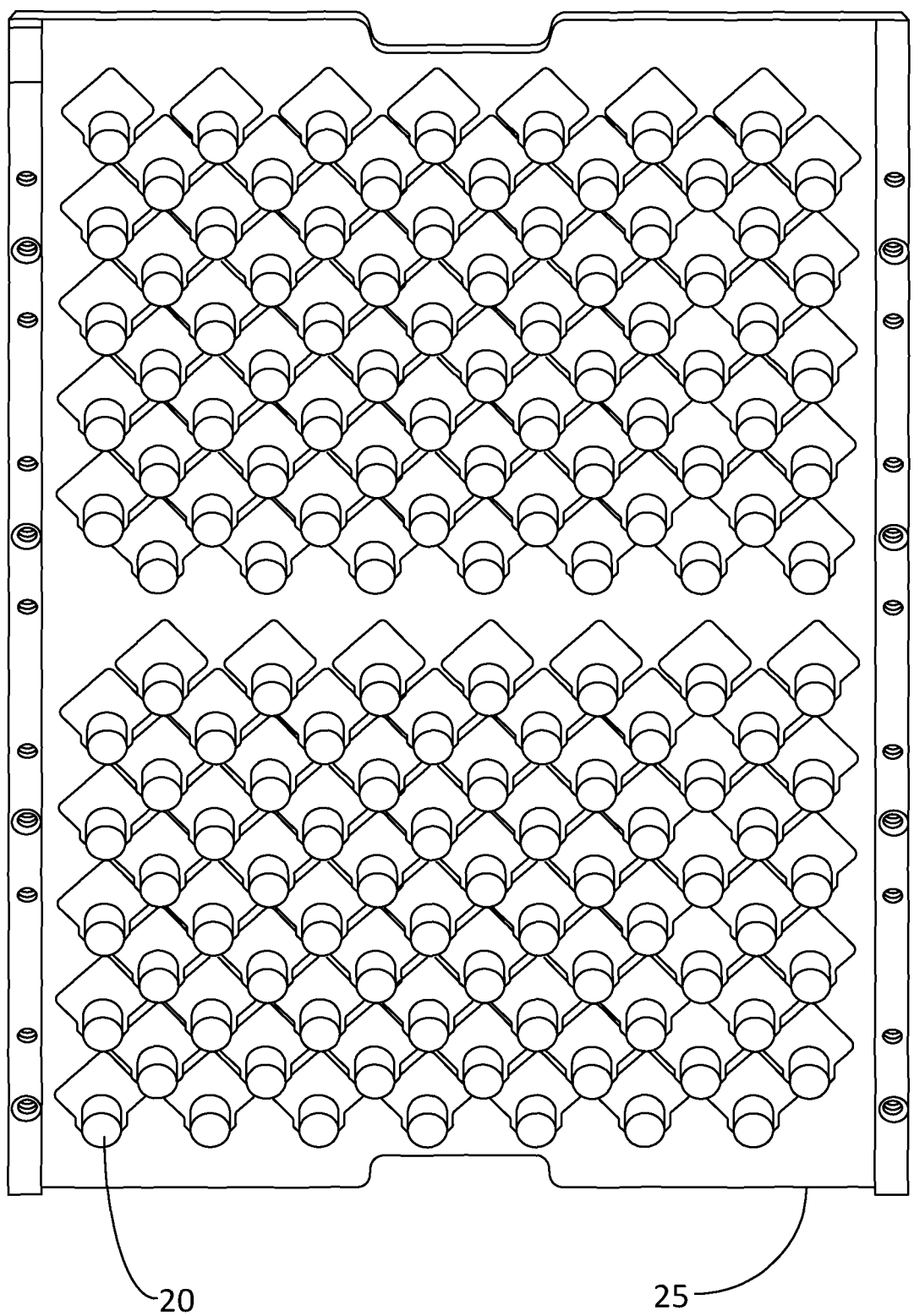
FIG. 6 illustrates an example of solenoids, on the underside of a base plate, that can control ingredient dispensing into mixing channels of a fluid mixture dispensing system, in accordance with some embodiments.

In some embodiments, the respective valve of an ingredient reservoir is able to open (e.g., to unseal) the respective orifice of the ingredient reservoir (such as orifice 15 as illustrated in FIGS. 5C, 5D, and 5E) so that the ingredient reservoir is able to dispense at least some of its contents into a mixing channel (such as mixing channel 11 as illustrated in FIGS. 5C, 5D, and 5E). In some embodiments, the ingredient reservoir connects to a membrane valve via a flat plate orifice that dispenses output from the ingredient reservoir. For example, a dispensing end of the ingredient reservoir is a flat plate with the respective orifice in (or near) the middle of the flat plate. When a membrane (e.g., membrane 30 as illustrated in FIGS. 5B, 5C, 5D, and 5E) is forced (e.g., pressed) against the respective orifice, no ingredient is able to flow out of the ingredient reservoir (i.e., pressing the membrane against the respective orifice closes the respective valve). In various embodiments, a compliant material (such as compliant material 60 as illustrated in FIGS. 5D and 5E) such as a rubber pad (e.g., a fluoroelastomer pad) is pushed up (e.g., pressed) against the membrane by action of an actuator (such as actuator 20 as illustrated in FIGS. 5D and 5E) so that the membrane closes (e.g., seals) valve face 15a (i.e., seals the respective orifice by closing the respective valve). In further embodiments, the compliant material is a material with a low set capability such that it provides a consistent even seal over time. In some embodiments, a purpose of the compliant material is to allow for misalignment of the actuator and still provide a good seal for the valve seat/orifice. In other words, the compliant material is such that it is amenable to closing the respective orifice when it is pushed up (e.g., pressed) against the membrane and valve. In various embodiments, an area of the actuator (and/or of the compliant material at the head of the actuator) is much larger than an area of the respective orifice, allowing the actuator to not be centered on the respective orifice and still be able to effect sealing of the respective orifice. However, even when an ingredient reservoir is in the closed position (i.e., the respective orifice is sealed by the actuator forcing the membrane against the respective orifice), any fluid/solvent, such as water and/or alcohol, as well as any ingredients dispensed from other ingredient reservoirs, is able to flow through the mixing channel and around the closed ingredient reservoir. For example, in various embodiments, the actuator and the membrane, when sealing the respective orifice, do not obstruct an entire width of the mixing channel. However, when there is no force pushing (e.g., pressing) the membrane against the respective orifice (e.g., as illustrated in FIG. 5E), the respective ingredient is able to flow through the respective orifice to the mixing channel. In various embodiments, a width of the actuator (in a direction relative to a width of the mixing channel) is half the width of the mixing channel (e.g., the width of the actuator is 4 mm and the width of the mixing channel is 8 mm).

In some embodiments, a single membrane (e.g., a membrane sheet) forms respective seals for respective valves of a plurality of ingredient reservoirs. For example, as illustrated in FIGS. 5B and 5C, membrane 30 forms the respective seal for each of the respective valves of three ingredient reservoirs. As also illustrated in FIGS. 5D and 5E, membrane 30 is positioned between plate 40 and base plate 25, with mixing channel 11 between plate 40 and membrane 30, so that membrane 30 forms a surface of the mixing channel opposite a surface of the mixing channel on plate 40. In some embodiments, mixing channel 11 is constructed on a surface of plate 40, such as by being etched into plate 40. According to various embodiments, the membrane comprises one or more of: silicone, polyurethane, thermoplastic polyurethane (TPU), and/or any chemically-resistant thermoelastomer or thermoplastic elastomer (TPE). In various embodiments, the membrane has a thickness that is between 0.1 and 0.2 mm, or between 0.05 and 0.35 mm, depending, at least in part, on a composition of the membrane. In some embodiments, an ingredient cartridge comprises a plate, such as illustrated in FIGS. 2B and 3 with ingredient cartridge 5 and plate 40. In further embodiments, respective orifices of the ingredient reservoirs are on a side of the plate opposite that to which the ingredient reservoirs are installed, so that respective ingredients from the ingredient reservoirs flow through holes in the plate. In yet further embodiments, the holes in the plate comprise the respective orifices of the ingredient reservoirs (e.g., the ingredient reservoirs are mounted so as to dispense the respective ingredients through the holes in the plate), while in other embodiments, the respective orifices are of the ingredient reservoirs themselves, and the ingredient reservoirs extend at least partway into the holes in the plate, possibly protruding slightly (within the compliance of the membrane) from the holes in the plate. In some embodiments, the membrane is not attached to or part of the ingredient cartridge, and is placed between the plate and the base plate to form the respective seals. In other embodiments, the ingredient cartridge comprises the plate and the membrane. For example, the membrane is attached to the cartridge via an adhesive, such as a pressure-sensitive adhesive. In various embodiments, a surface of the plate opposite the ingredient reservoirs has one or more mixing channels, such as one or more mixing channels etched into the surface of the plate. In further embodiments, the one or more mixing channels provide a fluid path from an inlet of the ingredient cartridge to an outlet of the ingredient cartridge, where each of at least some of the mixing channels comprises holes or orifices allowing ones of the ingredient reservoirs of the ingredient cartridge to dispense into the mixing channel. According to various embodiments: the ingredient cartridge has a valve on the inlet, enabling control of a flow of a solvent into the one or more mixing channels; and/or the ingredient cartridge has a valve on the outlet, enabling control of a flow of a solvent out of the one or more mixing channels.

In some embodiments, as described above, at least one solvent from at least one solvent reservoir is sent to a mixing channel such that any ingredient dispensed from the ingredient reservoirs into the mixing channel is mixed with the at least one solvent to form an intermediate fluid mixture.

In various embodiments, a diameter of the respective orifice of a particular one of the ingredient reservoirs ranges from about 0.01 to 5 mm or about 0.05 to 1 mm, depending on physical flow characteristics (e.g., viscosity) of the respective ingredient stored in the particular ingredient reservoir. The diameter of the respective orifice determines, at least in part, a flow rate through the respective orifice for a given ingredient's physical flow characteristic and pressurized chamber pressure. In some embodiments, the valve and ingredient reservoir assembly is interfaced with actuators (e.g., solenoids), such as actuators 20 as illustrated in FIGS. 5D and 5E, that are connected to a base plate, such as base plate 25 as illustrated in FIGS. 4A, 4B, 5B, 5C, and 5D. Each of the actuators has a respective plunger that is pre-loaded against a respective one of the respective valves by respective springs or other forces. In some embodiments, the respective plungers are pre-loaded with approximately at least or equal to about 1 Newton against the respective valves by the respective springs. In some embodiments with solenoid actuators, the respective plungers are biased by the respective springs away from the solenoid coils such that the respective plungers push (e.g., press) with a controlled preloaded amount of force against the respective valves (e.g., against the membrane), so that in a default state of a particular solenoid, when the particular solenoid is not activated, the respective valve is sealed. In various embodiments, base plate 25 comprises two or more layers, such as one layer for connection of the actuators, and a second layer for liquid interface.

In some embodiments, the pressurized chamber pressure is regulated by the controller and the respective orifices are of diameters and thicknesses with known tolerances to ensure that a flow rate of the respective ingredients is predictable and of a determined accuracy. With a predictable flow rate (of a determined accuracy), valve open duration is usable to control a dispensed amount (e.g., volume) of an ingredient. In some embodiments, calibration is used to ensure that open loop dispense control (e.g., based on pressurized chamber pressure, valve open time, etc., and without feedback of actual dispensed amounts) results in desired dispensed quantities. Alternatively, in various embodiments, the system has closed loop amount/volume metering control (e.g., measured pressure change in the pressurized chamber over time, flow rates over time, and/or measured volumes or weights are used to verify and/or control dispensed quantities). In other embodiments, an open loop dispense control system is configured to use feedback (such as measured flow rates) to monitor correctness of the open loop dispense control system.

In some embodiments, accurate dispensing of a predetermined amount of at least one ingredient from a plurality of ingredient reservoirs utilizes real time software control of one or more actuators and one or more pressure pumps based on inputs from one or more sensors located throughout the system. In various embodiments, the controller (e.g., one or more embedded control processors) is configured to: translate formula information (e.g., predefined beverage ingredients and amounts) into dispense control actions (e.g., control of valves and/or pumps) that are scheduled and/or sequenced; monitor what are the contents of a given ingredient, water, and/or alcohol reservoir (e.g., using RFID tags and/or barcodes on each of the reservoirs to identify a type of the reservoir and/or its contents); monitor remaining ingredient, water, and/or alcohol levels; and receive user input.

In some embodiments, the controller manages individual actuators and is configured to execute precise actuator timing to control flow time, and thus dispense a required amount (e.g., volume) of an ingredient. In some embodiments and/or usage scenarios, a typical formula for a predefined fluid mixture includes one to 300 different ingredients, each of which is able to be in the form of a liquid, a solid, or a gas. In some embodiments, the list of ingredients for a particular predefined fluid mixture includes dispense parameters such as a location of an ingredient reservoir containing a specific ingredient in the list of ingredients as well as a desired dispense amount (e.g., volume) of the specific ingredient. The system is configured to control and measure pressure in the pressurized chamber, orifice flow rates, and/or ingredient physical flow characteristics, and is configured to make appropriate computations to determine a valve timing needed to achieve a required dispense amount of the specific ingredient. In various embodiments, the system is configured to calculate a most efficient sequence for mixing solvents and/or ingredients in order to minimize mixing time.

In some embodiments, the controller is configured to manage individual actuators and regulate actuator timing to control flow time (e.g., how long a valve is open) and thus dispense required amounts of the respective ingredients from the ingredient reservoirs. In some embodiments, actuator health is monitored by the controller. For example, the temperature of an actuator motor winding is able to be inferred from measurement of actuator current. By monitoring actuator current, the controller is able to detect a valve that is not operating within defined performance limits. In some embodiments, the controller is configured to read a voltage drop across a 0.1 ohm shunt resistor in series with a solenoid coil of the actuator. A properly functioning solenoid has a well-characterized and repeatable waveform, having a characteristic solenoid coil inductive response. Measuring the actuator current provides a solenoid response waveform that is sampled with an A/D converter. A slope of this solenoid response waveform is monitored and is indicative of valve performance. In some embodiments, a cold baseline actuator current is measured at system startup. In various embodiments, the actuator health monitoring allows the system to recover from a sticking valve with an un-stick cycle.

In some embodiments, the controller produces pulse width modulated (PWM) signals that drive a low-side MOSFET transistor to activate the actuator. In various embodiments, PWM control allows the controller to drive the actuator solenoid coil hard to accelerate it initially, and then to reduce the duty cycle to a lower value to hold the solenoid in an open position, thereby saving power and reducing heat. In some embodiments, the power supply for the actuators is tightly regulated such that each actuator (if healthy) draws a reliable and repeatable current. For example, some recipes only require a few solenoids to actuate while others require 50 or more. The difference in power draw between these two examples is large enough that the power supply system design is important. In some embodiments, individual solenoid PWM control and direct solenoid current measurement (with minimal delay) are able to ensure control of actuator timing within a very small tolerance, such as within 1 millisecond. In some embodiments, such as some embodiments with PWM control of a particular actuator, the controller is programmed to maintain a plunger of the particular actuator in an intermediate position between the sealed position and the fully open position (e.g., partway open). In the intermediate position, a flow rate through a valve operated by the particular actuator is controllable to be less than a flow rate in the fully open position of the valve. In various embodiments, use of the intermediate position between the sealed position and the fully open position enables finer control of amounts of ingredients to be dispensed, and/or provides a method in addition to (or other than) duration of valve open time to control the amounts of ingredients to be dispensed.

In some embodiments, the system is configured to regulate the dispense pressure (e.g., the pressure of gas in the pressurized chamber) that expels the respective ingredients from the ingredient reservoirs when the respective valves are open. For example, few or many valves are required to be opened depending on the requested fluid mixture, and opening the valves changes an overall volume in the ingredient reservoirs as fluid is expelled. In some embodiments, the system includes a pressure sensor, a pressure regulator, a pressure accumulator, and/or a pressure pump, controlled/monitored by the controller, to regulate pressure in the pressurized chamber. In further embodiments, the controller is programmed to run a closed loop, realtime, pressure monitoring routine to regulate the pressure in the pressurized chamber, and/or to determine amounts of the respective ingredients expelled from the ingredient reservoirs based on a change in the monitored pressure in the pressurized chamber. In some embodiments, a high-sensitivity pressure sensor is employed to monitor (with minimal delay) pressure inside the pressurized chamber, enabling firmware to compensate for pressure changes during dispense.

As stated above, in some embodiments, respective ingredients in the ingredient reservoirs include solid (e.g., powdered) ingredients, including solid ingredient mixtures (i.e., multiple solid ingredients such as a mixture of glucose powder and sucrose powder). In various embodiments, an ingredient reservoir containing a solid ingredient is a gravity dispense chamber. In some embodiments, a precise amount of a solid (e.g., powdered) ingredient is mechanically moved by an individual actuator to an exit orifice, and from there to a dissolution chamber. According to various embodiments, a single actuator (e.g., a solenoid or a voice coil) is used to dispense contents of multiple solid ingredient reservoirs, and/or a respective actuator is used to dispense contents of each solid ingredient reservoir.

In some embodiments, when an ingredient reservoir includes a syringe, plungers of the syringes are exposed to a controlled pressure in the pressurized chamber that provides a regulated force pushing on the plungers. In further embodiments, even with the plungers removed, ingredients in the syringes still receive force to expel the ingredients (e.g., into a mixing channel or a mixing chamber) when the respective valves for those ingredient reservoirs are opened. In some embodiments, an inert gas, such as argon, is used to protect ingredients from oxidation/degradation. In other embodiments, the controller is configured to displace (such as with a linear motor) at least one plunger of a syringe to flow a predetermined amount of the ingredient in the syringe to a mixing chamber. Such systems flow the predetermined amount of the ingredient in the syringe to the mixing chamber via injection distance of the plunger (hence volume dispense). This is a positive placement method instead of a time/pressure orifice method. In some embodiments of the time/pressure orifice method, the controller is configured to interpret readings from a pressure sensor and calculate the dispensed volume from each separate ingredient reservoir. A combination of these methods can be utilized together to form a more precise control of the dispensed volume. For example, in further embodiments, ingredient reservoirs with syringes are controlled with the positive placement method, and other ingredient reservoirs are controlled with the time/pressure orifice method.

In some embodiments, the ingredient reservoirs are loaded into or attached to the pressurized chamber with a controlled pressure for providing expulsion force. In other embodiments, the pressurized chamber, when assembled and prior to a first use, has a negative pressure to help ensure that the ingredient reservoirs do not leak.

In some embodiments, as described above, the chemical analysis of a fluid mixture provides a detailed list of ingredients that make up the fluid mixture. In various embodiments, the system includes at least about 5, at least about 10, at least about 20, at least about 30, at least about 40, or at least about 50 ingredient reservoirs. In some embodiments, a cartridge includes at least about 5, at least about 10, at least about 20, at least about 30, at least about 40, or at least about 50 ingredient reservoirs. In various embodiments, the system includes at most about 500, at most about 250, at most about 150, at most about 100, at most about 75, at most about 50, at most about 40, at most about 30, at most about 25, at most about 20, at most about 15, or at most about 10 ingredient reservoirs. In some embodiments, a cartridge includes at most about 500, at most about 250, at most about 150, at most about 100, at most about 75, at most about 50, at most about 40, at most about 30, at most about 25, at most about 20, at most about 15, or at most about 10 ingredient reservoirs. In various embodiments, any of the ingredients are a liquid, a solid, a gas, and/or a combination thereof. For example, the ingredients include an amount of an acid in liquid form, an amount of a sugar in powdered/granule form, and/or an amount of compressed nitrogen or $CO_2$ in gas form.

In some embodiments, because one or more of the ingredients required to create a particular fluid mixture are used in small amounts (e.g., less than 0.1 mL, less than 0.01 mL, less than 0.001 mL, or as small as 50 uL), a high level of repeatability and precision is required when dispensing ingredients to be combined with one or more solvents to form the particular fluid mixture. In some embodiments, a predetermined amount of at least one ingredient required to form the particular fluid mixture is at most 3 L, at most 2 L, at most 1 L, at most 500 mL, at most 250 mL, at most 100 mL, at most 50 mL, at most 25 mL, at most 10 mL, at most 5 mL, at most 1 mL, at most 0.5 mL, at most 0.1 mL, at most 0.01 mL, at most 0.001 mL, or at most 50 uL. Accordingly, in further embodiments, the respective valves of the ingredient reservoirs support precision over a wide range of dispense amounts, varying by as much as a factor of one hundred, a factor of one thousand, or more.

As illustrated in FIGS. 11 and 12, the system includes at least one heat exchanger. A heat exchanger is selectively able to adjust the temperature of a fluid in a chamber, a flow line (e.g., tubing or piping), a mixing channel, etc. either up (i.e., acting as heater) or down (i.e., acting as a chiller). For example, a certain beverage is supposed to be served at a specific temperature, or a user may select a desired temperature at which their beverage is to be dispensed. In various embodiments, a predetermined amount of one or more solvents (e.g., a predetermined amount of water from a water reservoir and/or a predetermined amount of alcohol from an alcohol reservoir) is cooled and/or heated by a heat exchanger prior to flowing to a mixing channel, a mixing chamber, and/or a dissolution chamber. In some embodiments, the temperature to which the one or more solvents are cooled and/or heated is according to a fluid mixture request received by the system (e.g., user selection of a beverage at 10° C., etc.).

In some embodiments, the system includes a first temperature sensor configured to measure a temperature of a solvent flowing from a solvent reservoir to at least one heat exchanger, a second temperature sensor configured to measure a temperature of a second solvent flowing from a second solvent reservoir to the at least one heat exchanger, and a third temperature sensor configured to measure a temperature of a solvent mixture (first and second solvent combined) from the at least one heat exchanger to a mixing channel, a mixing chamber, and/or a dissolution chamber. For example, in various embodiments, the system includes a first temperature sensor configured to measure a temperature of water flowing from a water reservoir to the at least one heat exchanger, a second temperature sensor configured to measure a temperature of alcohol flowing from an alcohol reservoir to the at least one heat exchanger, and a third temperature sensor configured to measure a temperature of the water/alcohol mixture from the at least one heat exchanger to a mixing channel. In some embodiments, the system adjusts the temperature of the at least one heat exchanger based on the temperature sensor measurements such that an intermediate fluid mixture sent to the final mixing chamber meets requested temperature requirements.

In some embodiments, the system includes a plurality of heat exchangers, such as those illustrated in FIGS. 11 and 12, at various points throughout the system. In some embodiments, a predetermined amount of solvent from a solvent reservoir is optionally and/or selectively cooled and/or heated by a first heat exchanger prior to flowing to a mixing channel, and a predetermined amount of a second solvent from a second solvent reservoir is optionally and/or selectively cooled and/or heated by a second heat exchanger prior to flowing to the mixing channel. For example, a predetermined amount of water from the water reservoir is cooled/heated by a first heat exchanger prior to flowing to a mixing channel, and a predetermined amount of alcohol from an alcohol reservoir is cooled/heated by a second heat exchanger prior to flowing to the mixing channel.

In some embodiments, the system includes a heat exchanger such that any fluid mixture formed in a mixing chamber (such as the final mixing chamber) is optionally and/or selectively cooled and/or heated by the heat exchanger. This helps ensure that the fluid mixture dispensed meets a temperature requirement received in a fluid mixture request. In some embodiments, a mixing channel includes (or is attached to) a heat exchanger to heat an intermediate fluid mixture formed in the mixing channel. In some embodiments, a dissolution chamber includes (or is attached to) a heat exchanger to help dissolution of an ingredient in one or more solvents. In some embodiments, one or more ingredient reservoirs and/or an ingredient cartridge include (or are attached to) a heat exchanger to control the temperature of the one or more ingredient reservoirs and/or the ingredient cartridge.

In some embodiments, the system includes at least one heat exchanger such that a predetermined amount of at least one solvent from at least one solvent reservoir is optionally and/or selectively cooled and/or heated by the at least one heat exchanger prior to flowing to a dissolution chamber to help with dissolution of a predetermined amount of at least one ingredient. In some embodiments, the dissolution chamber itself is optionally and/or selectively heated and/or cooled by the heat exchanger to help with the dissolution of the predetermined amount of the at least one ingredient.

In some embodiments, the system includes a dispenser (e.g., a nozzle) that is fluidly connected to the final mixing chamber. At block 106 of FIG. 1, in some embodiments, the system is configured to dispense the fluid mixture (e.g., the beverage) via the dispenser after the fluid mixture is formed in the final mixing chamber. In some embodiments, the dispenser is used to make a solid (e.g., to extrude the fluid mixture) and controls are added to make 3D structures, such as via 3D printing. In some embodiments, the final beverage has a volume of at most 3 L, at most 2 L, at most 1 L, at most 750 mL, at most 500 mL, at most 250 mL, at most 200 mL, at most 150 mL, at most 100 mL, at most 50 mL, at most 25 mL, at most 10 mL, at most 5 mL, or at most 1 mL.

In some embodiments, the system includes a fluid mixture holder sensor, and the controller is programmed to dispense the fluid mixture only when a fluid mixture holder is detected by the fluid mixture holder sensor. FIGS. 2A, 2B, 11 and 12 illustrate fluid mixture holder 4 (e.g., a dispensed mixture container, such as a wine glass, teacup, shot glass, etc.). In some embodiments, the system includes a drip tray sensor, and the controller is programmed to determine whether a drip tray is present and/or an amount of fluid in the drip tray. In some embodiments, the system includes a dispensing sensor, and the dispensing sensor is configured to determine whether a dispensing profile of the fluid mixture dispensing is satisfactory.

In some embodiments, the systems disclosed herein dispense air at various points throughout the system, for example at air nodes as illustrated in FIG. 12. For example, in some embodiments, air is utilized to maintain pressure in the pressurized chamber. In various embodiments, air is used as a purge for a flow line, a mixing chamber, a dissolution chamber, and/or a mixing channel so that there is no leftover solvent or solvent mixture prior to starting a next fluid mixture. In some embodiments, air is used to help dispense solvent and/or an ingredient from an ingredient reservoir. In various embodiments, air is used to control a pneumatic valve to control flow or to help eject a cartridge.

Although the method in FIG. 1 (or in FIG. 16) is only with respect to a single fluid mixture (e.g., a beverage), in some embodiments the system is able to receive a request for a second fluid mixture and, in response to receiving the request for the second fluid mixture, repeat and/or modify the operations of FIG. 1 (or the operations of FIG. 16) to dispense the second fluid mixture. The second fluid mixture can be the same as or can be different from the first fluid mixture. For example, a predetermined amount of at least one solvent and/or of at least one ingredient is different for the second fluid mixture as compared to the first fluid mixture. Accordingly, predetermined amounts of one or more solvents and of one or more ingredients from the plurality of ingredient reservoirs can all be different for the second fluid mixture as compared to the first fluid mixture. Further, the second fluid mixture may use one or more solvents and/or one or more ingredients that were not used in the first fluid mixture, and/or the second fluid mixture may not use one or more solvents and/or one or more ingredients that were used in the first fluid mixture.

In some embodiments, the systems disclosed herein are able to make many different combinations of fluid mixtures based on respective requests. Once a request is received for a fluid mixture, the system automatically creates and dispenses the requested fluid mixture by flowing the proper amounts of one or more solvents and/or one or more ingredients from their respective reservoirs to the final mixing chamber and then dispensing via the dispenser.

FIG. 9 illustrates a computer in accordance with some embodiments. In some embodiments, computer 1200 is a component of a system for dispensing fluid mixtures, such as the controller (which may comprise a plurality of sub-controllers). In various embodiments, the system for dispensing fluid mixtures includes more than one computer 1200 as described above. In some embodiments, computer 1200 is configured to execute a method for dispensing a fluid mixture, such as all or part of method 100 described above with respect to FIG. 1, method 1600 described below with respect to FIG. 16, or any other method disclosed herein.

In some embodiments, computer 1200 is a host computer connected to a network.

According to various embodiments, computer 1200 is a client computer or a server. As illustrated in FIG. 9, computer 1200 is any suitable type of processor-based (e.g., microprocessor-based) device, such as a personal computer, a workstation, a server, or a handheld computing device (such as a phone or a tablet). In some embodiments, the computer includes, for example, one or more of processor 1210, input device 1220, output device 1230, storage 1240, and communication device 1260.

In some embodiments, input device 1220 is any suitable device that provides input, such as a touch screen or touch pad, a keyboard, a mouse, or a voice-recognition device. Other possible input devices include an accelerometer or a microphone for monitoring system health. In some embodiments, output device 1230 is any suitable device that provides output, such as a touch screen, a monitor, a printer, a disk drive, or a speaker.

In some embodiments, storage 1240 is any suitable device that provides storage, such as an electrical, magnetic, or optical memory, including a RAM, cache, hard drive, CD-ROM drive, tape drive, or removable storage disk. In some embodiments, communication device 1260 includes any suitable device capable of transmitting and receiving signals over a network, such as a network interface chip or card. In various embodiments, the components of the computer are connected in any suitable manner, such as via a physical bus or wirelessly. In some embodiments, storage 1240 is a non-transitory computer-readable storage medium comprising one or more programs, which, when executed by one or more processors, such as processor 1210, cause the one or more processors to execute methods described herein, such as all or part of method 100 described above with respect to FIG. 1, all or part of method 1600 described below with respect to FIG. 16, and any other method described herein.

In some embodiments, software 1250, which is optionally and/or selectively stored in storage 1240 and executed by processor 1210, includes, for example, programming that embodies the functionality of the present disclosure (e.g., as embodied in the systems, computers, servers, and/or devices as described above). In some embodiments, software 1250 is implemented on and/or executed on a combination of servers such as application servers and database servers.

In some embodiments, software 1250 is able to be stored and/or transported within any computer-readable storage medium for use by or in connection with an instruction execution system, apparatus, or device, such as those described above (e.g., processor 1210), that can fetch and execute instructions associated with the software from the instruction execution system, apparatus, or device. In the context of this disclosure, a computer-readable storage medium can be any medium, such as storage 1240, that can contain or store programming for use by or in connection with an instruction execution system, apparatus, or device.

In some embodiments, software 1250 is able to be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport medium can include, but is not limited to, an electronic, magnetic, optical, electromagnetic, or infrared wired or wireless propagation medium.

In some embodiments, computer 1200 is connected to a network, which can be any suitable type of interconnected communication system. The network can implement any suitable communications protocol and can be secured by any suitable security protocol. In some embodiments, the network comprises network links of any suitable arrangement that implement the transmission and reception of network signals, such as wireless network connections, T1 or T3 lines, cable networks, DSL, or telephone lines.

In some embodiments, computer 1200 is able to implement any operating system suitable for operating on the network. In some embodiments, software 1250 is written in any suitable programming language, such as C, C++, Java, or Python. In various embodiments, application software embodying the functionality of the present disclosure is deployed in different configurations, such as in a client/server arrangement or through a Web browser as a Web-based application or Web service, for example.

Figure 13:
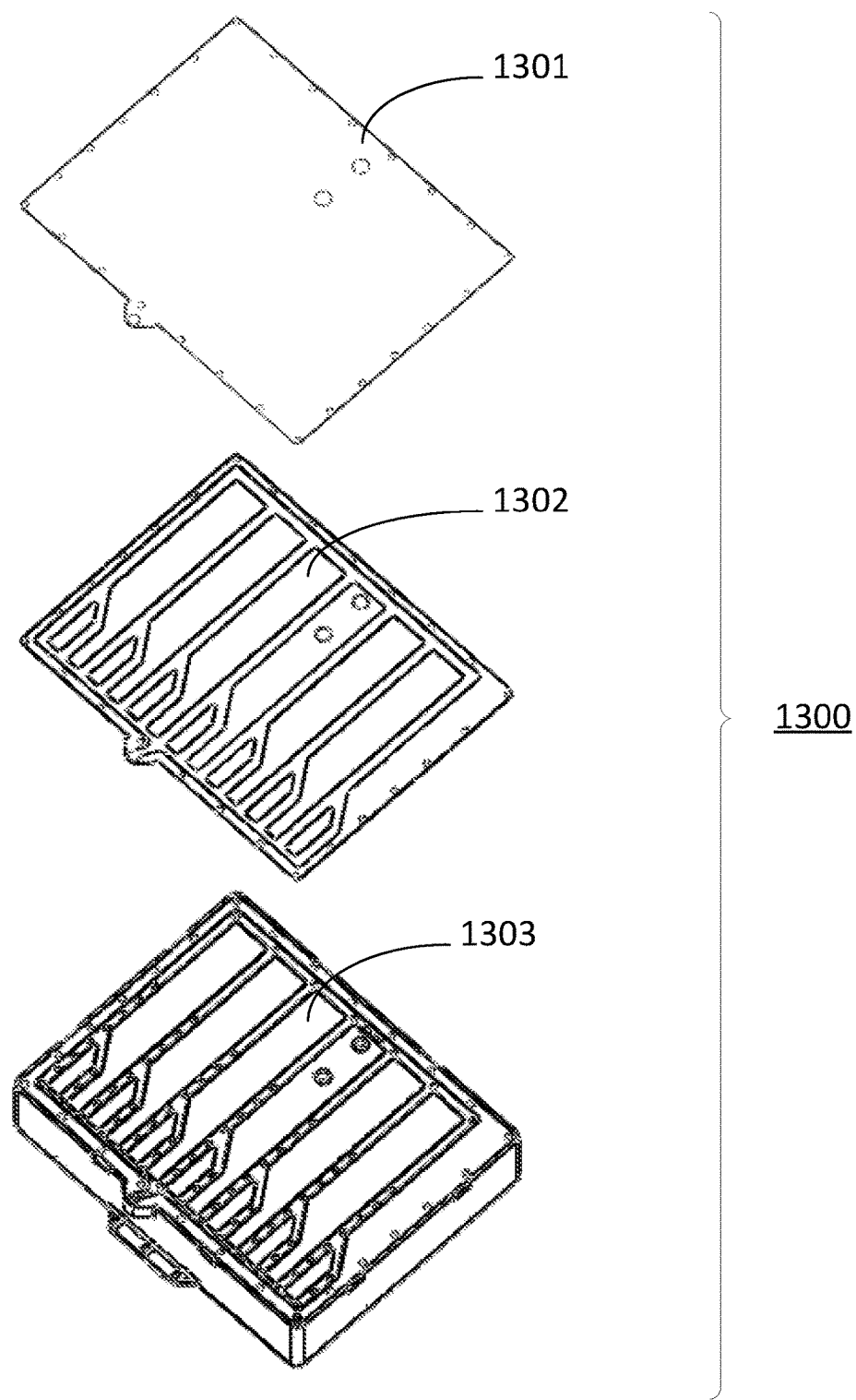
FIG. 13 illustrates an example exploded view of a bottom portion of an ingredient cartridge in accordance with some embodiments.
Figure 14:
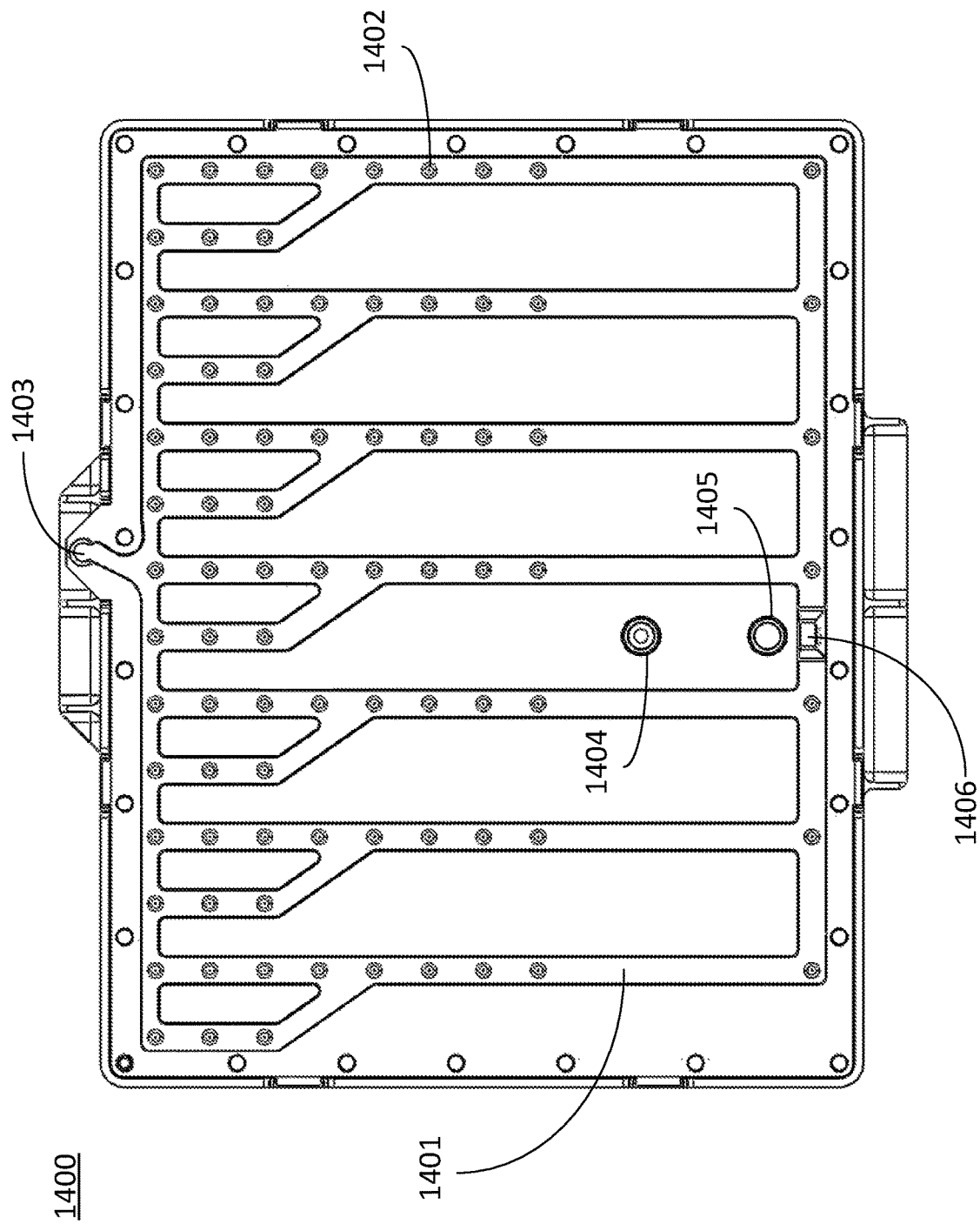
FIG. 14 illustrates an example bottom view of an ingredient cartridge with the membrane removed in accordance with some embodiments.
Figure 15:
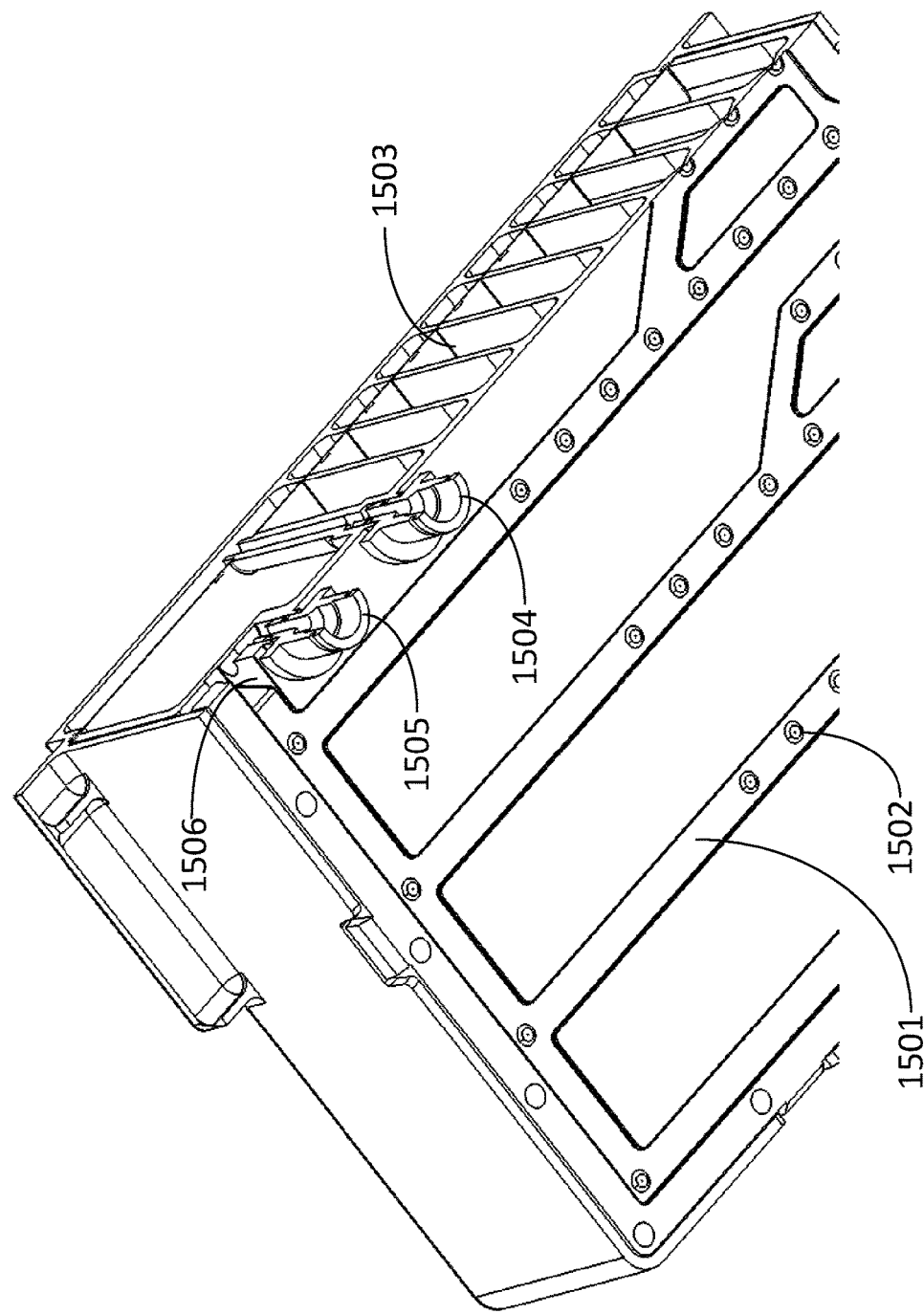
FIG. 15 illustrates an example cut-away perspective view of a portion of an ingredient cartridge in accordance with some embodiments.

FIGS. 13, 14, and 15 illustrate different example views of an ingredient cartridge, and FIG. 16 illustrates a flowchart representing an exemplary method used in a system including the ingredient cartridge. FIG. 13 illustrates an example exploded view 1300 of a bottom portion of the ingredient cartridge. In FIG. 13, 1301 illustrates a membrane sheet (such as membrane 30 as illustrated in FIGS. 5B, 5C, 5D and 5E), 1302 illustrates an adhesive layer, and 1303 illustrates a plate (such as plate 40 as illustrated in FIGS. 3, 5B, 5C, 5D and 5E) providing a rigid structure for a bottom of the ingredient cartridge. In some embodiments, the plate comprises one or more of aluminum and/or a plastic. A bottom surface of the plate (the surface away from the interior of the ingredient cartridge) has formed into it (such as by carving or etching into the plate to create recesses) or onto it (such as by gluing, brazing or welding on a 3D structure to create recesses) one or more channels (e.g., the recesses) for fluid flow, such as mixing channel 11 as illustrated in FIGS. 5B, 5C, 5D, 5E, 11, and 12. (The one or more channels are further illustrated in FIG. 14.) The adhesive layer is an adhesive or a tape (such as a pressure-sensitive adhesive) that, in some embodiments, is in the form of a template corresponding to the one or more channels so that the adhesive layer is able to adhere the membrane sheet to walls of the one or more channels, leaving the one or more channels open for fluid flow. According to various embodiments, the membrane sheet comprises one or more of: silicone, polyurethane, thermoplastic polyurethane (TPU), and/or any chemically-resistant thermoelastomer or thermoplastic elastomer (TPE). In various embodiments, the membrane sheet has a thickness that is between 0.1 and 0.2 mm, or between 0.05 and 0.35 mm, depending, at least in part, on a composition of the membrane sheet.

Not illustrated in FIG. 13 is a base plate (such as base plate 25 as illustrated in FIGS. 4A, 4B, 5B, 5C, 5D, and 5E) on which, in some embodiments, the membrane sheet (and hence, at least in part, the ingredient cartridge) rests. In further embodiments, the base plate prevents the membrane sheet from contacting other parts of the system. In various embodiments, a height of the walls of the one or more channels (i.e., a depth of the recesses) is such that that a required fluid flow rate through the one or more channels is achieved, and/or so that the one or more channels are able to remain open even when there is no fluid flow. In some embodiments, the one or more channels are generally filled with fluid (e.g., fluid being dispensed) or with a gas (e.g., air for purging fluid paths), enabling the channels to stay open.

FIG. 14 illustrates an example bottom view 1400 of the ingredient cartridge with the membrane removed to illustrate the one or more channels of the plate (e.g., 1303 in FIG. 13). In FIG. 14, 1400 references the bottom view of the plate, 1401 references the one or more channels (e.g., two channels, illustrated as vertical in FIG. 14, and seven channels, illustrated as horizontal, that "fork" towards the right side to form 14 channels), 1402 illustrates one of the plurality of "holes" for respective orifices of ingredient reservoirs in the ingredient cartridge. 1403 illustrates a fluid outlet, 1404 illustrates a gas inlet, 1405 illustrates a fluid inlet, and 1406 illustrates a connection point enabling fluid from the fluid inlet to enter the one or more channels. Structure in the interior of the ingredient cartridge fluidly connects the fluid inlet to the connection point and thus to the one or more channels and to the fluid outlet. That is, fluid (e.g., a solvent) is propelled (e.g., pumped) through the fluid inlet and then through the connection point to enter the one or more channels and flow through the one or more channels to the fluid outlet. In some embodiments, a fluid inlet valve and/or a fluid flow rate sensor are disposed at or near the fluid inlet. In further embodiments, the fluid inlet valve and/or the fluid flow rate sensor are inside the ingredient cartridge (e.g., as part of the structure fluidly connecting the fluid inlet to the connection point), while in other embodiments the fluid inlet valve and/or the fluid flow rate sensor are outside of (and not part of) the ingredient cartridge. The gas inlet provides a flow of gas under pressure to pressurize a pressurized chamber of the ingredient cartridge. In some embodiments, a gas inlet valve and/or a gas pressure sensor is disposed at or near the gas inlet. In further embodiments, the gas inlet valve and/or the gas pressure sensor are inside the ingredient cartridge, while in other embodiments the gas inlet valve and/or the gas pressure sensor are outside of (and not part of) the ingredient cartridge. In some embodiments, a fluid outlet valve and/or a fluid flow rate sensor are disposed at or near the fluid outlet. In further embodiments, the fluid outlet valve and/or the fluid flow rate sensor are inside the ingredient cartridge, while in other embodiments the fluid outlet valve and/or the fluid flow rate sensor are outside of (and not part of) the ingredient cartridge.

The holes in the plate illustrate positions of ingredient reservoirs on the other side of the plate, as the holes are places where respective orifices of the ingredient reservoirs come through the plate. As illustrated in FIG. 14, 1402 indicates one of the holes with the respective orifice of the ingredient reservoir in the center. In some embodiments, such as where the ingredient reservoirs are fixedly attached to the plate, the holes are the respective orifices. As illustrated, walls of the holes through the plate are sloped to improve dispensing of the ingredients (as indicated by the two circles surrounding the respective orifice in 1402). The holes also include a flat plate surrounding the respective orifice (as indicated by the inner circle surrounding the respective orifice in 1402). In various embodiments, a size of the respective orifice is much smaller than a size of the respective flat plate. For example, the respective orifice is 0.3 mm wide or smaller, and the respective flat plate is 2.7 mm wide. In further embodiments, a size of the respective flat plate is determined by a size of the hole in the plate, while a size of the respective orifice varies with a type of respective ingredient in the ingredient reservoir.

In various embodiments, a size of the respective orifice varies with a type of respective ingredient in the ingredient reservoir, and can vary from 0.1 mm (or less with some types of the ingredients) to 1 mm (or as much as 5 mm with some types of the ingredients). In some embodiments, the ingredient reservoirs are inhibited from leaking due to a small size of the respective orifices compared to a viscosity of the respective ingredients in the ingredient reservoirs. For example, pressure on the ingredient reservoirs (e.g., by pressurizing the pressurized chamber) is required to enable the respective ingredients to be dispensed.

As illustrated in FIG. 14 (and also in FIG. 3), an arrangement of the holes is a two-dimensional structure. This arrangement corresponds to positions where the ingredient reservoirs are placeable (or formable) in the interior of the ingredient cartridge (e.g., in the pressurized chamber), generally one of the ingredient reservoirs for each of the holes. The particular arrangement illustrated in FIG. 14 allows for at least one row of large ones of the ingredient reservoirs (e.g., the left side of FIG. 14), multiple rows of medium ones of the ingredient reservoirs (e.g., towards the middle of FIG. 14), and multiple rows of small ones of the ingredient reservoirs (e.g., the right side of FIG. 14). Many such arrangements are possible depending on required numbers and sizes of the ingredient reservoirs, though a given ingredient cartridge having the one or more channels formed on the bottom plate has a fixed arrangement of the holes (and of the one or more channels). In specific embodiments of the invention, the actuator which forces the membrane against the orifice can be larger than the flat plate to alleviate alignment requirements for the orifices of the cartridge and the device on which the cartridge is placed while at the same time assuring that the membrane is forced against the entire flat plate. For example, if the flat plate were 2.7 mm of less, the head of the actuator could be 4 mm or wider.

While FIG. 14 illustrates several of the one or more channels as appearing to all be of a similar width, according to various embodiments, the one or more channels are one or more of: all of the same width; of varying widths based on factors such as orientation, types of expected ingredients, and/or anticipated flow rate; of varying widths depending on a distance from the fluid inlet and/or the fluid outlet; wider prior to a fork (e.g., a "Y") and skinnier on the branches of the fork; wide enough near the holes that, even if the respective actuator for one of the respective orifices is closed, fluid flow through the channel is not obstructed by the respective actuator; of varying widths at and/or near the holes; and any other combination of widths. In a first example, vertical (as illustrated in FIG. 14) ones of the one or more channels (supporting fluid flow more directly from the fluid inlet and more directly to the fluid outlet) are wider than horizontal ones of the one or more channels. In a second example, the vertical (as illustrated in FIG. 14) ones of the one or more channels are wider nearer the fluid inlet and the fluid outlet, and taper further from the fluid inlet and the fluid outlet. In a third example, particular ones of the horizontal (as illustrated in FIG. 14) ones of the one or more channels are wider than others of the horizontal channels to support a higher fluid flow rate (e.g., more solvent from the fluid inlet) and thus are more suitable for higher-viscosity ingredients. In a fourth example, one of the one or more channels having one or more of the holes is at least twice as wide as the respective actuators. That is, if a width of each of the respective actuators (e.g., the width of a pad at the head of the respective actuator) is approximately 4 mm wide, then the one of the channels having the one or more of the holes is approximately 8 mm wide.

FIG. 15 illustrates an example cut-away perspective view 1500 of a portion of the ingredient cartridge, with some of the ingredient reservoirs removed. The view in FIG. 15 illustrates the opposite (i.e., top) side of the plate from that illustrated in FIG. 14. In FIG. 15, 1501 references a position of the one or more channels (e.g., 1401 as illustrated in FIG. 14) to better illustrate positions of the holes, 1502 illustrates one of the plurality of holes for the respective orifices of the ingredient reservoirs (e.g., a view from the opposite side of the plate from 1402 as illustrated in FIG. 14), 1503 illustrates a cut-away view of an ingredient reservoir of the cartridge, 1504 illustrates the gas inlet (e.g., 1401 as illustrated in FIG. 14), 1505 illustrates the fluid inlet (e.g., 1405 as illustrated in FIG. 14), and 1506 illustrates the connection point enabling fluid from the fluid inlet 1505 to enter the one or more channels (e.g., 1406 as illustrated in FIG. 14). Not illustrated in FIG. 15 is the entirety of a path fluidly connecting the fluid inlet to the connection point. While 1501 illustrates the position of the one or more channels, the one or more channels may not be visible in the view illustrated in FIG. 15 as the one or more channels are on the opposite side of the plate (illustrated in FIG. 14). (For example, in embodiments where the plate is formed of a transparent or translucent plastic, the one or more channels might be visible in the view illustrated in FIG. 15, but this would not likely be the case in other embodiments where the plate is formed of metal, such as aluminum, or opaque plastic.)

FIG. 16 illustrates a flowchart representing an exemplary method 1600 of preparing and dispensing a fluid mixture. Method 1600 begins (start 1610) with a request to dispense a selected fluid mixture (e.g., a beverage). A controller of the system determines, from the recipe for the selected fluid mixture, a sequence of operations of the system (e.g., control of pumps, valves, etc.) to prepare and dispense the fluid mixture. The operations in FIG. 16 illustrate an example of the sequence of operations to prepare and dispense the fluid mixture. The order of operations illustrated in FIG. 16 is merely one example, and other sequences of operations (e.g., changing an order of the illustrated operations and/or adding other operations or removing one or more of the illustrated operations) are optionally and/or selectively used in various embodiments and/or usage scenarios. Further, a size and/or an orientation of the boxes in FIG. 16 should not be considered significant.

Cartridge Actions 1620 in FIG. 16 indicates a subset of the operations that are related to the ingredient cartridge. In operation 1622, a first amount of fluid (e.g., a solvent from a solvent reservoir, and/or a mixture of two or more solvents from two or more solvent reservoirs) flows (e.g., is pumped) from the fluid inlet through the one or more channels of the ingredient cartridge, such as to "pre-wet" the one or more channels so that respective ingredients dispensed from the ingredient reservoirs are not dispensed into a "dry" channel. In some embodiments and/or usage scenarios, the fluid outlet is open (e.g., without a valve, or with an open valve), and at least some of the first amount of fluid is retained in the one or more channels due to effective backpressure into the one or more channels from air in the fluid path fed by the fluid outlet. In operation 1624, one or more of the respective ingredients from the ingredient reservoirs are dispensed into the one or more channels (mixing with any remaining amount of the first amount of fluid), and possibly flowing, at least in part, to the fluid outlet as part of an intermediate fluid mixture. In operation 1626, a second amount of fluid (e.g., solvent) flows from the fluid inlet through the one or more channels of the ingredient cartridge to the fluid outlet. In operation 1628, the second amount of fluid mixes with the dispensed ingredients and flows through the fluid outlet as (more of) the intermediate fluid mixture. The intermediate fluid mixture flows to a mixing chamber (see operation 1640). In various embodiments, the volume of the fluid and/or the force with which the fluid flows (e.g., is pumped) overcomes any backpressure at the fluid outlet. In some embodiments, not illustrated in FIG. 16, as part of and/or after operation 1628, air is forced through the fluid inlet to flush any remaining amount of the fluid and/or the dispensed ingredients to the fluid outlet. In some embodiments, the flow of the first amount of fluid in operation 1622 ends prior to a start of the dispensing of the ingredients in operation 1624, and the flow of the second amount of fluid in operation 1626 starts after an end of the dispensing of the ingredients in operation 1624. In other embodiments, the flow of the first amount of fluid in operation 1622 and/or the flow of the second amount of fluid in operation 1626 overlaps with the dispensing of the ingredients in operation 1624. In further embodiments, the flow of the first amount of fluid in operation 1622 and the flow of the second amount of fluid in operation 1626 are one continuous flow of fluid, and the dispensing of the ingredients in operation 1624 occurs during the one continuous flow.

In some embodiments, the mixing chamber in operation 1640 is a final mixing chamber, and in other embodiments, the mixing chamber is prior to a final mixing chamber. In operation 1630, one or more other fluids (e.g., respective solvents from one or more solvent reservoirs) are dispensed directly to the mixing chamber. According to various embodiments, operation 1630 occurs one or more of: prior to cartridge actions 1620; during at least some of cartridge actions 1620; after cartridge actions 1620; and any combination of the foregoing (e.g., the one or more other fluids are dispensed other than in a continuous flow). In operation 1640, the intermediate fluid mixture and the one or more other fluids mix in the mixing chamber and then flow to either a final mixing chamber (operation 1680), if there is a final mixing chamber, or directly to a dispenser (operation 1690).

In operation 1670, if there is a separate final mixing chamber (separate from the mixing chamber in operation 1640), at least one other fluid (e.g., respective solvents from one or more solvent reservoirs) is dispensed directly to the final mixing chamber where, in operation 1680, the at least one other fluid is mixed with a fluid flow from the prior mixing chamber (operation 1640).

In operation 1690, a resulting fluid mixture (either from operation 1640 if there is no final mixing chamber, or from operation 1680 if there is a final mixing chamber) is dispensed, such as through a dispenser (e.g., a nozzle).

A collection of specific embodiments, including at least some explicitly enumerated as 'EEs' (example embodiments), providing additional description of a variety of embodiment types in accordance with the concepts described in the present disclosure; these examples are not meant to be mutually exclusive, exhaustive, or restrictive; and the invention is not limited to these example embodiments but rather encompasses numerous possible modifications and variations within the scope of the issued claims and their equivalents.

EE1) An ingredient cartridge comprising: a plate; a plurality of ingredient reservoirs containing respective ingredients, having respective orifices, and sealed by respective seals, wherein each of the ingredient reservoirs is configured to dispense the respective ingredient through the plate via the respective orifice when the respective seal is unsealed; a membrane adjacent to the plate and configured to form, when pressed against the respective orifices, the respective seals; and wherein each of the respective seals is selectively able to be unsealed by not pressing the membrane against the respective orifice.

EE2) The ingredient cartridge of EE1, wherein the plate comprises one or more channels on a side of the plate adjacent to the membrane; wherein the membrane provides a surface of the one or more channels opposite a surface of the one or more channels on the side of the plate adjacent to the membrane; and wherein, according to a recipe, the respective ingredients from selected ones of the plurality of ingredient reservoirs are enabled to be dispensed into the one or more channels.

EE3) The ingredient cartridge of EE2, wherein the one or more channels are etched into the plate.

EE4) The ingredient cartridge of EE2, wherein a base plate external to the ingredient cartridge is configured to press the membrane towards the plate so that the membrane provides the surface of the one or more channels.

EE5) The ingredient cartridge of EE2, wherein the respective orifices are formed into the plate.

EE6) The ingredient cartridge of EE5, wherein the plurality of ingredient reservoirs are fixedly attached to the plate on a side of the plate opposite the side of the plate adjacent to the membrane.

EE7) The ingredient cartridge of EE2, wherein each of the plurality of ingredient reservoirs comprises a respective flat plate at one end, and the respective orifices are in the respective flat plate.

EE8) The ingredient cartridge of EE7, wherein the respective flat plate of each of the plurality of ingredient reservoirs is below a surface of the plate of the ingredient cartridge opposite the side of the plate adjacent to the membrane.

EE9) The ingredient cartridge of EE2, wherein the one or more channels are a plurality of channels; and wherein the respective ingredients from two or more of the plurality of ingredient reservoirs are configured to be dispensed via the respective orifices into a particular one of the plurality of channels.

EE10) The ingredient cartridge of EE9, wherein the respective seals of the plurality of ingredient reservoirs are selectively controllable via respective plungers external to the ingredient cartridge, each of the respective plungers configured to (a) by default press a respective portion of the membrane against the respective orifice to form the respective seal, and (b) when activated, retract so that the respective portion of the membrane is not pressed against the respective orifice, thus unsealing the respective orifice to enable dispensing of the respective ingredient.

EE11) The ingredient cartridge of EE10, wherein a width of the particular channel is such that the respective ingredient dispensed from a dispensing one of the two or more of the plurality of ingredient reservoirs is able to flow around the respective plunger of a non-dispensing one of the two or more of the plurality of ingredient reservoirs.

EE12) The ingredient cartridge of EE10, further comprising a pressurizable chamber; wherein one wall of the pressurizable chamber comprises the plate; and wherein the plurality of ingredient reservoirs are contained in the pressurizable chamber.

EE13) The ingredient cartridge of EE2, further comprising an inlet and an outlet; and wherein a flow of a solvent from the inlet to the outlet mixes with the respective ingredients dispensed from the selected ingredient reservoirs.

EE14) The ingredient cartridge of EE13, further comprising structure to direct the flow of the solvent from the inlet into the one or more channels, and to direct flow from the one or more channels to the outlet.

EE15) The ingredient cartridge of EE14, wherein the structure comprises the one or more channels.

EE16) The ingredient cartridge of EE15, wherein a base plate external to the ingredient cartridge is configured to press the membrane towards the plate so that the membrane provides the surface of the one or more channels.

EE17) The ingredient cartridge of EE15, wherein at least some of the structure is attached to the plate.

EE18) The ingredient cartridge of EE15, wherein at least some of the structure is a part of the plate.

EE19) The ingredient cartridge of EE13, wherein the flow of the solvent from the inlet to the outlet comprises an initial flow of the solvent from the inlet to the outlet to wet the one or more channels, a pause in the flow of the solvent while the respective ingredients are dispensed from the selected ingredient reservoirs, and a final flow of the solvent from the inlet to the outlet to flush the one or more channels.

EE20) The ingredient cartridge of EE1, wherein the respective seals of the plurality of ingredient reservoirs are selectively controllable via respective plungers external to the ingredient cartridge, each of the respective plungers configured to (a) by default press a respective portion of the membrane against the respective orifice to form the respective seal, and (b) when activated, retract so that the respective portion of the membrane is not pressed against the respective orifice, thus unsealing the respective orifice to enable dispensing of the respective ingredient.

EE21) The ingredient cartridge of EE20, wherein respective electromechanical valves comprise the respective plungers.

EE22) The ingredient cartridge of EE21, wherein each of the respective electromechanical valves comprises a respective solenoid.

EE23) The ingredient cartridge of EE22, wherein each of the respective electromechanical valves is a motorized valve.

EE24) The ingredient cartridge of EE20, wherein each of the respective electromechanical valves is able to move the respective plunger from a sealed position where the respective orifice is held sealed to a fully open position in which the respective orifice is unsealed as much as the respective plunger allows.

EE25) The ingredient cartridge of EE24, wherein each of the respective electromechanical valves is able to maintain the respective plunger in at least one intermediate position between the sealed position and the fully open position; and wherein, when dispensing, a flow of the respective ingredient in the intermediate position is less than a flow of the respective ingredient in the fully open position.

EE26) The ingredient cartridge of EE20, wherein a largest cross-section of the respective plunger is at least twice as large as a largest cross-section of the respective orifice so that alignment constraints of the ingredient cartridge to the respective plungers are eased.

EE27) The ingredient cartridge of EE26, wherein the largest cross-section of the respective plunger is at least four times as large as the largest cross-section of the respective orifice.

EE28) The ingredient cartridge of EE1, wherein the respective orifices are arranged in a two-dimensional structure.

EE29) The ingredient cartridge of EE28, wherein the two-dimensional structure is a rectangular grid.

EE30) The ingredient cartridge of EE1, further comprising an air-tight, pressurized chamber with a gas inlet; wherein one wall of the pressurized chamber comprises the plate; and wherein the plurality of ingredient reservoirs is contained in the pressurized chamber.

EE31) The ingredient cartridge of EE30, wherein, prior to installation of the ingredient cartridge in a dispensing system, the membrane is configured to prevent the plurality of ingredient reservoirs from leaking via the respective orifices.

EE32) The ingredient cartridge of EE31, wherein, prior to installation of the ingredient cartridge in the dispensing system, negative pressure in the pressurized chamber holds the membrane against the respective orifices.

EE33) The ingredient cartridge of EE30, wherein the pressurized chamber is configured to be pressurized via the gas inlet so that pressure is applied to the plurality of ingredient reservoirs.

EE34) The ingredient cartridge of E33, wherein the pressure applied to the plurality of ingredient reservoirs is a pressure of gas in the pressurized chamber.

EE35) The ingredient cartridge of E33, wherein a size of the respective orifice of a particular one of the plurality of ingredient reservoirs is such, compared to a viscosity of the respective ingredient in the particular ingredient reservoir, that the respective ingredient is not able to leak out of the particular ingredient reservoir via the respective orifice unless the pressure applied to the plurality of ingredient reservoirs is higher than atmospheric pressure.

EE36) The ingredient cartridge of EE33, wherein, when installed in a dispensing system, the respective seals of the plurality of ingredient reservoirs are held sealed until the pressure applied to the plurality of ingredient reservoirs is greater than a threshold value.

EE37) The ingredient cartridge of EE33, wherein an amount of the respective ingredient dispensed from a particular one of the plurality of ingredient reservoirs is controlled by one or more of an amount of the pressure applied to the plurality of ingredient reservoirs and a duration of time the respective orifice of the particular ingredient reservoir is unsealed.

EE38) The ingredient cartridge of EE37, wherein a controller external to the ingredient cartridge is programmed to dispense the amount of the respective ingredient dispensed from the particular ingredient reservoir by controlling the duration of time the respective orifice of the particular ingredient reservoir is unsealed.

EE39) The ingredient cartridge of EE38, wherein the amount of the respective ingredient dispensed from the particular ingredient reservoir is a function of one or more of viscosity of the respective ingredient and a size of the respective orifice of the particular ingredient reservoir.

EE40) The ingredient cartridge of EE38, wherein the controller is further programmed to dispense the amount of the respective ingredient dispensed from the particular ingredient reservoir by controlling a degree to which the respective orifice of the particular ingredient reservoir is unsealed.

EE41) The ingredient cartridge of EE38, wherein the controller is further programmed to dispense the amount of the respective ingredient dispensed from the particular ingredient reservoir by controlling the amount of the pressure applied to the plurality of ingredient reservoirs.

EE42) The ingredient cartridge of EE37, wherein a pressure sensor measures the amount of the pressure applied to the plurality of ingredient reservoirs; and wherein a controller external to the ingredient cartridge is configured to dispense the amount of the respective ingredient dispensed from the particular ingredient reservoir as a function of a change in the measured pressure while the respective orifice of the particular ingredient reservoir is unsealed.

EE43) The ingredient cartridge of EE42, wherein the pressure sensor is external to the ingredient cartridge.

EE44) The ingredient cartridge of any of EE39 to EE43, wherein the controller is further programmed to dispense a wide range in the amount of the respective ingredient dispensed from the particular ingredient reservoir.

EE45) The ingredient cartridge of EE44, wherein the wide range is at least a factor of one hundred.

EE46) The ingredient cartridge of EE44, wherein the wide range is at least a factor of one thousand.

EE47) The ingredient cartridge of EE1, further comprising an inlet and an outlet; and wherein a flow of a solvent from the inlet to the outlet mixes with the respective ingredients dispensed from dispensing ones of the plurality of ingredient reservoirs.

EE48) The ingredient cartridge of EE47, wherein the flow of the solvent from the inlet to the outlet comprises an initial flow of the solvent from the inlet to the outlet, a pause in the flow of the solvent while the respective ingredients are dispensed from the dispensing ones of the plurality of ingredient reservoirs, and a final flow of the solvent.

EE49) The ingredient cartridge of EE48, wherein the pause in the flow of the solvent begins before and ends after dispensing the respective ingredients from the dispensing ones of the plurality of ingredient reservoirs.

EE50) The ingredient cartridge of EE48, wherein the pause in the flow of the solvent is not as long as a duration of dispensing the respective contents from the dispensing ones of the plurality of ingredient reservoirs.

EE51) The ingredient cartridge of EE1, wherein the plurality of ingredient reservoirs is positioned above the respective orifices so that the respective ingredients from the plurality of ingredient reservoirs are enabled to be dispensed, at least in part, by gravity.

EE52) The ingredient cartridge of EE1, wherein the membrane is attached to at least a portion of the plate.

EE53) The ingredient cartridge of EE52, wherein the membrane is attached to the at least a portion of the plate by an adhesive.

EE54) The ingredient cartridge of EE52, wherein the plate comprises recesses on a side of the plate adjacent to the membrane, the recesses forming one or more channels; wherein, according to a recipe, the respective ingredients from selected ones of the plurality of ingredient reservoirs are enabled to be dispensed into the one or more channels; and wherein non-recessed portions of the plate comprise the at least a portion of the plate.

EE101) A fluid mixture dispensing system comprising: (1) a cartridge comprising: (a) a plurality of ingredient reservoirs containing respective ingredients, having respective orifices, and sealed by respective seals; (b) an inlet; and (c) an outlet; (2) a membrane adjacent to a plate of the cartridge and configured to form, when pressed against the respective orifices, the respective seals; and (3) a plurality of electromechanical valves, each of the plurality of electromechanical valves respective to one of the plurality of ingredient reservoirs and configured to (a) in a default state, press against the membrane to cause the membrane to form the respective seal of the respective ingredient reservoir, and (b) in an active state, retract from the membrane to dispense the respective ingredient via the respective orifice; and wherein at least one channel formed between the membrane and the plate of the cartridge allows (a) solvent flowing from the inlet to mix with the respective ingredients from dispensing ones of the plurality of ingredient reservoirs to form an intermediate fluid mixture, and (b) the intermediate fluid mixture to flow to the outlet.

EE102) The fluid mixture dispensing system of EE101, wherein the cartridge further comprises a pressurizable chamber one wall of which comprises the plate; and wherein the plurality of ingredient reservoirs is contained in the pressurizable chamber.

EE103) The fluid mixture dispensing system of EE101, wherein the membrane comprises a silicone sheet disposed over the respective orifices of the plurality of ingredient reservoirs.

EE104) The fluid mixture dispensing system of EE101, wherein the membrane comprises a thermoelastomer or thermoplastic elastomer sheet disposed over the respective orifices of the plurality of ingredient reservoirs.

EE105) The fluid mixture dispensing system of EE101, wherein the cartridge further comprises the membrane.

EE106) The fluid mixture dispensing system of EE105, wherein the membrane is attached to the plate of the cartridge.

EE107) The fluid mixture dispensing system of EE106, wherein the membrane is attached to the plate of the cartridge by an adhesive.

EE108) The fluid mixture dispensing system of EE101, wherein each of the plurality of electromechanical valves comprises a respective solenoid.

EE109) The fluid mixture dispensing system of EE101, wherein each of the plurality of electromechanical valves comprises a respective spring and a respective plunger; and wherein, in the default state, the respective spring is configured to press the respective plunger against the membrane to cause the membrane to form the respective seal of the respective ingredient reservoir.

EE110) The fluid mixture dispensing system of EE109, wherein each of the plurality of electromechanical valves further comprises a respective coil; and wherein, in the active state, the respective coil is configured to retract the respective plunger from the membrane to dispense the respective ingredient via the respective orifice.

EE111) The fluid mixture dispensing system of EE110, wherein the cartridge further comprises a pressurizable chamber one wall of which comprises the plate; and wherein the plurality of ingredient reservoirs is contained in the pressurizable chamber.

EE112) The fluid mixture dispensing system of EE101, wherein the solvent flowing from the inlet comprises an initial flow of the solvent from the inlet to wet the at least one channel, a pause in a flow of the solvent from the inlet while dispensing the respective ingredients from the dispensing ones of the plurality of ingredient reservoirs, and a final flow of the solvent from the inlet to the outlet to flush the at least one channel to the outlet.

EE113) The fluid mixture dispensing system of EE112, wherein the pause in the flow of the solvent begins before and ends after the dispensing the respective ingredients from the dispensing ones of the plurality of ingredient reservoirs.

EE114) The fluid mixture dispensing system of EE112, wherein the pause in the flow of the solvent is not as long as a duration of the dispensing the respective ingredients from the dispensing ones of the plurality of ingredient reservoirs.

EE115) The fluid mixture dispensing system of EE101, wherein the cartridge further comprises the plate; and wherein the respective orifices of the plurality of ingredient reservoirs are in the plate.

EE116) The fluid mixture dispensing system of EE115, wherein the cartridge further comprises the membrane; and wherein the membrane is attached to the plate.

EE117) The fluid mixture dispensing system of EE101, wherein the inlet comprises a valve configured to enable or disable a flow of the solvent.

EE118) The fluid mixture dispensing system of EE101, wherein the outlet comprises a valve configured to enable or disable a flow of the intermediate fluid mixture.

EE119) The fluid mixture dispensing system of EE101, wherein the at least one channel is a plurality of channels; and wherein the respective ingredients from two or more of the plurality of ingredient reservoirs are configured to be dispensed via the respective orifices into a particular one of the plurality of channels.

EE120) The fluid mixture dispensing system of EE119, wherein the respective orifices of the plurality of ingredient reservoirs are arranged in a two-dimensional structure.

EE121) The fluid mixture dispensing system of EE120, wherein the two-dimensional structure is a rectangular grid.

EE122) The fluid mixture dispensing system of EE120, wherein the two-dimensional structure comprises one or more rows of the respective orifices of the plurality of ingredient reservoirs; wherein a particular row of the one or more rows of the respective orifices of the plurality of ingredient reservoirs includes at least three of the respective orifices of the plurality of ingredient reservoirs; and wherein the ones of the plurality of ingredient reservoirs having the at least three of the respective orifices are configured to be dispensed into the particular channel.

EE123) The fluid mixture dispensing system of EE119, wherein a width of the particular channel is wider than the respective seal of a non-dispensing one of the two or more of the plurality of ingredient reservoirs.

EE124) The fluid mixture dispensing system of EE119, wherein a width of the particular channel is such that the solvent flowing from the inlet flows around the respective seal of a non-dispensing one of the two or more of the plurality of ingredient reservoirs.

EE125) The fluid mixture dispensing system of any of EE123 or EE124, wherein a percentage of the width of the particular channel not blocked by the respective seal of the non-dispensing one of the two or more of the plurality of ingredient reservoirs is at least 25%.

EE126) The fluid mixture dispensing system of any of EE123 or EE124, wherein a percentage of the width of the particular channel not blocked by the respective seal of the non-dispensing one of the two or more of the plurality of ingredient reservoirs is at least 50%.

EE127) The fluid mixture dispensing system of any of EE125 or EE126, wherein the respective seal of the non-dispensing one of the two or more of the plurality of ingredient reservoirs is, within a margin of five percent of the width of the particular channel, centered within the particular channel.

EE128) The fluid mixture dispensing system of EE119, wherein the cartridge further comprises structure to direct the solvent flowing from the inlet into the plurality of channels, and to direct flow from the plurality of channels to the outlet.

EE129) The fluid mixture dispensing system of EE128, wherein the flow from the plurality of channels to the outlet comprises the intermediate fluid mixture.

EE130) The fluid mixture dispensing system of EE128, wherein at least a part of the structure is on a side of the plate of the cartridge facing the membrane.

EE131) The fluid mixture dispensing system of EE130, wherein the at least a part of the structure comprises one or more walls; and wherein the plurality of channels is formed by recesses between the one or more walls.

EE132) The fluid mixture dispensing system of EE128, wherein the plate of the cartridge comprises at least a part of the structure.

EE133) The fluid mixture dispensing system of EE128, wherein at least a part of the structure is attached to the plate of the cartridge.

EE134) The fluid mixture dispensing system of EE128, further comprising a base plate; and wherein the base plate is configured to press the membrane against at least a part of the structure.

EE135) The fluid mixture dispensing system of EE134, wherein the plurality of electromechanical valves is attached to the base plate.

EE136) The fluid mixture dispensing system of EE101, further comprising a mixing chamber configured to receive the intermediate fluid mixture.

EE137) The fluid mixture dispensing system of EE136, further comprising one or more solvent reservoirs configured to selectively dispense respective solvents into the mixing chamber.

EE138) The fluid mixture dispensing system of EE137, wherein the mixing chamber is a first mixing chamber; and further comprising a second mixing chamber configured to receive a flow from the first mixing chamber and an additional solvent.

EE139) The fluid mixture dispensing system of EE138, wherein the additional solvent comprises a sweetener.

EE140) The fluid mixture dispensing system of EE138, wherein the additional solvent comprises carbonated water.

EE141) The fluid mixture dispensing system of EE136, further comprising a dispenser configured to receive a flow from the mixing chamber.

EE142) The fluid mixture dispensing system of EE101, further comprising a controller programmed to control, according to a recipe, activation of selected ones of the plurality of electromechanical valves to dispense the respective ingredients of the respective ones of the plurality of ingredient reservoirs.

EE143) The fluid mixture dispensing system of EE142, wherein the cartridge further comprises a pressurized chamber with a gas inlet; wherein one wall of the pressurized chamber comprises the plate of the cartridge; and wherein the plurality of ingredient reservoirs is contained in the pressurized chamber.

EE144) The fluid mixture dispensing system of EE143, wherein the pressurized chamber is air-tight.

EE145) The fluid mixture dispensing system of EE143, wherein, prior to installation of the cartridge in the fluid mixture dispensing system, the membrane is configured to prevent the plurality of ingredient reservoirs from leaking via the respective orifices.

EE146) The fluid mixture dispensing system of EE145, wherein, prior to installation of the cartridge in the fluid mixture dispensing system, negative pressure in the pressurized chamber holds the membrane against the respective orifices of the plurality of ingredient reservoirs.

EE147) The fluid mixture dispensing system of EE143, wherein the pressurized chamber is configured to be pressurized via the gas inlet so that pressure is applied to the plurality of ingredient reservoirs.

EE148) The fluid mixture dispensing system of EE147, wherein the pressure applied to the plurality of ingredient reservoirs is a pressure of gas in the pressurized chamber.

EE149) The fluid mixture dispensing system of EE147, wherein, when installed in the fluid mixture dispensing system, the respective seals of the plurality of ingredient reservoirs are configured to be held sealed until the pressure applied to the plurality of ingredient reservoirs is greater than a threshold value.

EE150) The fluid mixture dispensing system of EE147, wherein an amount of the respective ingredient dispensed from a particular one of the plurality of ingredient reservoirs is controlled by one or more of: (a) an amount of the pressure applied to the plurality of ingredient reservoirs; and (b) a duration during which the particular ingredient reservoir is enabled to dispense.

EE151) The fluid mixture dispensing system of EE150, wherein the controller is further programmed to dispense the amount of the respective ingredient dispensed from the particular ingredient reservoir by controlling the duration during which the particular ingredient reservoir is enabled to dispense.

EE152) The fluid mixture dispensing system of EE151, wherein the amount of the respective ingredient dispensed from the particular ingredient reservoir is a function of one or more of viscosity of the respective ingredient of the particular ingredient reservoir and a size of the respective orifice of the particular ingredient reservoir.

EE153) The fluid mixture dispensing system of EE151, wherein the controller is further programmed to dispense the amount of the respective ingredient dispensed from the particular ingredient reservoir by controlling a rate at which the particular ingredient reservoir is enabled to dispense.

EE154) The fluid mixture dispensing system of EE153, wherein the controller is further programmed to control the rate at which the particular ingredient reservoir is enabled to dispense by controlling a degree to which the respective seal of the particular ingredient reservoir is unsealed.

EE155) The fluid mixture dispensing system of EE151, wherein the controller is further programmed to dispense the amount of the respective ingredient dispensed from the particular ingredient reservoir by controlling the amount of the pressure applied to the plurality of ingredient reservoirs.

EE156) The fluid mixture dispensing system of EE150, further comprising a pressure monitor configured to monitor the amount of the pressure applied to the plurality of ingredient reservoirs; and wherein the controller is further programmed to dispense the amount of the respective ingredient dispensed from the particular ingredient reservoir as a function of a change in the monitored pressure during dispensing of the respective ingredient of the particular ingredient reservoir.

EE157) The fluid mixture dispensing system of any of EE150 to EE156, wherein the controller is programmed to dispense a wide range in the amount of the respective ingredient dispensed from the particular ingredient reservoir.

EE158) The fluid mixture dispensing system of EE157, wherein the wide range is at least a factor of one hundred.

EE159) The fluid mixture dispensing system of EE157, wherein the wide range is at least a factor of one thousand.

EE160) The fluid mixture dispensing system of EE101, wherein each of the plurality of electromechanical valves comprises a respective plunger which, in the default state, is configured to press against the membrane to cause the membrane to form the respective seal of the respective ingredient reservoir, and, in the active state, is configured to retract from the membrane to dispense the respective ingredient via the respective orifice.

EE161) The fluid mixture dispensing system of EE160, wherein the cartridge further comprises a pressurizable chamber one wall of which comprises the plate; and wherein the plurality of ingredient reservoirs is contained in the pressurizable chamber.

EE162) The fluid mixture dispensing system of EE160, wherein each of the plurality of electromechanical valves is configured to move the respective plunger from, in the default state, a sealed position where the respective orifice of the respective ingredient reservoir is held sealed by the respective seal of the respective ingredient reservoir to, in the active state, a fully open position in which the respective orifice of the respective ingredient reservoir is unsealed as much as the respective plunger allows.

EE163) The fluid mixture dispensing system of EE162, wherein each of the plurality of electromechanical valves is further configured to maintain the respective plunger in at least one intermediate position between the sealed position and the fully open position; and wherein a rate of the flow of the respective ingredient of the respective ingredient reservoir is less in the intermediate position than in the fully open position.

EE164) The fluid mixture dispensing system of EE163, further comprising a controller programmed to set the intermediate position of each of the plurality of electromechanical valves between the sealed position and the fully open position to control the rate of the flow of the respective ingredient of the respective ingredient reservoir to be less than the rate of the flow of the respective ingredient of the respective ingredient reservoir in the fully open position.

EE165) The fluid mixture dispensing system of EE101, further comprising one or more solvent reservoirs configured to dispense a respective solvent to flow to the inlet.

EE166) The fluid mixture dispensing system of EE165, wherein each of the one or more solvent reservoirs comprises a respective electromechanical valve controlling dispensing of the respective solvent.

EE167) The fluid mixture dispensing system of EE166, further comprising one or more pumps configured to move the respective solvents dispensed from dispensing ones of the one or more solvent reservoirs.

EE168) The fluid mixture dispensing system of EE166, further comprising a controller programmed to control, according to a recipe, activation of selected ones of the respective electromechanical valves of the one or more solvent reservoirs to dispense the respective solvents of the selected ones of the one or more solvent reservoirs.

EE169) The fluid mixture dispensing system of EE168, wherein at least one of the one or more solvent reservoirs is configured to be selectively controllable by the controller to dispense the respective solvent to the inlet, to a mixing chamber, or to both the inlet and the mixing chamber.

EE170) The fluid mixture dispensing system of EE165, wherein the one or more solvent reservoirs are at least two solvent reservoirs; and wherein a mixture of the respective solvents of two of the at least two solvent reservoirs is configured to flow to the inlet.

EE201) A fluid mixture dispensing system comprising: (1) a cartridge comprising: (a) at least one ingredient reservoir containing a respective ingredient, having a respective orifice, and sealed by a respective seal; (b) an inlet; and (c) an outlet; (2) a membrane attached to a raised surface of a plate of the cartridge and configured to form, when pressed against the respective orifice of each of the at least one ingredient reservoir, the respective seal; and (3) at least one electromechanical valve, each of the at least one electromechanical valve respective to one of the at least one ingredient reservoir and configured to cause the membrane to form the respective seal of the respective ingredient reservoir; and wherein at least one channel formed between the membrane and the plate of the cartridge allows (a) solvent flowing from the inlet to mix with the respective ingredient from dispensing ones of the at least one ingredient reservoir to form an intermediate fluid mixture, and (b) the intermediate fluid mixture to flow to the outlet.

EE202) The fluid mixture dispensing system of EE201, wherein the cartridge further comprises a pressurizable chamber one wall of which comprises the plate; and wherein the at least one ingredient reservoir is contained in the pressurizable chamber.

EE203) The fluid mixture dispensing system of EE201, wherein the cartridge further comprises the membrane.

EE204) The fluid mixture dispensing system of EE203, wherein the membrane is attached to the plate of the cartridge.

EE205) The fluid mixture dispensing system of EE201, further comprising a controller programmed to control, according to a recipe, activation of selected ones of the at least one electromechanical valve to dispense the respective ingredients of the respective ones of the at least one ingredient reservoir.

EE206) The fluid mixture dispensing system of EE205, wherein the cartridge further comprises a pressurized chamber with a gas inlet; wherein one wall of the pressurized chamber comprises the plate of the cartridge; and wherein the at least one ingredient reservoir is contained in the pressurized chamber.

EE207) The fluid mixture dispensing system of EE206, wherein the pressurized chamber is configured to be pressurized via the gas inlet so that pressure is applied to the at least one ingredient reservoir.

EE208) The fluid mixture dispensing system of EE207, wherein an amount of the respective ingredient dispensed from a particular one of the at least one ingredient reservoir is controlled by one or more of: (i) an amount of the pressure applied to the at least one ingredient reservoir; and (ii) a duration during which the particular ingredient reservoir is enabled to dispense.

EE209) The fluid mixture dispensing system of EE208, wherein the controller is further programmed to dispense the amount of the respective ingredient dispensed from the particular ingredient reservoir by controlling the duration during which the particular ingredient reservoir is enabled to dispense.

EE210) The fluid mixture dispensing system of EE201, wherein each of the at least one electromechanical valve comprises a respective plunger which, in a default state, is configured to press against the membrane to cause the membrane to form the respective seal of the respective ingredient reservoir, and, in an active state, is configured to retract from the membrane to enable the respective ingredient reservoir to dispense the respective ingredient via the respective orifice.

EE211) The fluid mixture dispensing system of EE201, further comprising one or more solvent reservoirs configured to dispense a respective solvent to flow to the inlet.

EE212) The fluid mixture dispensing system of EE211, wherein the one or more solvent reservoirs are at least two solvent reservoirs; and wherein a mixture of the respective solvents of two of the at least two solvent reservoirs is configured to flow to the inlet.

EE301) A method used in a fluid mixture dispensing system having a cartridge, the cartridge comprising (a) a plurality of ingredient reservoirs containing respective ingredients, having respective orifices, and sealed by respective seals, (b) an inlet, and (c) an outlet, the method comprising: keeping closed one or more non-dispensing ones of a plurality of electromechanical valves, each of the plurality of electromechanical valves respective to one of the plurality of ingredient reservoirs, wherein each of the non-dispensing electromechanical valves seals the respective seal of the respective one of the plurality of ingredient reservoirs; selectively opening one or more dispensing ones of the plurality of electromechanical valves, wherein each of the dispensing electromechanical valves unseals the respective seal of the respective one of the plurality of ingredient reservoirs; dispensing at least some of the respective ingredients from each of the ones of the plurality of ingredient reservoirs whose respective seal is unsealed; mixing, in at least one channel formed between a membrane and a plate of the cartridge, solvent from the inlet with the dispensed respective ingredients to form an intermediate fluid mixture; flowing the intermediate fluid mixture to the outlet; and wherein the membrane is configured to form, when pressed by a respective plunger of each of the plurality of electromechanical valves against the respective orifice of the respective one of the plurality of ingredient reservoirs, the respective seal of the respective one of the plurality of ingredient reservoirs.

EE302) The method of EE301, wherein the keeping closed is a default state of each of the non-dispensing ones of the plurality of electromechanical valves.

EE303) The method of EE302, wherein each of the electromechanical valves comprises a respective solenoid.

EE304) The method of EE301, further comprising pressing, by the respective plunger of each of the non-dispensing ones of the plurality of electromechanical valves, the membrane against the respective orifice of the respective one of the plurality of ingredient reservoirs.

EE305) The method of EE304, further comprising forming, by the pressing of the respective plunger of each of the non-dispensing ones of the plurality of electromechanical valves against the respective orifice of the respective one of the plurality of ingredient reservoirs, the respective seal of the respective one of the plurality of ingredient reservoirs.

EE306) The method of EE301, wherein the cartridge further comprises a pressurized chamber with a gas inlet; wherein one wall of the pressurized chamber comprises the plate of the cartridge; wherein the plurality of ingredient reservoirs is contained in the pressurized chamber; and further comprising pressurizing, prior to the selectively opening, the pressurized chamber via the gas inlet so that pressure is applied to the plurality of ingredient reservoirs.

EE307) The method of EE306, further comprising controlling, by a controller, the selectively opening according to a recipe for a beverage.

EE308) The method of EE307, further comprising controlling, by the controller, an amount of the respective ingredient dispensed from a particular one of the ones of the plurality of ingredient reservoirs whose respective seal is unsealed by one or more of: (i) an amount of the pressure applied to the plurality of ingredient reservoirs; and (ii) a duration during of the selectively opening of the particular ingredient reservoir.

EE309) The method of EE301, wherein the mixing comprises: flowing, prior to the dispensing, a first portion of the solvent from the inlet to wet the at least one channel; pausing the flowing of the first portion of the solvent from the inlet; and flowing, subsequent to the pausing, a second portion of the solvent from the inlet; and wherein at least a part of the dispensing is during the pausing.

EE310) The method of EE309, further comprising flowing the intermediate fluid mixture from the outlet to a mixing chamber.

EE311) The method of EE310, wherein the solvent from the inlet is a first solvent from at least one solvent reservoir; and further comprising flowing a second solvent from the at least one solvent reservoir to the mixing chamber to mix with the intermediate fluid mixture.

EE312) The method of EE311, further comprising dispensing contents of the mixing chamber via a dispenser.

EE313) The method of EE311, further comprising mixing two or more solvents from the at least one solvent reservoir to form the solvent from the inlet, EE314) The method of EE311, further comprising pumping at least one solvent from the at least one solvent reservoir to provide the first portion of the solvent and the second portion of the solvent.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps, method operations, and instructions described herein in the form of an algorithm. It should be noted that the process steps, method operations, and instructions of the present disclosure could be embodied in software, firmware, or hardware and, when embodied in software, could be downloaded to reside on and be operated from different platforms used by a variety of operating systems. Unless specifically stated otherwise as apparent from the following, it is appreciated that, throughout the description, descriptions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMS, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method operations. The structure for a variety of these systems can appear from the description above. In addition, the present disclosure is not described with reference to any particular programming language. It will be appreciated that a variety of programming languages may be used to implement the teachings of the present invention as described herein.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments illustrated, but is to be accorded the widest scope consistent with the principles and features disclosed herein.

What is claimed is:

1. A fluid mixture dispensing system comprising:
(1) a cartridge comprising: (a) a plurality of ingredient reservoirs containing respective ingredients, and sealed by respective seals; (b) an inlet; and (c) an outlet;

(2) a membrane adjacent to a plate of the cartridge, the plate including respective orifices corresponding to the plurality of ingredient reservoirs, and configured to form, when pressed against the respective orifices, the respective seals; and (3) a plurality of electromechanical valves, each of the plurality of electromechanical valves respective to one of the plurality of ingredient reservoirs and configured to (a) in a default state, press against the membrane to cause the membrane to form the respective seal of the respective ingredient reservoir, and (b) in an active state, retract from the membrane to dispense the respective ingredient via the respective orifice;

wherein the respective orifices are on a side of the plate opposite to the plurality of ingredient reservoirs; and wherein at least one channel formed between the membrane and the plate of the cartridge allows (a) solvent from the inlet to mix with the respective ingredients from dispensing ones of the plurality of ingredient reservoirs to form an intermediate fluid mixture, and (b) the intermediate fluid mixture to flow to the outlet.

2. The fluid mixture dispensing system of claim 1,
wherein the cartridge further comprises a pressurizable chamber one wall of which comprises the plate; and
wherein the plurality of ingredient reservoirs is contained in the pressurizable chamber.

3. The fluid mixture dispensing system of claim 1,
wherein each of the plurality of electromechanical valves comprises a respective spring and a respective plunger; and
wherein, in the default state, the respective spring is configured to press the respective plunger against the membrane to cause the membrane to form the respective seal of the respective ingredient reservoir.

4. The fluid mixture dispensing system of claim 3,
wherein each of the plurality of electromechanical valves further comprises a respective coil; and
wherein, in the active state, the respective coil is configured to retract the respective plunger from the membrane to enable the respective ingredient reservoir to dispense the respective ingredient via the respective orifice.

5. The fluid mixture dispensing system of claim 1,
wherein the cartridge further comprises the membrane; and
wherein the membrane is attached to the plate.

6. The fluid mixture dispensing system of claim 1,
wherein the at least one channel is a plurality of channels; and
wherein the respective ingredients from two or more of the plurality of ingredient reservoirs are configured to be dispensed via the respective orifices into a particular one of the plurality of channels.

7. The fluid mixture dispensing system of claim 6,
wherein a width of the particular channel is wider than the respective seal of a non-dispensing one of the two or more of the plurality of ingredient reservoirs.

8. The fluid mixture dispensing system of claim 6,
wherein a width of the particular channel is such that the solvent flowing from the inlet flows around the respective seal of a non-dispensing one of the two or more of the plurality of ingredient reservoirs.

9. The fluid mixture dispensing system of claim 8,
wherein a percentage of the width of the particular channel not blocked by the respective seal of the non-dispensing one of the two or more of the plurality of ingredient reservoirs is at least 25%.

10. The fluid mixture dispensing system of claim 1,
further comprising a controller configured to control, according to a recipe, activation of selected ones of the plurality of electromechanical valves to dispense the respective ingredients of the respective ones of the plurality of ingredient reservoirs.

11. The fluid mixture dispensing system of claim 10,
wherein the cartridge further comprises a pressurized chamber with a gas inlet;
wherein one wall of the pressurized chamber comprises the plate of the cartridge; and
wherein the plurality of ingredient reservoirs is contained in the pressurized chamber.

12. The fluid mixture dispensing system of claim 11,
wherein the pressurized chamber is configured to be pressurized via the gas inlet so that pressure is applied to the plurality of ingredient reservoirs.

13. The fluid mixture dispensing system of claim 12,
wherein an amount of the respective ingredient dispensed from a particular one of the plurality of ingredient reservoirs is controlled by one or more of: (a) an amount of the pressure applied to the plurality of ingredient reservoirs; and (b) a duration during which the particular ingredient reservoir is enabled to dispense.

14. A fluid mixture dispensing system comprising:
(1) a cartridge comprising: (a) at least one ingredient reservoir containing a respective ingredient, and sealed by a respective seal; (b) an inlet; and (c) an outlet;

(2) a membrane attached to a raised surface of a plate of the cartridge, the plate including at least one respective orifice corresponding to the at least one ingredient reservoir, and configured to form, when pressed against the respective orifice of each of the at least one ingredient reservoir, the respective seal; and (3) at least one electromechanical valve, each of the at least one electromechanical valve respective to one of the at least one ingredient reservoir and configured to cause the membrane to form the respective seal of the respective ingredient reservoir;

wherein the at least one respective orifice is on a side of the plate opposite to the at least one ingredient reservoir; and wherein at least one channel formed between the membrane and the plate of the cartridge allows (a) solvent from the inlet to mix with the respective ingredient from dispensing ones of the at least one ingredient reservoir to form an intermediate fluid mixture, and (b) the intermediate fluid mixture to flow to the outlet.

15. The fluid mixture dispensing system of claim 14,
wherein the cartridge further comprises a pressurizable chamber one wall of which comprises the plate; and
wherein the at least one ingredient reservoir is contained in the pressurizable chamber.

16. The fluid mixture dispensing system of claim 14,
wherein the cartridge further comprises the membrane.

17. The fluid mixture dispensing system of claim 16,
wherein the membrane is attached to the plate of the cartridge.

18. The fluid mixture dispensing system of claim 14,
further comprising a controller programmed to control, according to a recipe, activation of selected ones of the at least one electromechanical valve to dispense the respective ingredients of the respective ones of the at least one ingredient reservoir.

19. The fluid mixture dispensing system of claim 18,
wherein the cartridge further comprises a pressurized chamber with a gas inlet;
wherein one wall of the pressurized chamber comprises the plate of the cartridge; and
wherein the at least one ingredient reservoir is contained in the pressurized chamber.

20. The fluid mixture dispensing system of claim 19,
wherein an amount of the respective ingredient dispensed from a particular one of the at least one ingredient reservoir is controlled by one or more of: (i) an amount of the pressure applied to the at least one ingredient reservoir; and (ii) a duration during which the particular ingredient reservoir is enabled to dispense.

21. The fluid mixture dispensing system of claim 14,
wherein each of the at least one electromechanical valve comprises a respective plunger which, in a default state, is configured to press against the membrane to cause the membrane to form the respective seal of the respective ingredient reservoir, and, in an active state, is configured to retract from the membrane to enable the respective ingredient reservoir to dispense the respective ingredient via the respective orifice.

22. A method used in a fluid mixture dispensing system having a cartridge, the cartridge comprising (a) a plurality of ingredient reservoirs containing respective ingredients, having respective orifices, and sealed by respective seals, (b) an inlet, and (c) an outlet, the method comprising:
keeping closed one or more non-dispensing ones of a plurality of electromechanical valves, each of the plurality of electromechanical valves respective to one of the plurality of ingredient reservoirs, wherein each of the non-dispensing electromechanical valves seals the respective seal of the respective one of the plurality of ingredient reservoirs;
selectively opening one or more dispensing ones of the plurality of electromechanical valves, wherein each of the dispensing electromechanical valves unseals the respective seal of the respective one of the plurality of ingredient reservoirs;
dispensing at least some of the respective ingredients from each of the ones of the plurality of ingredient reservoirs whose respective seal is unsealed;
mixing, in at least one channel formed between a membrane and a plate of the cartridge, solvent from the inlet with the dispensed respective ingredients to form an intermediate fluid mixture;
flowing the intermediate fluid mixture to the outlet;
wherein the membrane is configured to form, when pressed by a respective plunger of each of the plurality of electromechanical valves against the respective orifice of the respective one of the plurality of ingredient reservoirs, the respective seal of the respective one of the plurality of ingredient reservoirs;
wherein the mixing comprises:
flowing, prior to the dispensing, a first portion of the solvent from the inlet to wet the at least one channel;
pausing the flowing of the first portion of the solvent from the inlet; and
flowing, subsequent to the pausing, a second portion of the solvent from the inlet; and
wherein at least a part of the dispensing is during the pausing.

23. The method of claim 22,
wherein the keeping closed is a default state of each of the non-dispensing ones of the plurality of electromechanical valves.

24. The method of claim 23,
wherein each of the electromechanical valves comprises a respective solenoid.

25. The method of claim 22, further comprising:
pressing, by the respective plunger of each of the non-dispensing ones of the plurality of electromechanical valves, the membrane against the respective orifice of the respective one of the plurality of ingredient reservoirs; and
forming, by the pressing of the respective plunger of each of the non-dispensing ones of the plurality of electromechanical valves against the respective orifice of the respective one of the plurality of ingredient reservoirs, the respective seal of the respective one of the plurality of ingredient reservoirs.

26. The method of claim 22,
wherein the cartridge further comprises a pressurized chamber with a gas inlet;
wherein one wall of the pressurized chamber comprises the plate of the cartridge;
wherein the plurality of ingredient reservoirs is contained in the pressurized chamber; and
further comprising pressurizing, prior to the selectively opening, the pressurized chamber via the gas inlet so that pressure is applied to the plurality of ingredient reservoirs.

27. The method of claim 26, further comprising:
controlling, by a controller, the selectively opening according to a recipe for a beverage; and
controlling, by the controller, an amount of the respective ingredient dispensed from a particular one of the ones of the plurality of ingredient reservoirs whose respective seal is unsealed by one or more of: (i) an amount of the pressure applied to the plurality of ingredient reservoirs; and (ii) a duration during of the selectively opening of the particular ingredient reservoir.

28. The method of claim 22,
wherein the solvent from the inlet is a first solvent from at least one solvent reservoir; and
further comprising:
flowing the intermediate fluid mixture from the outlet to a mixing chamber; and
flowing a second solvent from the at least one solvent reservoir to the mixing chamber to mix with the intermediate fluid mixture.

29. A fluid mixture dispensing system comprising:
(1) a cartridge comprising: (a) a plurality of ingredient reservoirs containing respective ingredients, having respective orifices, and sealed by respective seals; (b) an inlet; and (c) an outlet;
(2) a membrane adjacent to a plate of the cartridge and configured to form, when pressed against the respective orifices, the respective seals; and
(3) a plurality of electromechanical valves, each of the plurality of electromechanical valves respective to one of the plurality of ingredient reservoirs and configured to (a) in a default state, press against the membrane to cause the membrane to form the respective seal of the respective ingredient reservoir, and (b) in an active state, retract from the membrane to dispense the respective ingredient via the respective orifice;
wherein at least one channel formed between the membrane and the plate of the cartridge allows (a) solvent from the inlet to mix with the respective ingredients from dispensing ones of the plurality of ingredient reservoirs to form an intermediate fluid mixture, and (b) the intermediate fluid mixture to flow to the outlet;

wherein the at least one channel is a plurality of channels;
wherein the respective ingredients from two or more of the plurality of ingredient reservoirs are configured to be dispensed via the respective orifices into a particular one of the plurality of channels; and
wherein a width of the particular channel is such that the solvent flowing from the inlet flows around the respective seal of a non-dispensing one of the two or more of the plurality of ingredient reservoirs.

30. The fluid mixture dispensing system of claim 29,
wherein a percentage of the width of the particular channel not blocked by the respective seal of the non-dispensing one of the two or more of the plurality of ingredient reservoirs is at least 25%.

31. A fluid mixture dispensing system comprising:
(1) a cartridge comprising: (a) a plurality of ingredient reservoirs containing respective ingredients, having respective orifices, and sealed by respective seals; (b) an inlet; and (c) an outlet;
(2) a membrane adjacent to a plate of the cartridge and configured to form, when pressed against the respective orifices, the respective seals; and
(3) a plurality of electromechanical valves, each of the plurality of electromechanical valves respective to one of the plurality of ingredient reservoirs and configured to (a) in a default state, press against the membrane to cause the membrane to form the respective seal of the respective ingredient reservoir, and (b) in an active state, retract from the membrane to dispense the respective ingredient via the respective orifice;
(4) a controller configured to control, according to a recipe, activation of selected ones of the plurality of electromechanical valves to dispense the respective ingredients of the respective ones of the plurality of ingredient reservoirs;
wherein the cartridge further comprises a pressurized chamber with a gas inlet;
wherein one wall of the pressurized chamber comprises the plate of the cartridge;
wherein the plurality of ingredient reservoirs is contained in the pressurized chamber; and
wherein at least one channel formed between the membrane and the plate of the cartridge allows (a) solvent from the inlet to mix with the respective ingredients from dispensing ones of the plurality of ingredient reservoirs to form an intermediate fluid mixture, and (b) the intermediate fluid mixture to flow to the outlet.

32. The fluid mixture dispensing system of claim 31,
wherein the pressurized chamber is configured to be pressurized via the gas inlet so that pressure is applied to the plurality of ingredient reservoirs.

33. The fluid mixture dispensing system of claim 32,
wherein an amount of the respective ingredient dispensed from a particular one of the plurality of ingredient reservoirs is controlled by one or more of: (a) an amount of the pressure applied to the plurality of ingredient reservoirs; and (b) a duration during which the particular ingredient reservoir is enabled to dispense.

* * * * *